(12) United States Patent
Acerra

(10) Patent No.: US 10,378,567 B2
(45) Date of Patent: Aug. 13, 2019

(54) CONSTRUCTION SYSTEM USING A COMB CONNECTOR

(71) Applicant: Michael James Acerra, Galesburg, IL (US)

(72) Inventor: Michael James Acerra, Galesburg, IL (US)

(*) Notice: Subject to any disclaimer, the term of this patent is extended or adjusted under 35 U.S.C. 154(b) by 310 days.

(21) Appl. No.: 15/470,879

(22) Filed: Mar. 27, 2017

(65) Prior Publication Data

US 2017/0268543 A1 Sep. 21, 2017

Related U.S. Application Data

(63) Continuation of application No. 14/616,594, filed on Feb. 6, 2015, now abandoned, which is a continuation-in-part of application No. 14/211,319, filed on Mar. 14, 2014, now abandoned.

(60) Provisional application No. 61/801,751, filed on Mar. 15, 2013.

(51) Int. Cl.
*F16B 2/00* (2006.01)
*A63H 33/08* (2006.01)
*A63H 33/10* (2006.01)

(52) U.S. Cl.
CPC ............ *F16B 2/00* (2013.01); *A63H 33/084* (2013.01); *A63H 33/086* (2013.01); *A63H 33/102* (2013.01); *A63H 33/105* (2013.01); *Y10T 403/7045* (2015.01)

(58) Field of Classification Search
CPC .. A63H 33/086; A63H 33/084; A63H 33/102; A63H 33/105; A63H 33/108; F16B 2/00; Y10T 403/7045; Y10T 403/7073; Y10T 24/45241; Y10T 24/45607; Y10T 24/45681

See application file for complete search history.

(56) References Cited

U.S. PATENT DOCUMENTS

| | | | | |
|---|---|---|---|---|
| 2,057,942 A | * | 10/1936 | Aurele | A63H 33/108 217/65 |
| 3,271,895 A | * | 9/1966 | Sørensen | A63H 33/102 16/386 |
| D224,029 S | * | 6/1972 | Gale et al. | 482/35 |
| 4,606,732 A | * | 8/1986 | Lyman | A63H 33/086 446/104 |
| 4,685,892 A | * | 8/1987 | Gould | A63H 33/062 446/109 |
| 4,731,041 A | * | 3/1988 | Ziegler | A63H 33/065 446/102 |
| 4,792,319 A | * | 12/1988 | Svagerko | A63H 33/08 446/104 |
| 4,874,341 A | * | 10/1989 | Ziegler | A63H 33/08 446/109 |

(Continued)

*Primary Examiner* — Jonathan P Masinick
(74) *Attorney, Agent, or Firm* — Michael J. Foycik, Jr.

(57) ABSTRACT

A construction system uses a comb connector element in combination with flat or generally planar polygonal shapes of various types. The comb connector elements connect to the edges of the planar polygonal shapes. Each comb connector has at least one pair of connector members. Each connector member has a proximal end connected to the polygonal member, and a distal end. Each connector member having a face portion that includes a recess extending from a central region of the face portion. The recess extends to the distal end of the face member.

16 Claims, 103 Drawing Sheets

(56) References Cited

U.S. PATENT DOCUMENTS

| | | | | |
|---|---|---|---|---|
| 5,183,430 | A * | 2/1993 | Swann | A63H 33/04 446/104 |
| 5,501,626 | A * | 3/1996 | Harvey | A63H 33/04 446/104 |
| 5,895,045 | A * | 4/1999 | Vilar | A63H 33/06 273/160 |
| 6,186,855 | B1 * | 2/2001 | Bauer | A63H 33/04 446/104 |
| 6,565,406 | B2 * | 5/2003 | Huang | A63H 33/042 446/104 |
| 6,648,715 | B2 * | 11/2003 | Wiens | A63H 33/062 446/121 |
| 7,438,623 | B2 * | 10/2008 | Lin | A63H 33/086 446/104 |
| 7,556,136 | B2 * | 7/2009 | Marshall | B65G 17/24 198/370.09 |
| 7,749,042 | B2 * | 7/2010 | Fulgenzi | A63H 33/06 446/108 |
| 8,210,892 | B2 * | 7/2012 | Thrush | A63F 9/1288 446/108 |
| 8,366,507 | B2 * | 2/2013 | Chen | A63H 33/086 446/108 |
| 9,399,177 | B2 * | 7/2016 | Cochella | A63H 33/101 |
| 9,522,342 | B2 * | 12/2016 | Jazouli | A63H 33/042 |
| 2017/0058926 | A1 * | 3/2017 | Takubo | A63H 33/065 |
| 2017/0340981 | A1 * | 11/2017 | Iliovits | A63H 33/08 |

\* cited by examiner

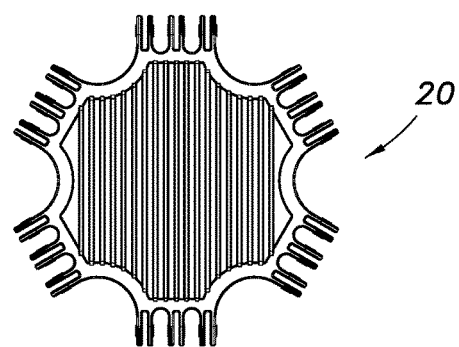
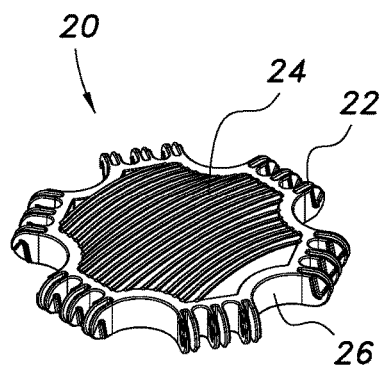
FIG. 4                FIG. 5
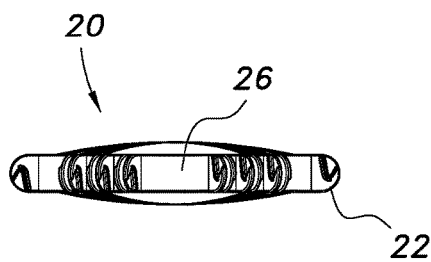
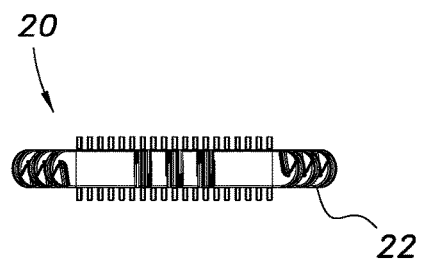
FIG. 6                FIG. 7

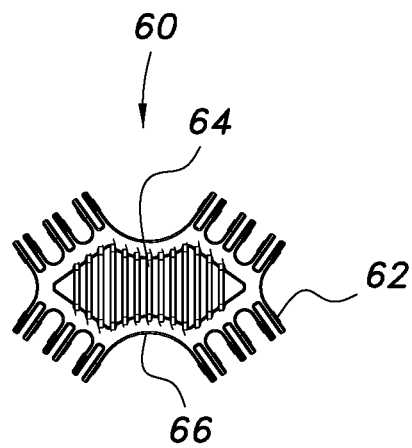
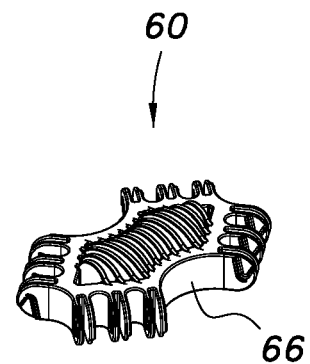
FIG. 20    FIG. 21
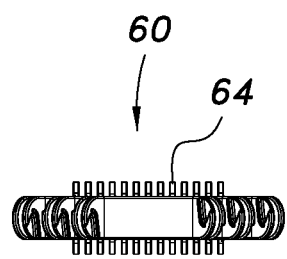
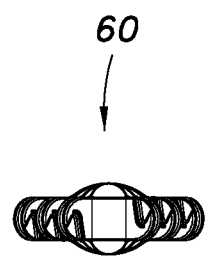
FIG. 22    FIG. 23

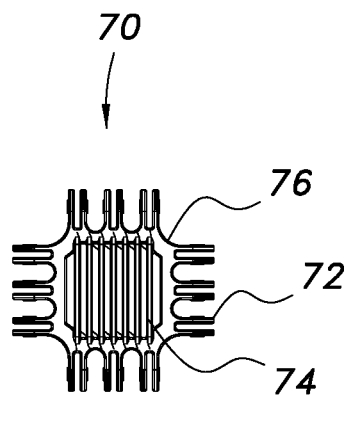
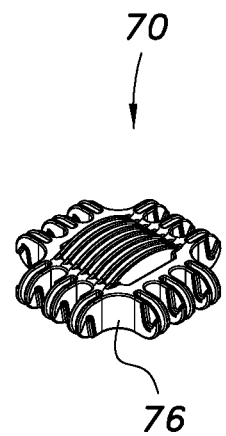
*FIG. 24*  *FIG. 25*
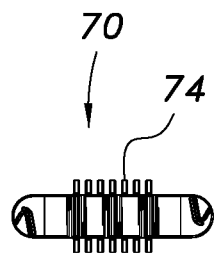
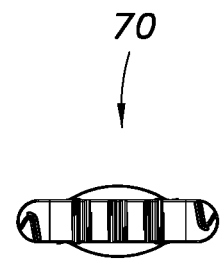
*FIG. 26*  *FIG. 27*

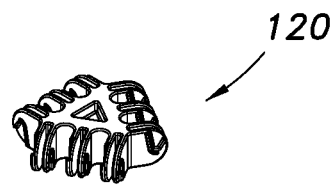
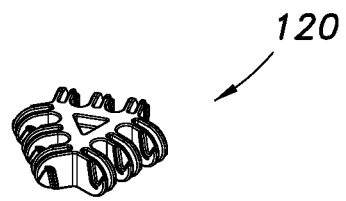
FIG. 44        FIG. 45
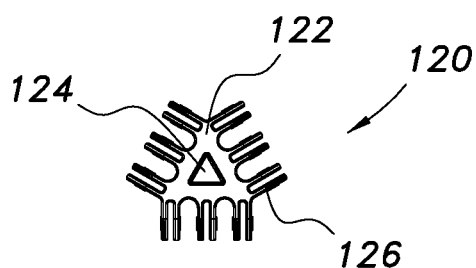
FIG. 46
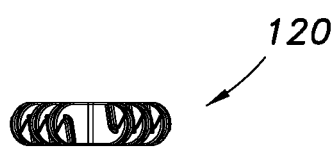
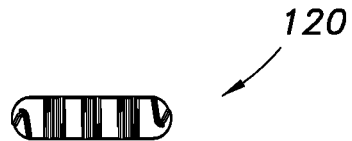
FIG. 47        FIG. 48

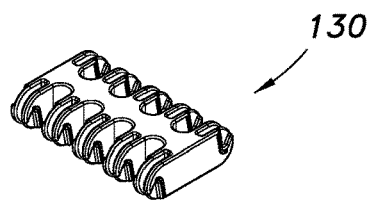
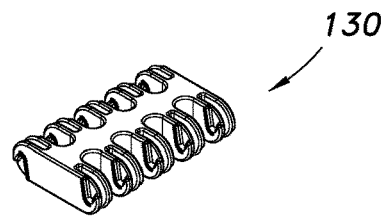
FIG. 49     FIG. 50
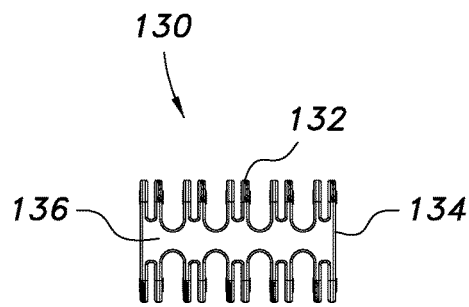
FIG. 51
FIG. 52     FIG. 53

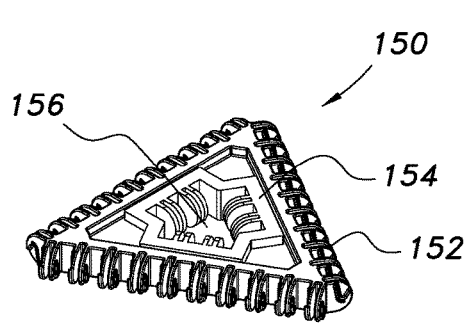
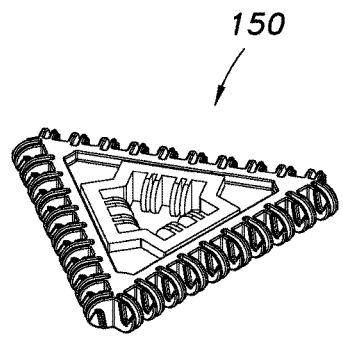
FIG. 59     FIG. 60
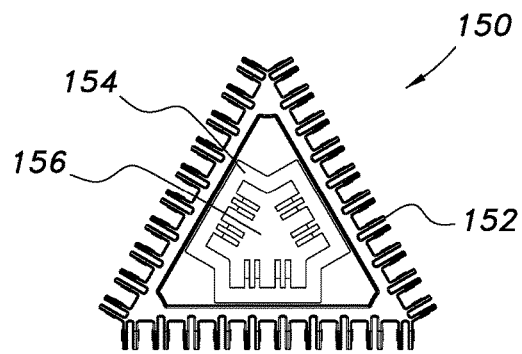
FIG. 61
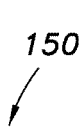
FIG. 62     FIG. 63

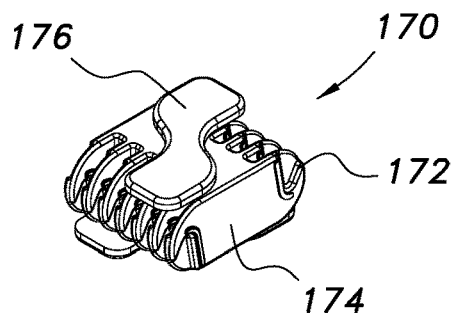 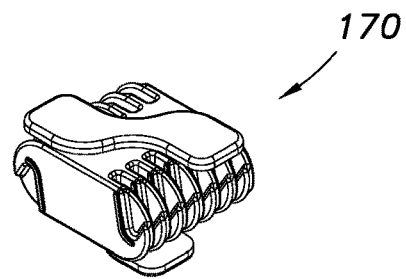
FIG. 67    FIG. 68
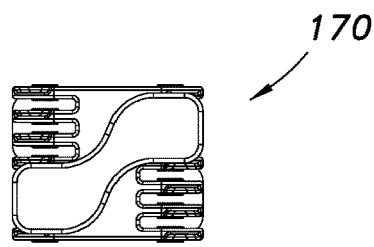
FIG. 69
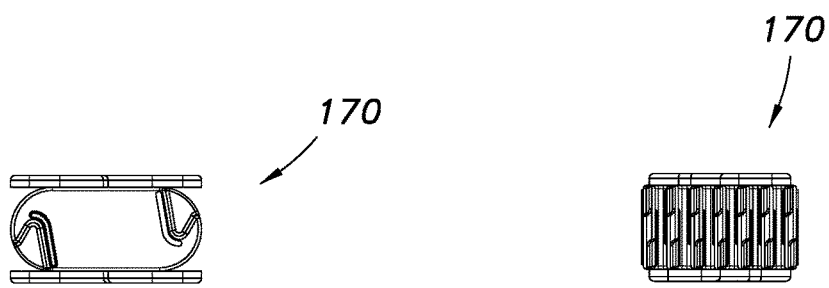
FIG. 70    FIG. 71

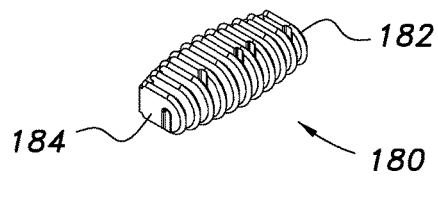
FIG. 72
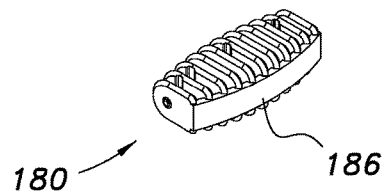
FIG. 73
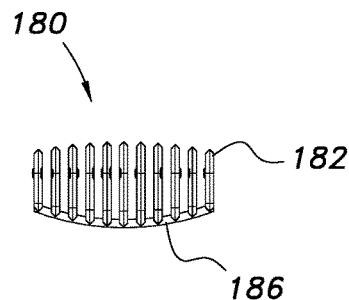
FIG. 74
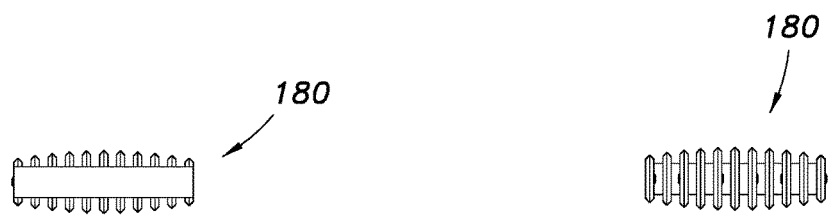
FIG. 75
FIG. 76

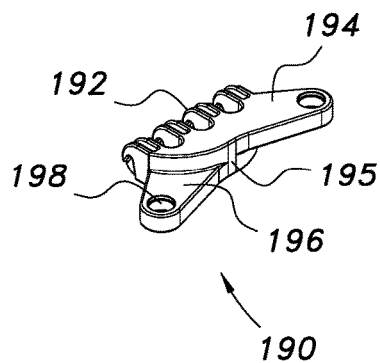 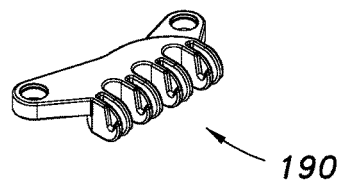
*FIG. 77*  *FIG. 78*
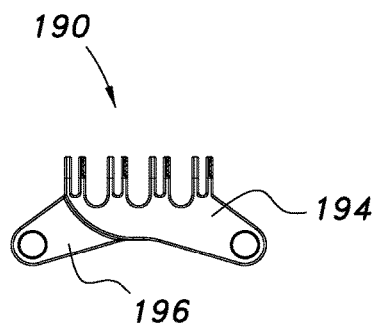
*FIG. 79*
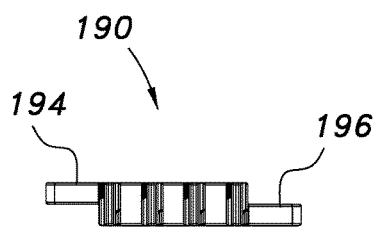 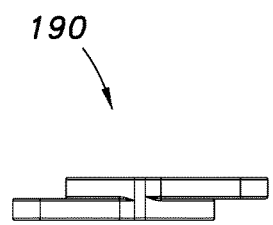
*FIG. 80*  *FIG. 81*

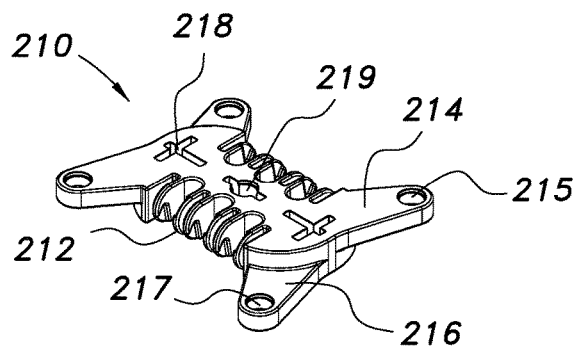
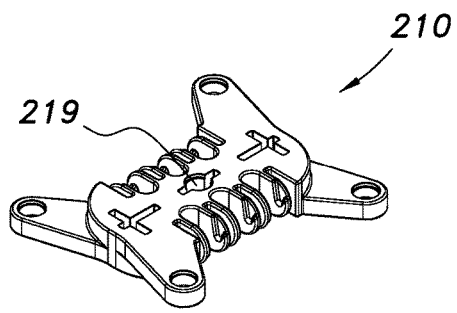
FIG. 87  FIG. 88
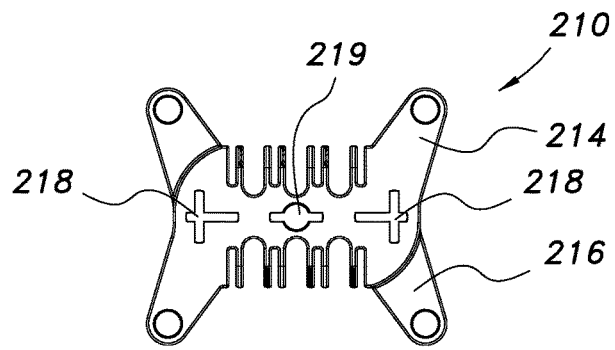
FIG. 89
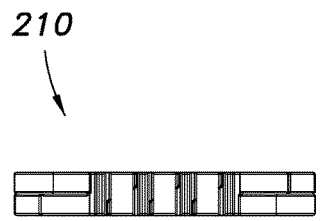 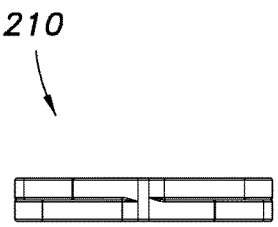
FIG. 90  FIG. 91

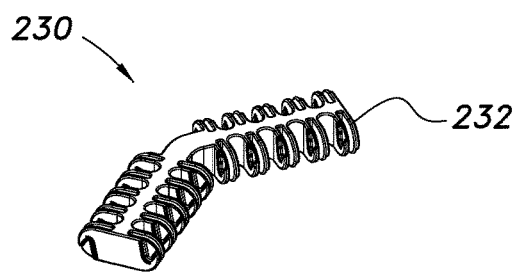
FIG. 97    FIG. 98
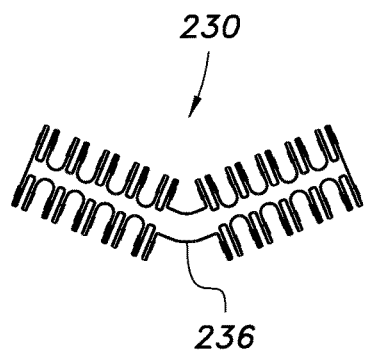
FIG. 99
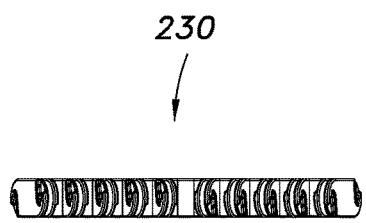 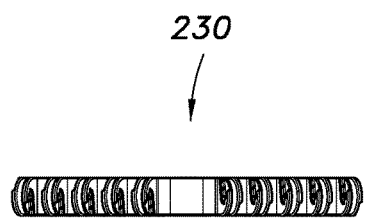
FIG. 100    FIG. 101

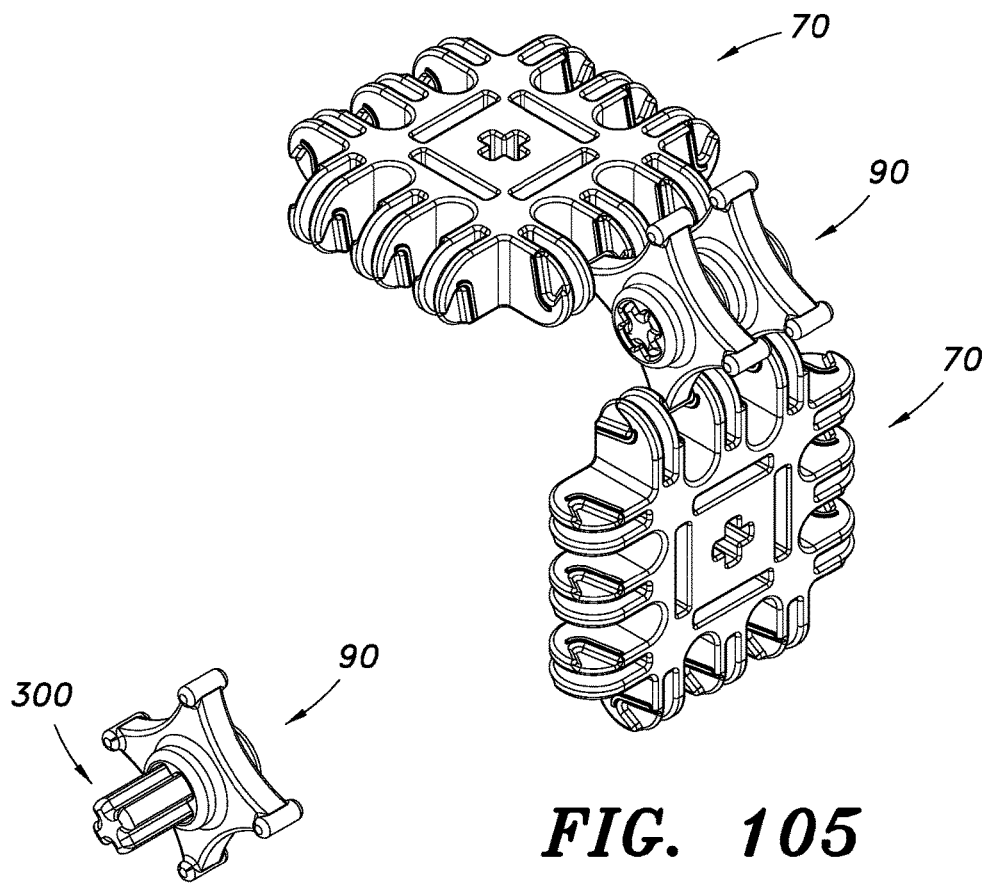
FIG. 105
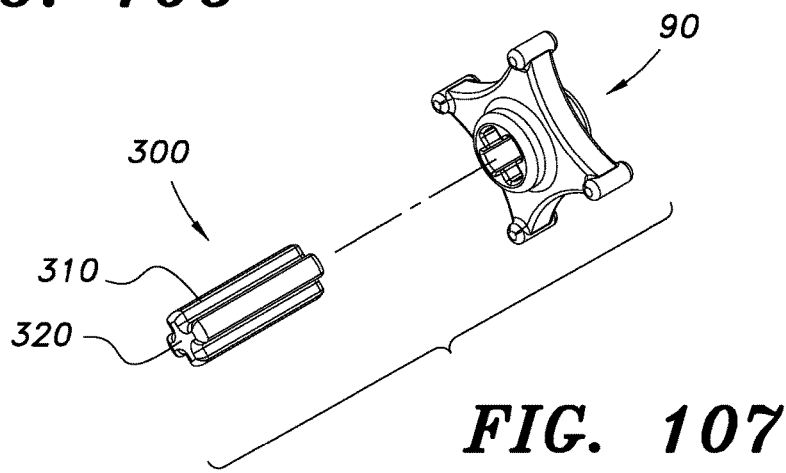
FIG. 106
FIG. 107

FEMALE TO FEMALE CONNECTION

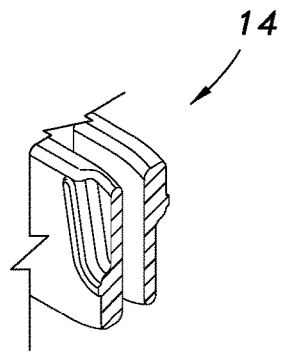
*FIG. 114*
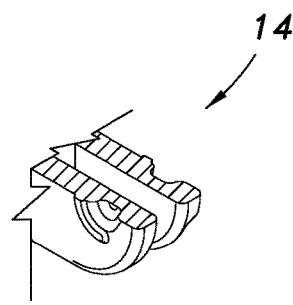
*FIG. 115*
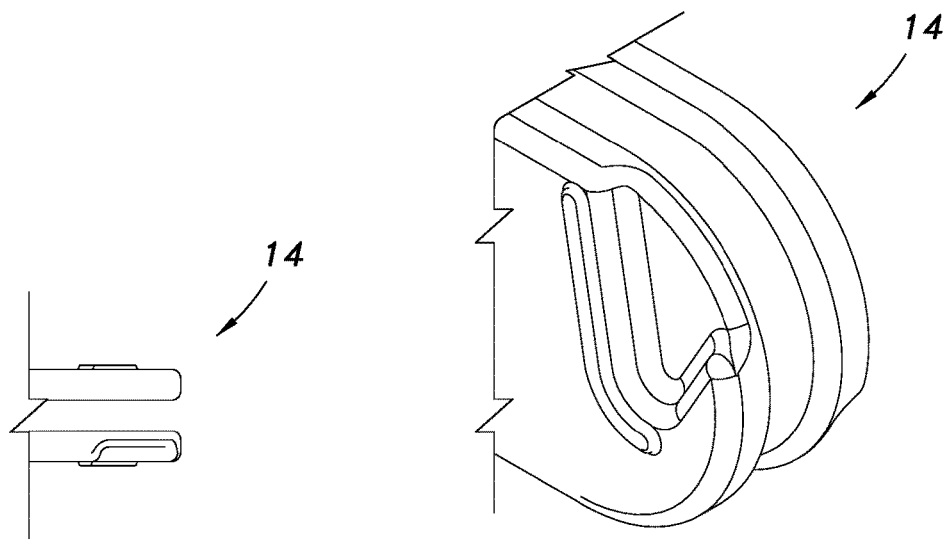
*FIG. 116*     *FIG. 117*

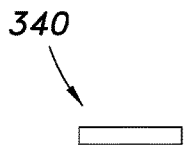
FIG. 125
FIG. 126  FIG. 127
FIG. 128

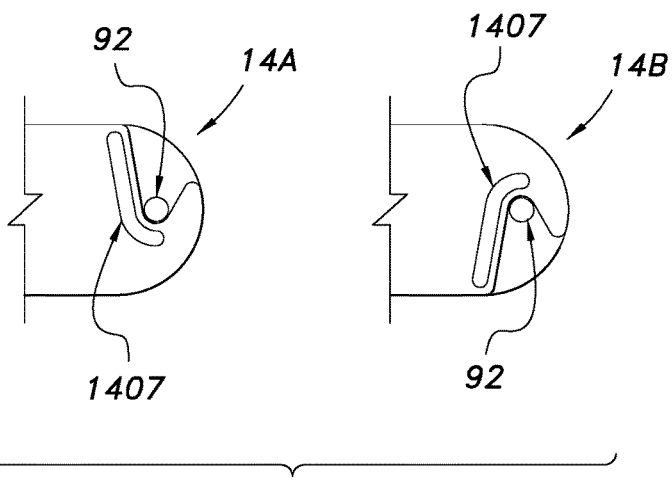
FIG. 130
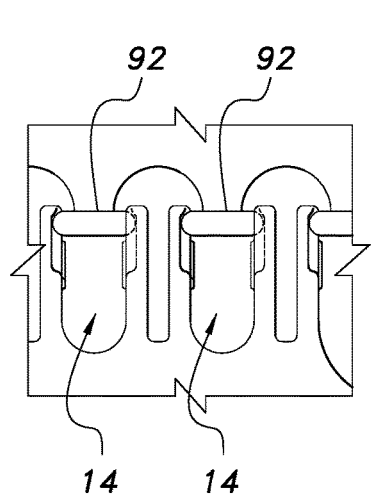 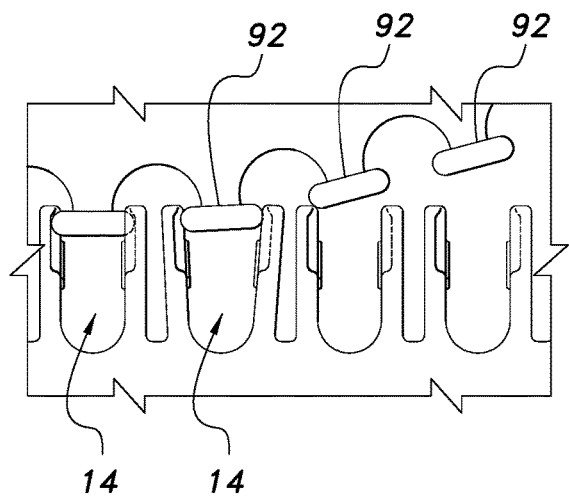
FIG. 131   FIG. 132

1720

1720

1720

1720

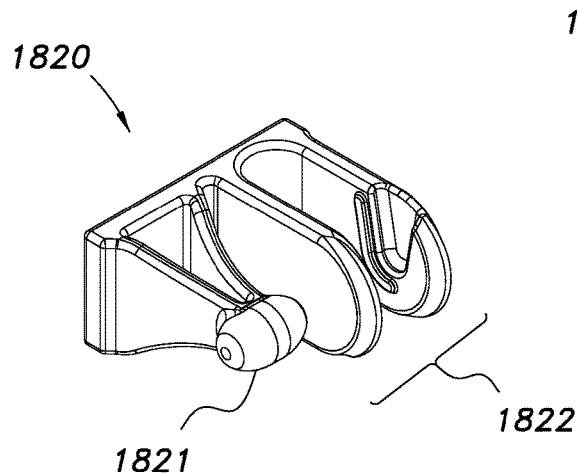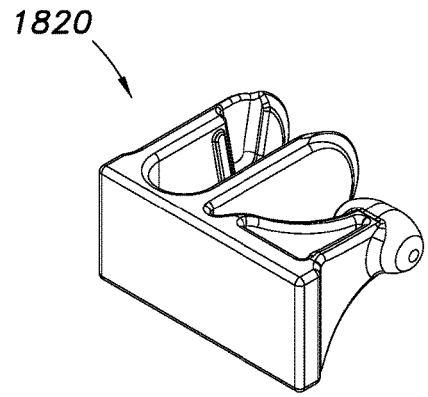
FIG. 182  FIG. 183
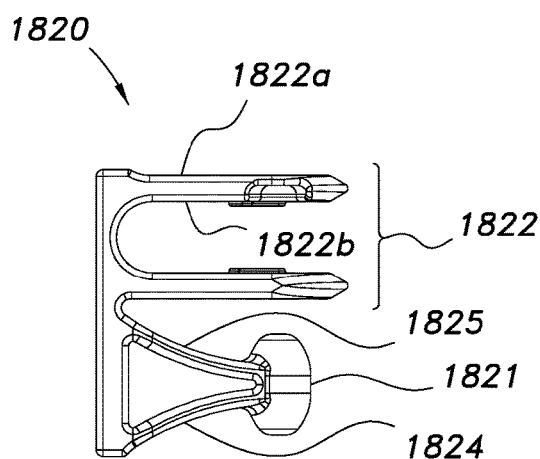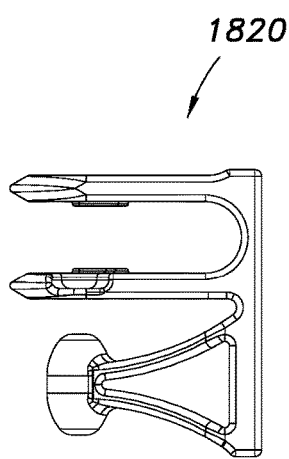
FIG. 184  FIG. 185

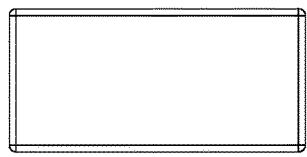
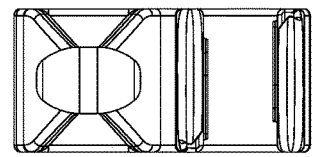
*FIG. 186*     *FIG. 187*
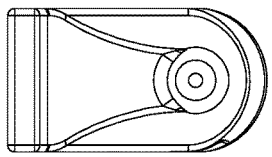
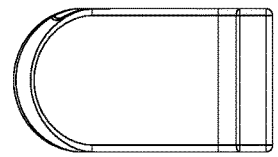
*FIG. 188*     *FIG. 189*

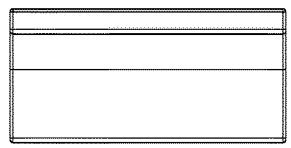
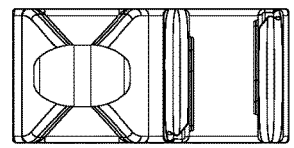
FIG. 218    FIG. 219
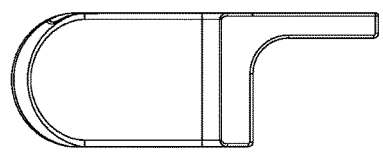
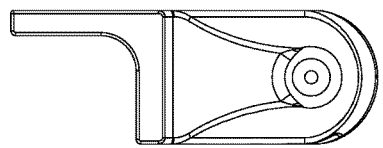
FIG. 220    FIG. 221

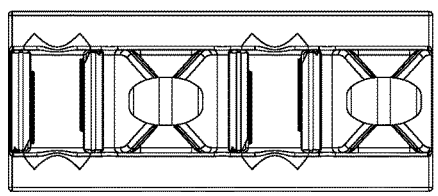
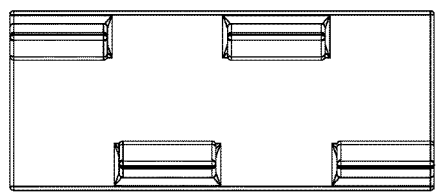
FIG. 226          FIG. 227
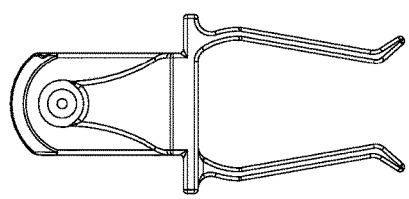
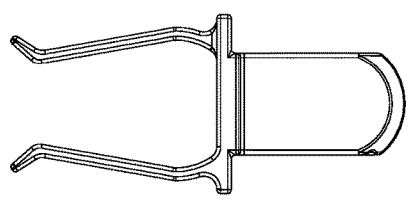
FIG. 228          FIG. 229

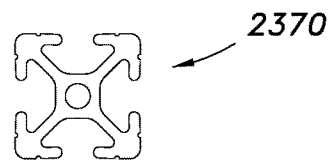
FIG. 238
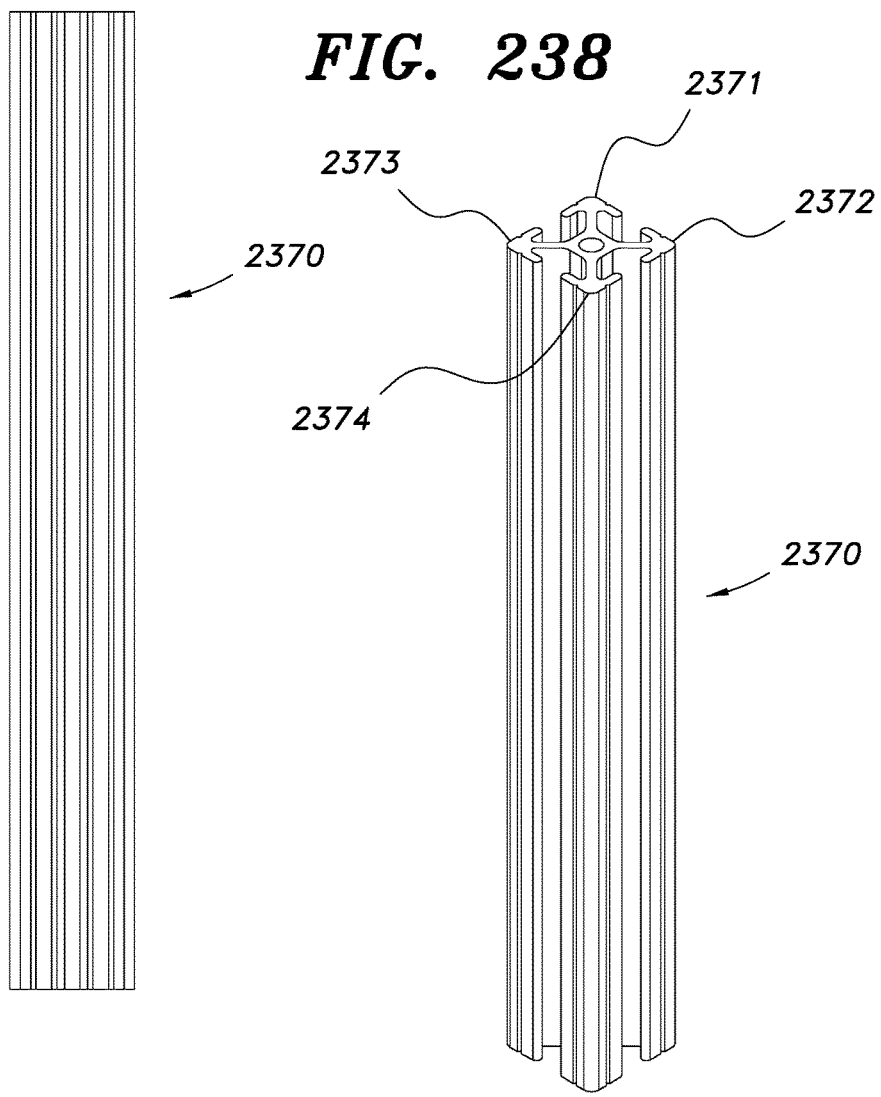
FIG. 237  FIG. 239

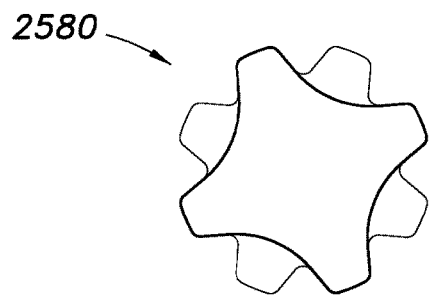
FIG. 258
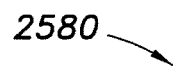
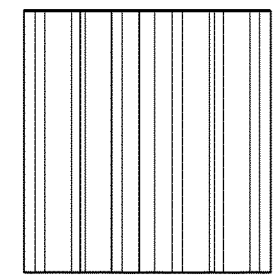
FIG. 259
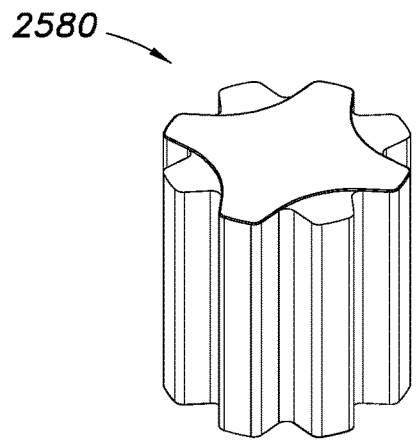
FIG. 260

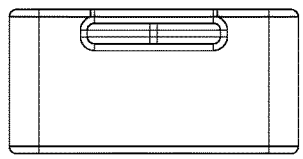
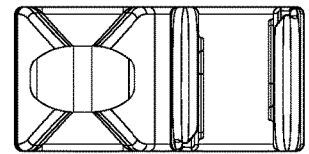
*FIG. 286*   *FIG. 287*
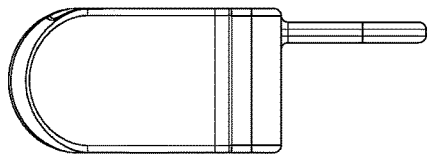
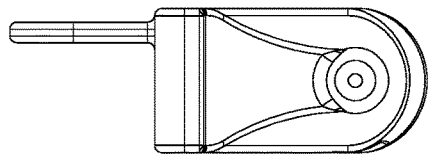
*FIG. 288*   *FIG. 289*

CONSTRUCTION SYSTEM USING A COMB CONNECTOR

CROSS REFERENCE TO RELATED APPLICATIONS

This application claims the priority of U.S. Provisional Application No. 61/801,751 filed on Mar. 15, 2013, inventor Michael James Acerra, entitled "Construction System Using a Comb Connector", and the priority of U.S. Utility application No. 14/211,319 filed Mar. 14, 2014, and the priority of U.S. Utility application Ser. No. 14/616,594 entitled "Construction System Using a Comb Connector" filed Feb. 6, 2015. The entire disclosure of these aforementioned patent applications is hereby incorporated in their entirety by reference thereto.

STATEMENT REGARDING FEDERALLY SPONSORED RESEARCH OR DEVELOPMENT

Not applicable.

FIELD OF THE INVENTION

The present invention relates to construction kits, construction elements, and connectors for construction elements.

BACKGROUND OF THE INVENTION

It is a problem in the art to provide construction kits, construction elements, and connectors for construction elements, that are relatively reliably secured when connected, are relatively low in cost to manufacture, and are relatively easy to connect.

SUMMARY OF THE INVENTION

From the foregoing, it is seen that it is a problem in the art to provide an apparatus and system of elements meeting the above requirements. According to the present invention, an apparatus and system of elements is provided which meets the aforementioned requirements and needs in the prior art.

Specifically, the device according to the present invention provides a construction kit, a variety of construction elements, and novel connectors for construction elements. The construction elements are relatively reliably secured when connected, relatively low in cost to manufacture, and are relatively easy to connect.

The device of the present invention provides a construction system that uses a comb connector element in combination with flat or generally planar polygonal shapes such as, but not limited to, triangles, squares, rectangles, pentagons, hexagons, heptagons, octagons, and so on. The invention can be used on a small scale as a toy or on a larger scale to build structures such as, but not limited to, houses, outhouses, stables, and office buildings, among others.

The present invention is directed to at least one comb connector element in combination with generally planar polygonal shapes such as, but not limited to, triangles, squares, rectangles, pentagons, hexagons, heptagons, and octagons.

A plurality of comb connector elements and polygonal shapes can be used to build three dimensional shapes such as polyhedrons, e.g., a dodecahedron and an octagonal prism. The planar polygonal shapes can be regular or irregular polygonal flat or substantially flat shapes.

The comb connector elements connect to the edges of the planar polygonal shapes. Each comb connector has at least one pair of connector members. Each connector member has a proximal end connected to the polygonal member, and a distal end. Each connector member having a face portion that includes a recess extending from a central region of the face portion. The recess extends to the distal end of the face member.

In additional to the aforementioned planar polygonal members, there are other construction elements that are not substantially planar or polygonal. Further, the polygonal members are not necessarily planar, and can have three dimensional extent. Additionally, the polygonal members can include empty interior regions which can include pairs of the comb connector members.

Other objects and advantages of the present invention will be more readily apparent from the following detailed description when read in conjunction with the accompanying drawings.

BRIEF DESCRIPTION OF THE DRAWINGS

FIG. 4 is a top view of a hexagonal planar element, according to the present invention.

FIG. 5 is a perspective view of the element of FIG. 4.

FIG. 6 is a side elevational view of the element of FIG. 4.

FIG. 7 is a front/back view of the element of FIG. 4.

FIG. 20 is a top/bottom view of a rhombus planar element, according to the present invention.

FIG. 21 is a perspective view of the element of FIG. 20.

FIG. 22 is a front/back view of the element of FIG. 20.

FIG. 23 is a side view of the element of FIG. 20.

FIG. 24 is a top view of a square planar element, according to the present invention.

FIG. 25 is a perspective view of the element of FIG. 24.

FIG. 26 is a front/back elevational view of the element of FIG. 24.

FIG. 27 is a side view of the element of FIG. 24.

FIG. 44 is a perspective view of a triangular element according to the present invention.

FIG. 45 is another perspective view of the element of FIG. 44.

FIG. 46 is a top/bottom view of the element of FIG. 44.

FIG. 47 is a front view of the element of FIG. 44.

FIG. 48 is a back view of the element of FIG. 44.

FIG. 49 is a perspective view of a two-sided female connector element according to the present invention.

FIG. 50 is another perspective view of the element of FIG. 49.

FIG. 51 is a top/bottom view of the element of FIG. 49.

FIG. 52 is a side view of the element of FIG. 49.

FIG. 53 is a front/back view of the element of FIG. 49.

FIG. 59 is a perspective view of a triangular planar element according to the present invention.

FIG. 60 is another perspective view of the element of FIG. 59.

FIG. 61 is a top/bottom view of the element of FIG. 59.

FIG. 62 is a back view of the element of FIG. 59.

FIG. 63 is a front view of the element of FIG. 59.

FIG. 67 is a perspective view of an angle locking hinge stop element according to the present invention.

FIG. 68 is another perspective view of the element of FIG. 67.

FIG. 69 is a top/bottom view of the element of FIG. 67.

FIG. 70 is a front/back view of the element of FIG. 67.

FIG. 71 is a side view of the element of FIG. 67.

FIG. 72 is a perspective view of a hermaphroditic hinge connector element according to the present invention.

FIG. 73 is another perspective view of the element of FIG. 72.

FIG. 74 is a top/bottom view of the element of FIG. 72.

FIG. 75 is a front view of the element of FIG. 72.

FIG. 76 is a back view of the element of FIG. 72.

FIG. 77 is a perspective view of a unity block element according to the present invention.

FIG. 78 is another perspective view of the element of FIG. 77.

FIG. 79 is a top/bottom view of the element of FIG. 77.

FIG. 80 is a front/back view of the element of FIG. 77.

FIG. 81 is a front/back view of the element of FIG. 77.

FIG. 87 is a perspective view of a utility block element according to the present invention.

FIG. 88 is another perspective view of the element of FIG. 87.

FIG. 89 is a top/bottom view of the element of FIG. 87.

FIG. 90 is a front/back view of the element of FIG. 87.

FIG. 91 is a side view of the element of FIG. 87.

FIG. 93 is a top/bottom view of the element of FIG. 92.

FIG. 97 is a perspective view of an angular element having a 135 degree angle, according to the present invention.

FIG. 98 is another perspective view of the element of FIG. 97.

FIG. 99 is a top/bottom view of the element of FIG. 97.

FIG. 100 is a front view of the element of FIG. 97.

FIG. 101 is a back view of the element of FIG. 97.

FIG. 105 is a perspective view of a square style connection, according to the invention.

FIG. 106 is a perspective view of a male connector with a pin element, according to the invention.

FIG. 107 is an assembly view of the male connector with a pin element of FIG. 106.

FIG. 114 is a sectional view taken along line X-X of FIG. 112.

FIG. 115 is a sectional view taken along line Y-Y of FIG. 113.

FIG. 116 is a top elevational view of the pair of connector members of FIG. 110.

FIG. 117 is an enlarged view corresponding to FIG. 111.

FIG. 119 is an assembly view showing insertion of a pin into a hole in one of the elements.

FIG. 120 is a perspective view of a hermaphroditic connector element, according to the present invention.

FIG. 121 is a top elevational view of the hermaphroditic connector element of FIG. 120.

FIG. 122 is a side elevational view of the hermaphroditic connector element of FIG. 120.

FIG. 123 is a perspective view of the connection of two hermaphroditic connector elements of FIG. 120.

FIG. 124 is an assembly view of the connection of the two hermaphroditic connector elements of FIG. 123.

FIG. 125 is a perspective view of a stick-like element, according to the present invention.

FIG. 126 is a front elevational view of the stick-like element of FIG. 125.

FIG. 127 is a side elevational view of the stick-like element of FIG. 125.

FIG. 128 is an end elevational view of the stick-like element of FIG. 125.

FIG. 129 is an assembly view showing use of the stick connector of FIGS. 125-128.

FIG. 130 is a schematic view of the pin and ridge connection of two corresponding ones of a pair of connector members, according to the present invention.

FIG. 131 is a schematic view of the insertion of male elements into respective ones of a plurality of pairs of connector members, according to the present invention.

FIG. 132 is a schematic view showing a zipper-like unlocking of the connections of the male elements into respective ones of a plurality of pairs of connector members of FIG. 131.

Figure 133:
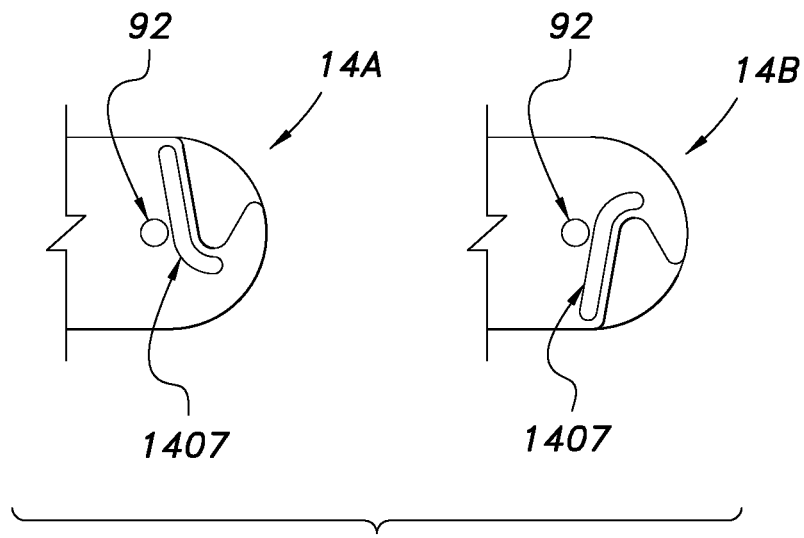

FIG. 133 is an enlarged view, similar to FIG. 130, showing a different type of locking engagement of the male elements behind the ridge members.

Figure 134:
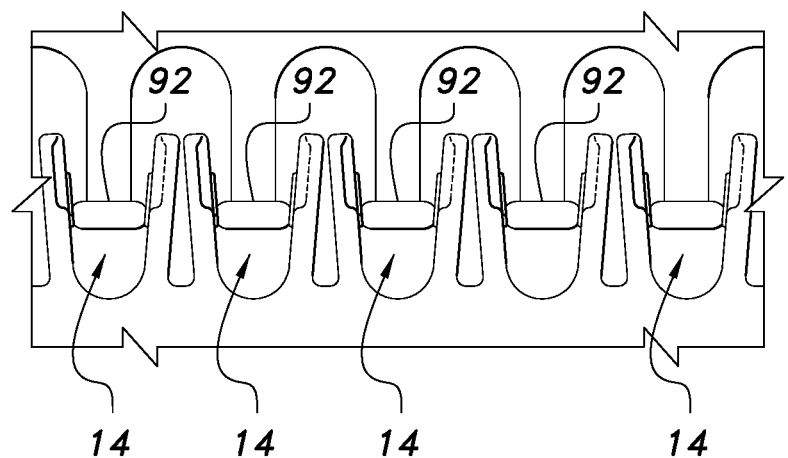

FIG. 134 is a schematic view of the insertion of male elements into respective ones of a plurality of pairs of connector members, for the locking arrangement shown in FIG. 133.

Figure 135:
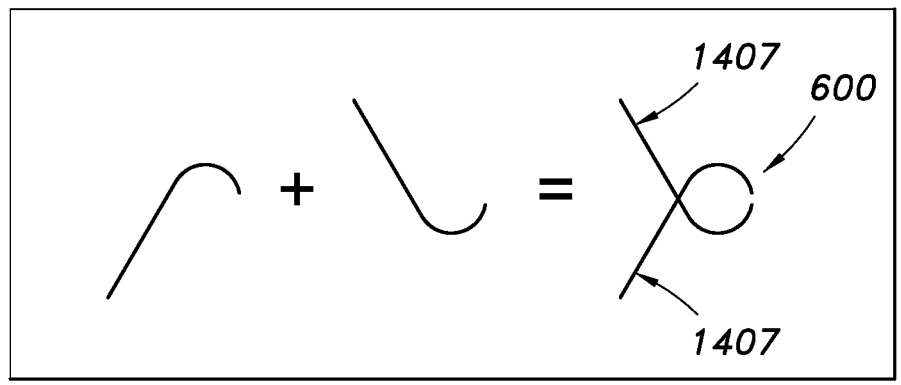

FIG. 135 is a schematic view showing the ridge members in overlapping side view, to illustrate the oppositely directed connecting scheme of the present invention.

Figure 136:
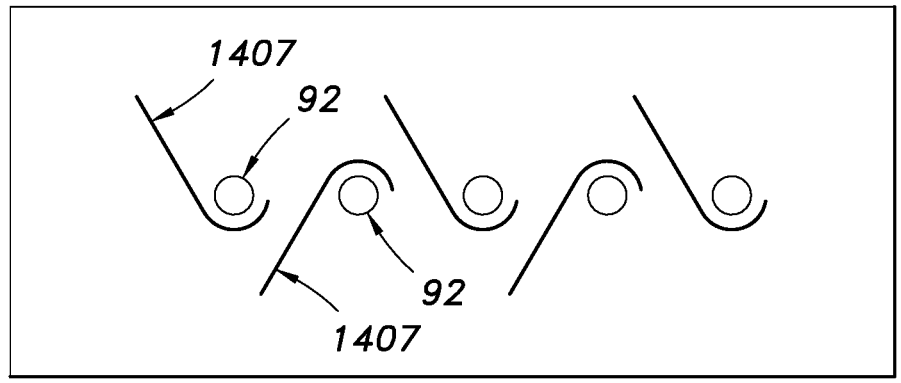

FIG. 136 is a schematic view similar to FIG. 135, showing a plurality of pairs of the ridge members and male elements in side view, to illustrate the oppositely directed connecting scheme of the present invention.

Figure 137:
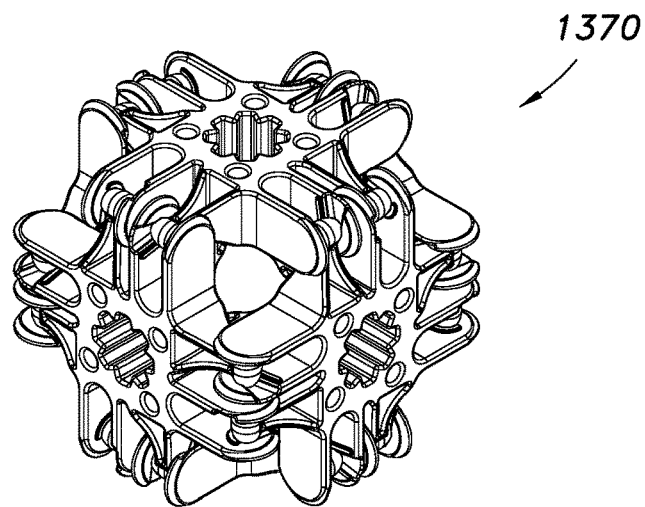

FIG. 137 is an isometric view of a plurality of square planar elements similar to those of the foregoing embodiments, and shown in detail in the following FIGS. 138-142 below, arranged into a cube assembly.

Figure 138:
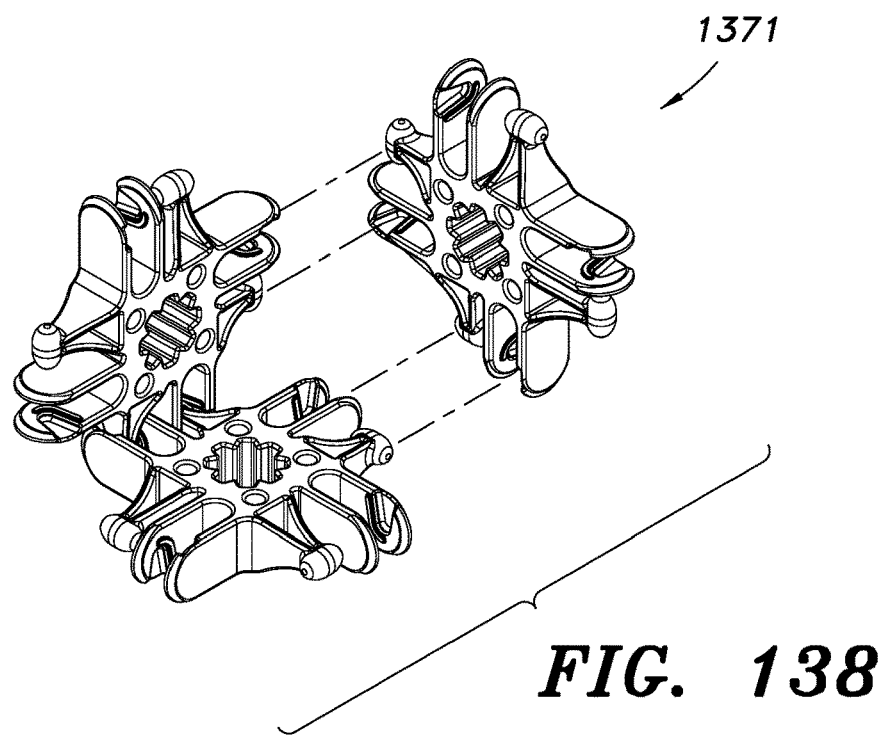

FIG. 138 is an exploded view of three square planar elements according to the present invention and shown in FIG. 137.

Figure 139:
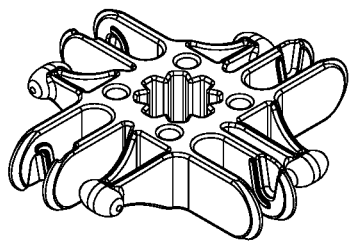

FIG. 139 is a top isometric view of a square planar element, according to the present invention.

Figure 140:
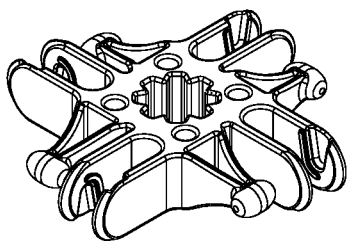

FIG. 140 is a bottom isometric view of a square planar element, according to the present invention.

Figure 141:
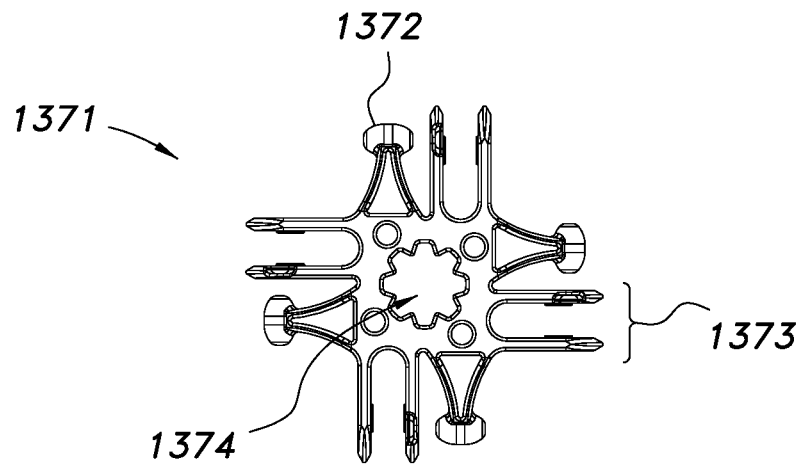

FIG. 141 is a top view of a square planar element, according to the present invention.

Figure 142:
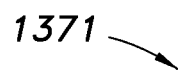

FIG. 142 is a side view of a square planar element, according to the present invention.

Figure 143:
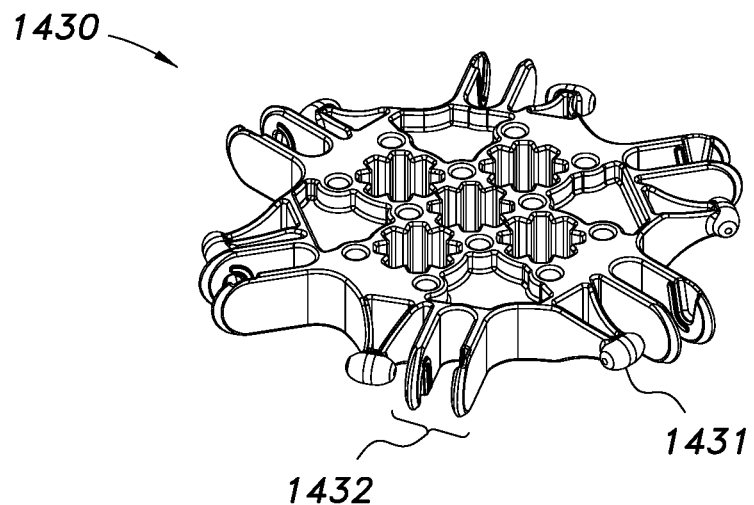

FIG. 143 is a perspective top view of a hexagonal planar element, according to the present invention.

Figure 144:
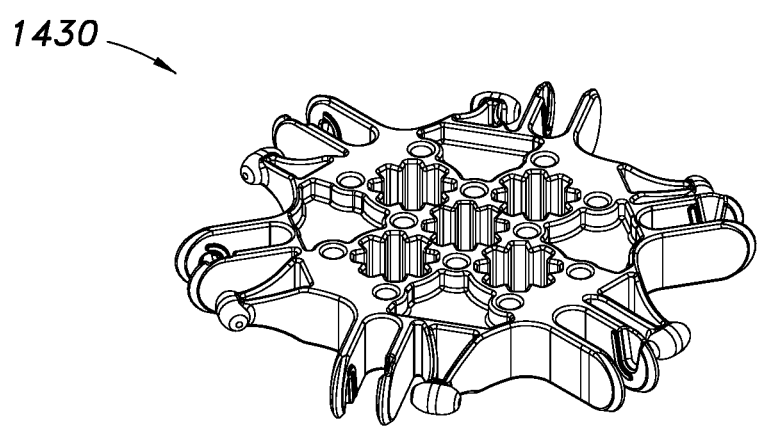

FIG. 144 is a perspective bottom view of the same element as FIG. 143.

Figure 145:
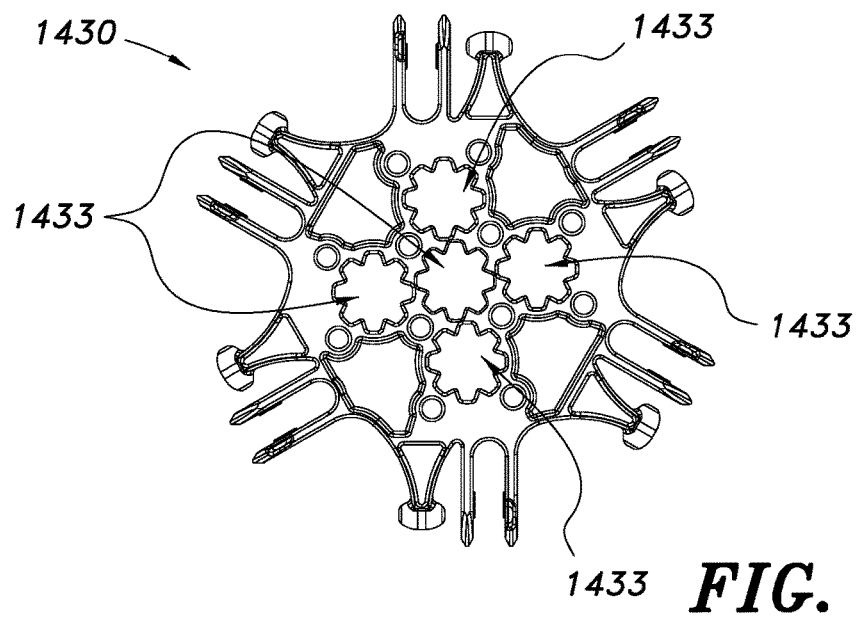

FIG. 145 is a top and bottom view of the same element as in FIG. 143.

Figure 146:
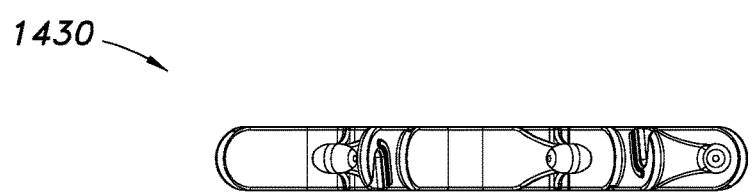

FIG. 146 is a side view of the same element as FIG. 143.

Figure 147:
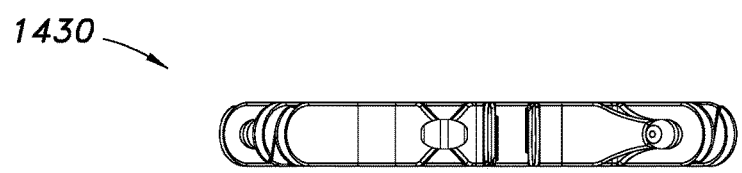

FIG. 147 is a side view of the front and back of FIG. 143.

Figure 148:
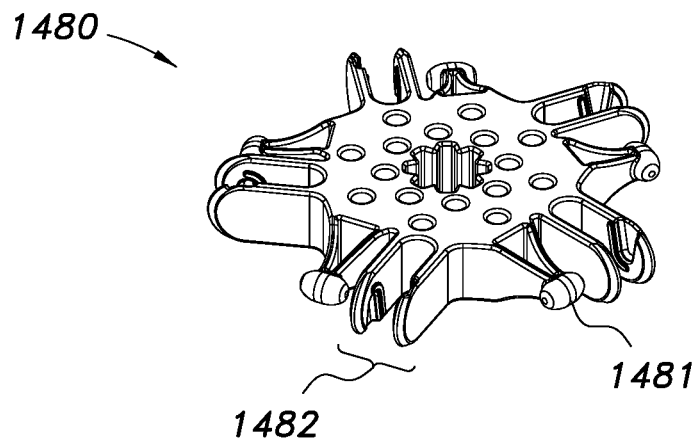

FIG. 148 is a top isometric view of a pentagonal planar element, according to the present invention.

Figure 149:
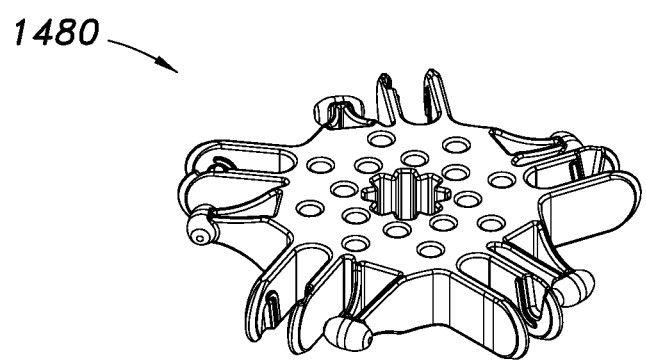

FIG. 149 is bottom isometric views of the same element as shown in FIG. 148.

Figure 150:
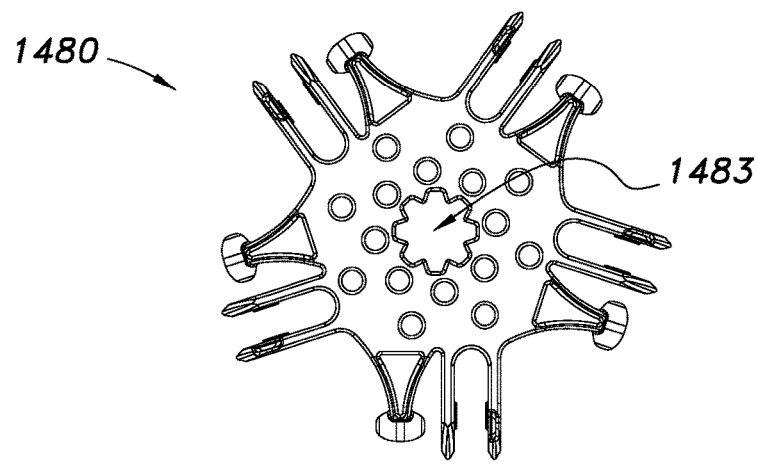

FIG. 150 is a top and bottom view of the same element as shown in FIG. 148.

Figure 151:
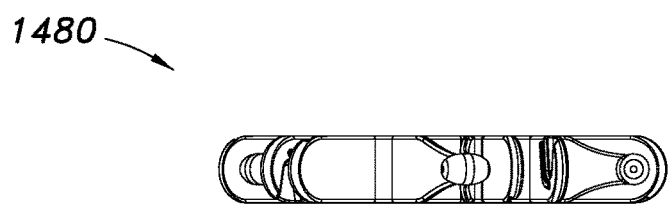

FIG. 151 is a side view of a pentagonal planar element in FIG. 148, according to the present invention.

Figure 152:
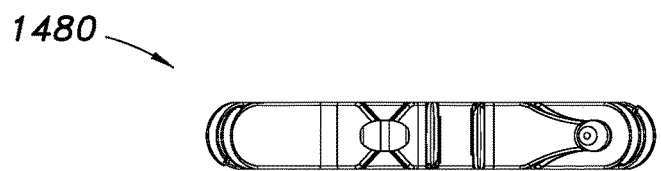

FIG. 152 is a front/back views of the same element as shown in FIG. 148.

Figure 153:
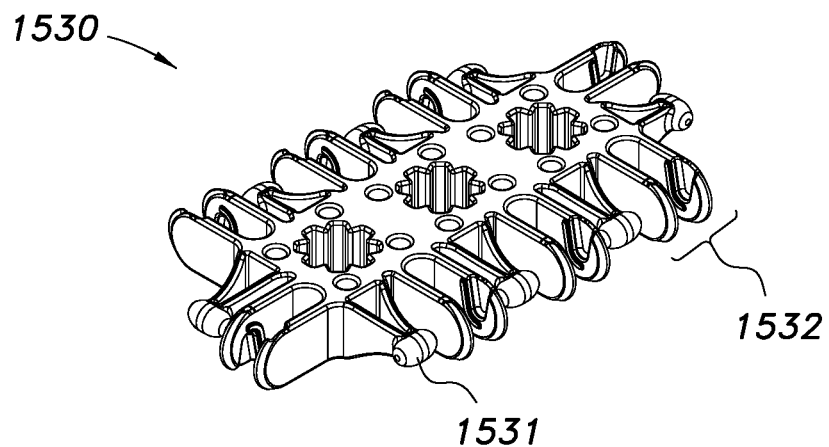

FIG. 153 is a top isometric view of a rectangular element, according to the present invention.

Figure 154:
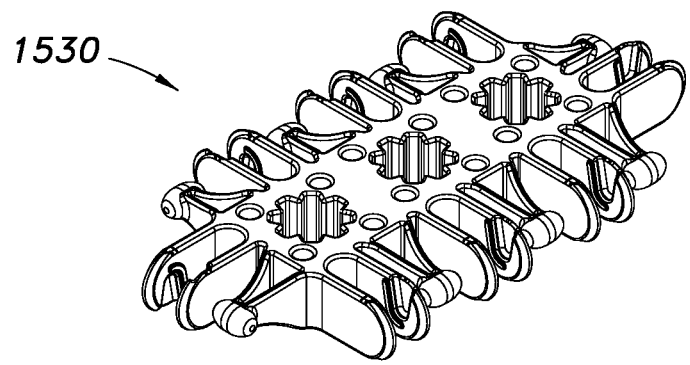

FIG. 154 is a bottom isometric view of the same element shown in FIG. 153.

Figure 155:
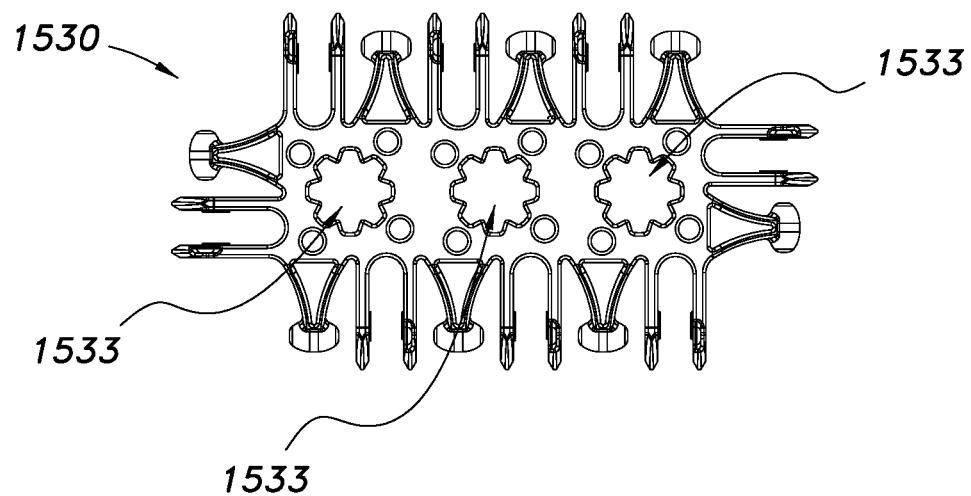

FIG. 155 is a top/bottom view of the same element shown in FIG. 153.

Figure 156:
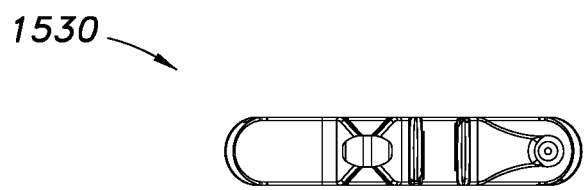

FIG. 156 is a side view of the element shown in FIG. 153.

Figure 157:
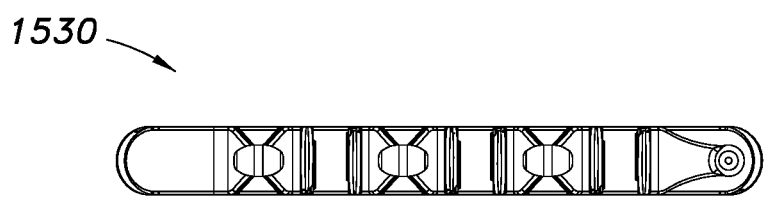

FIG. 157 is a front/back view of the same element shown in FIG. 153.

Figure 158:
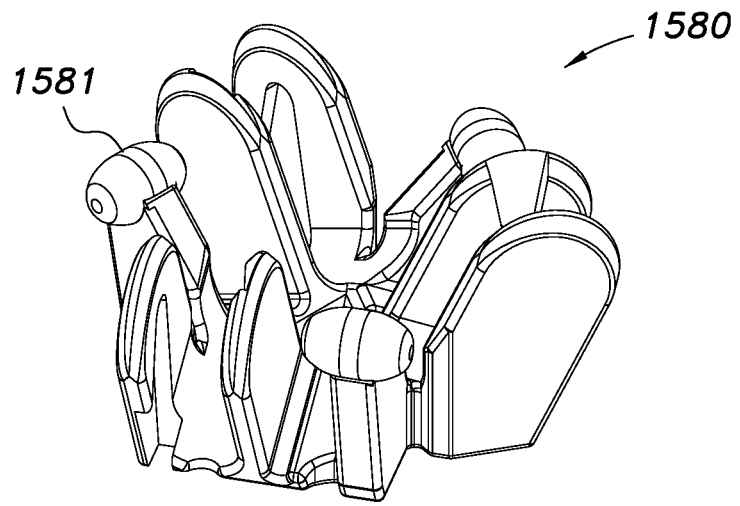

FIG. 158 is a perspective top view of a triangular element according to the present invention.

Figure 159:
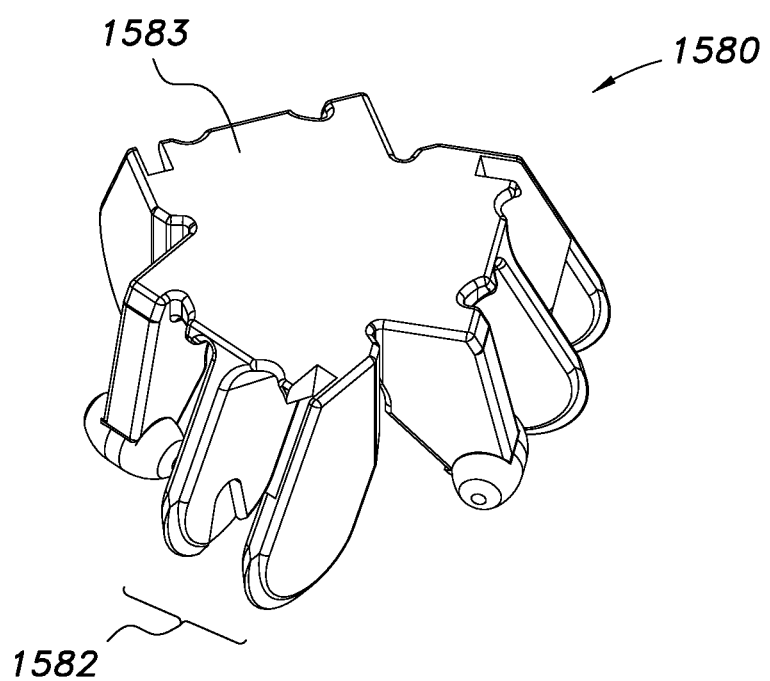

FIG. 159 is a perspective bottom view of the same element shown in FIG. 158.

Figure 160:
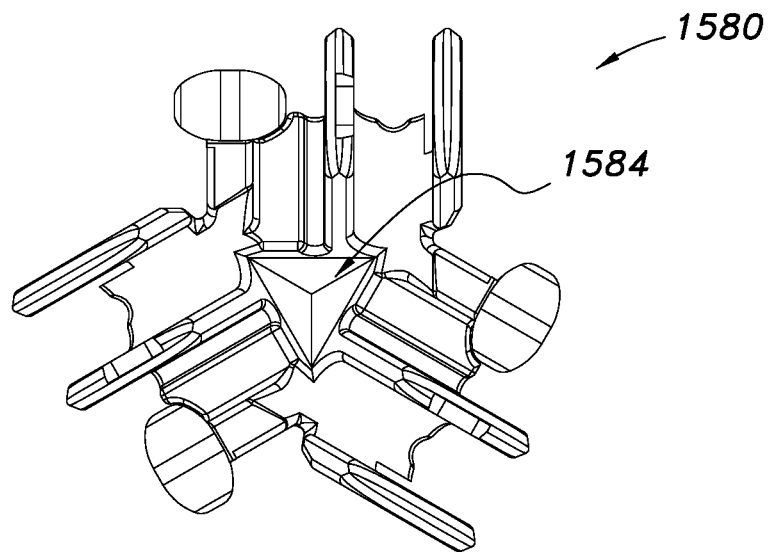

FIG. 160 is a bottom view of the same view of the same element shown in FIG. 158.

Figure 161:
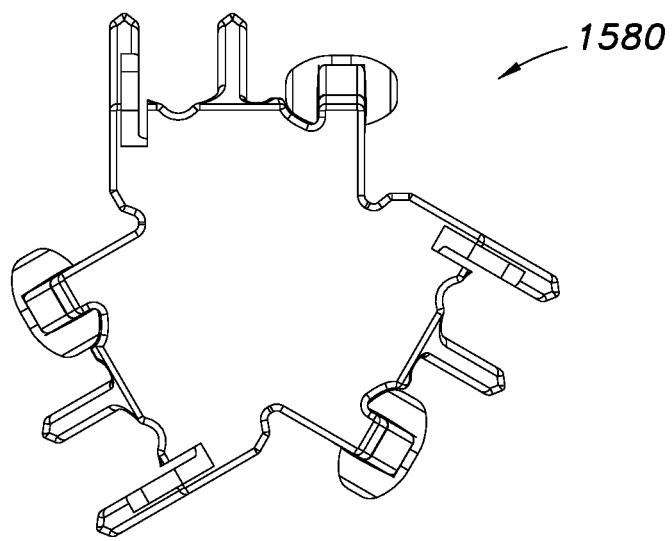

FIG. 161 is a top view of the same element shown in FIG. 158.

Figure 162:
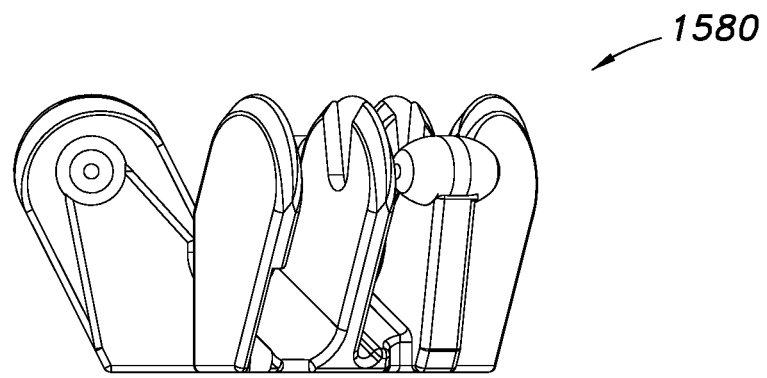

FIG. 162 is a left side view of the same element as shown in FIG. 158.

Figure 163:
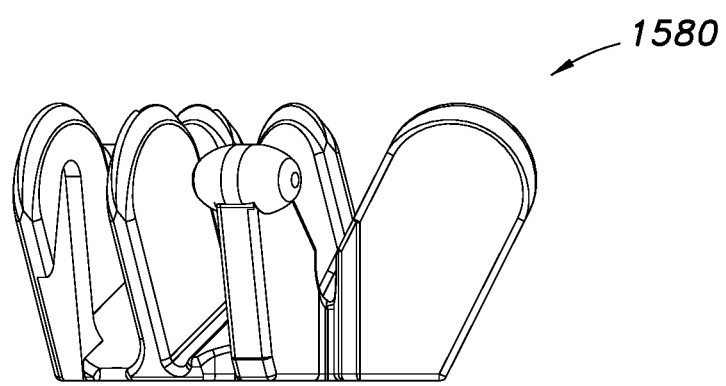

FIG. 163 is a right side view of the same element as shown in FIG. 158.

Figure 164:
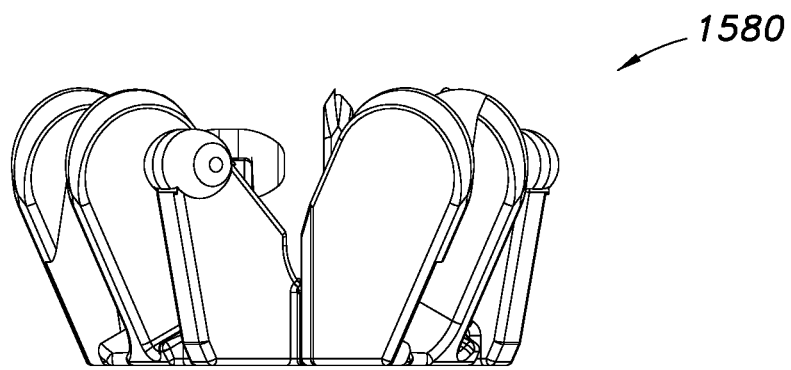

FIG. 164 is a front view of the same element as shown in FIG. 158.

Figure 165:
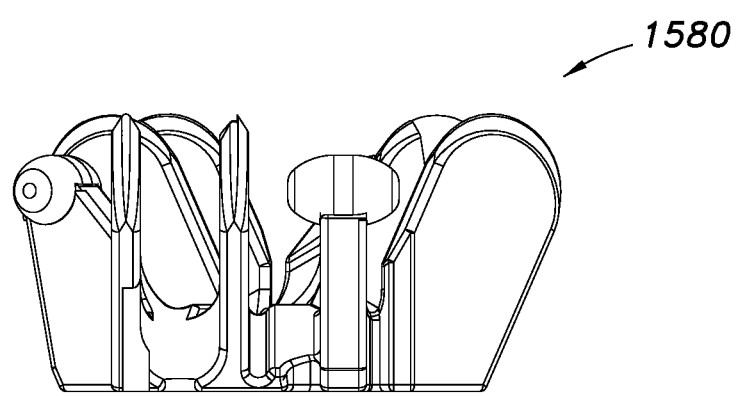

FIG. 165 is a back view of the same element as shown in FIG. 158.

Figure 166:
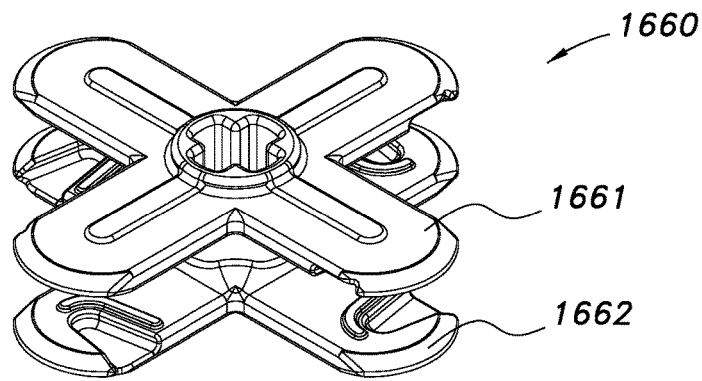

FIG. 166 is an isometric view of a square female connector element, according to the present invention.

Figure 167:
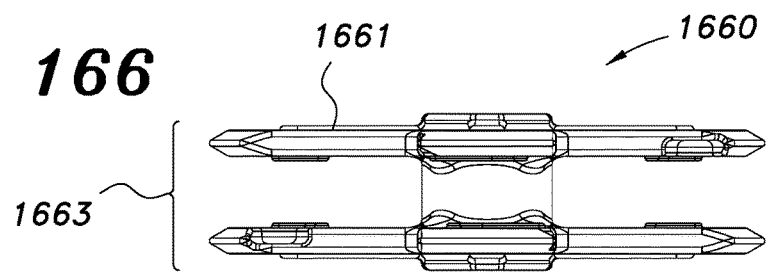

FIG. 167 is a side view of the same element as shown in FIG. 166.

Figure 168:
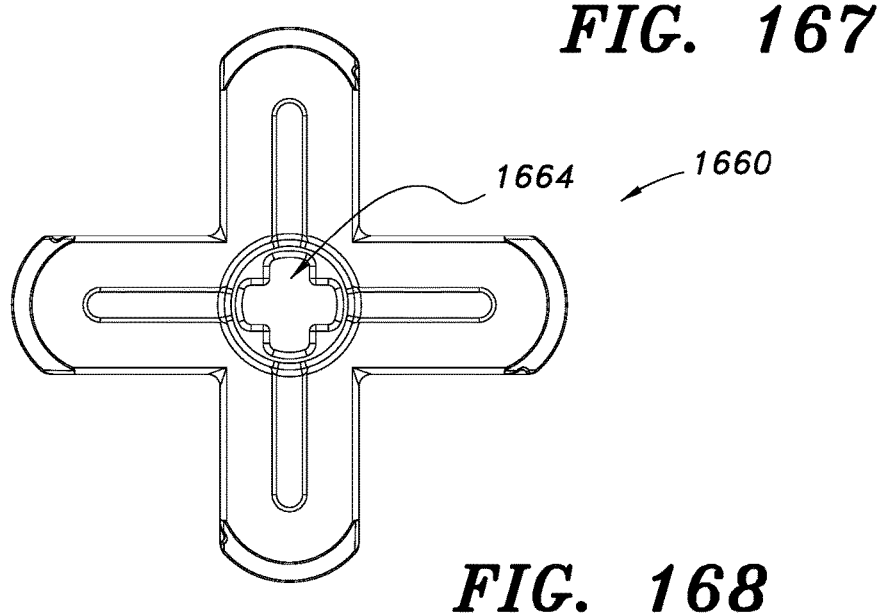

FIG. 168 is a top view of the same element as shown in FIG. 166.

Figure 169:
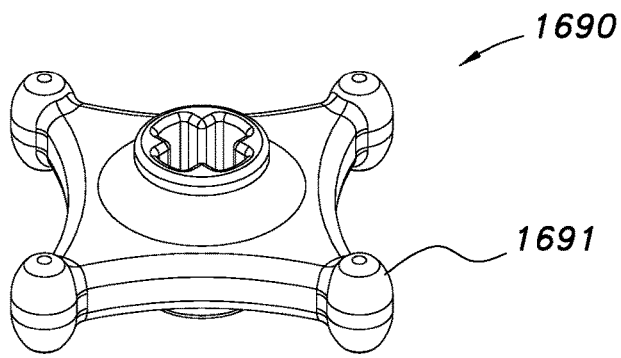

FIG. 169 is an isometric view of a square male connector element, according to the present invention.

Figure 170:
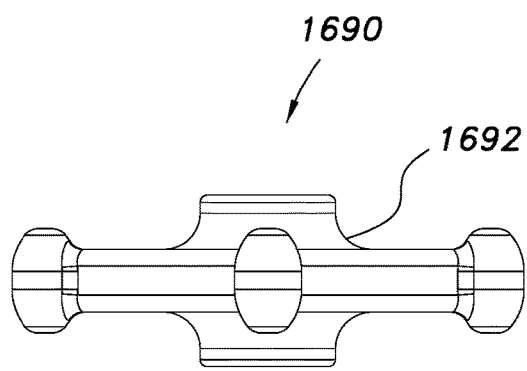

FIG. 170 is a side view if the same element as shown in FIG. 169.

Figure 171:
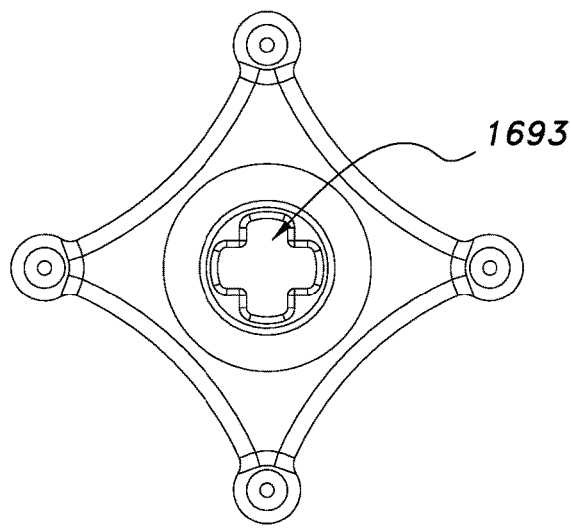

FIG. 171 is a top view of the same element as shown in FIG. 169.

Figure 172:
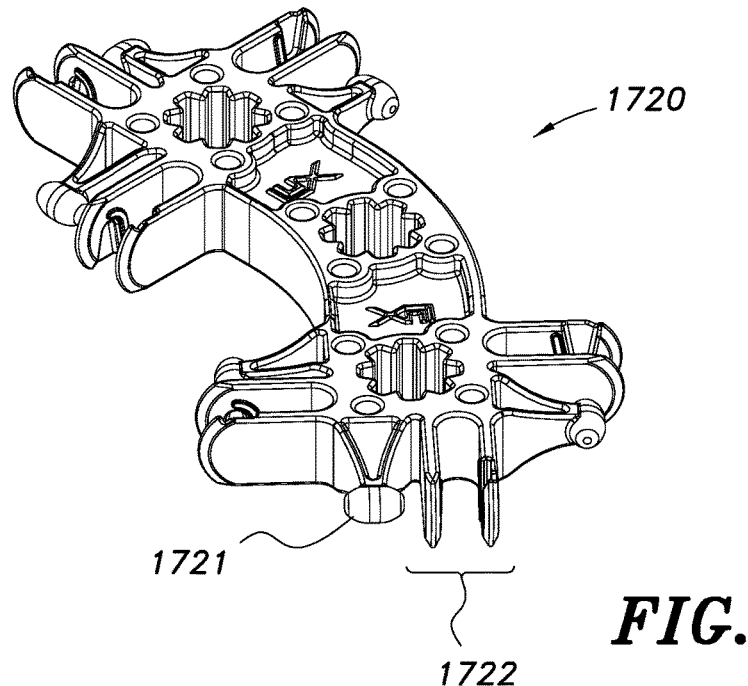

FIG. 172 is an isometric view of a Y shaped element, according to the present invention.

Figure 173:
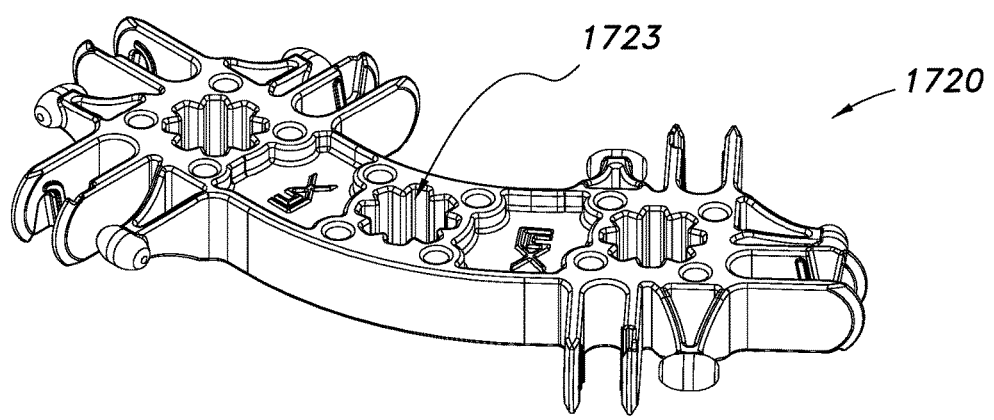

FIG. 173 is a bottom isometric view of the same element as shown in FIG. 172.

Figure 174:
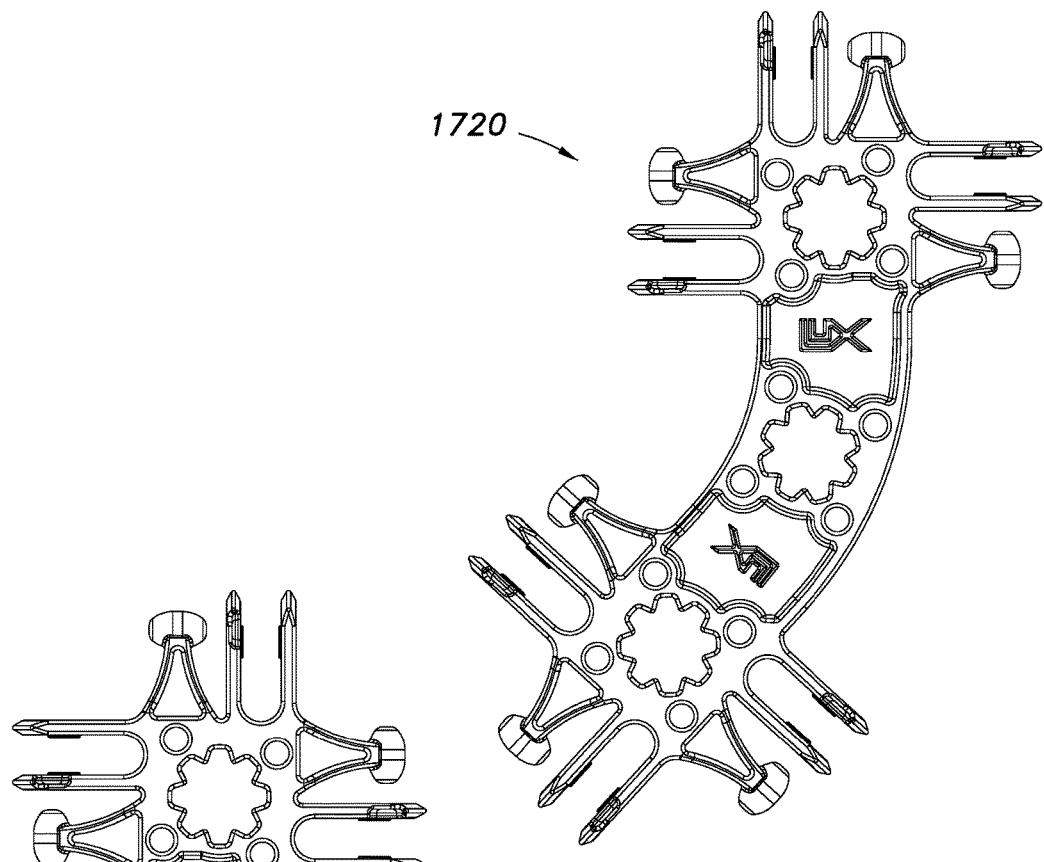

FIG. 174 is a top view of the same element as shown in FIG. 172.

Figure 175:
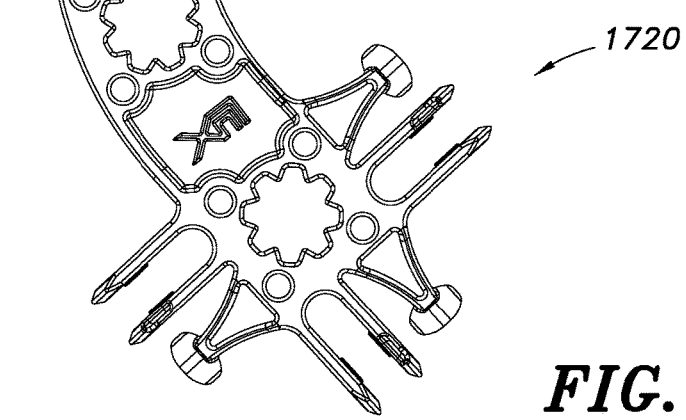

FIG. 175 is a bottom view of the same element as shown in FIG. 172.

Figure 176:
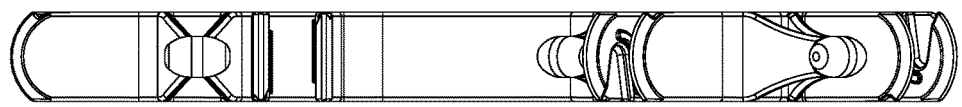

FIG. 176 is a front of the same element as shown in FIG. 172.

Figure 177:
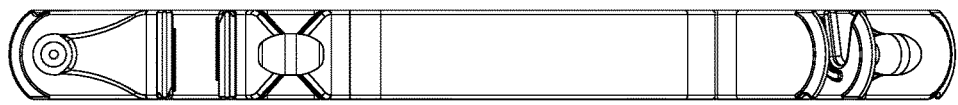

FIG. 177 is a back of the same element as shown in FIG. 172.

Figure 178:
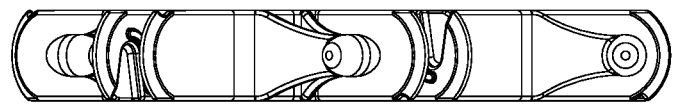

FIG. 178 is a left side of the same element as shown in FIG. 172.

Figure 179:
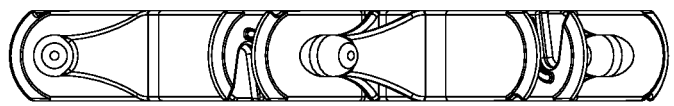

FIG. 179 is a right side of the same element as shown in FIG. 172.

Figure 180:
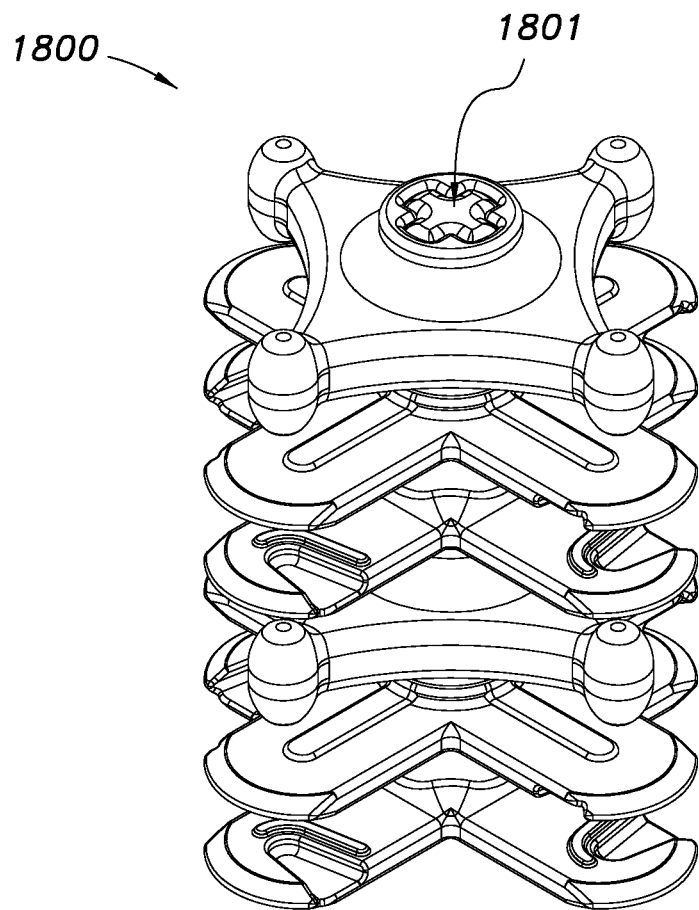

FIG. 180 is a assembly of male and female elements as shown in FIGS. 166 through 171.

Figure 181:
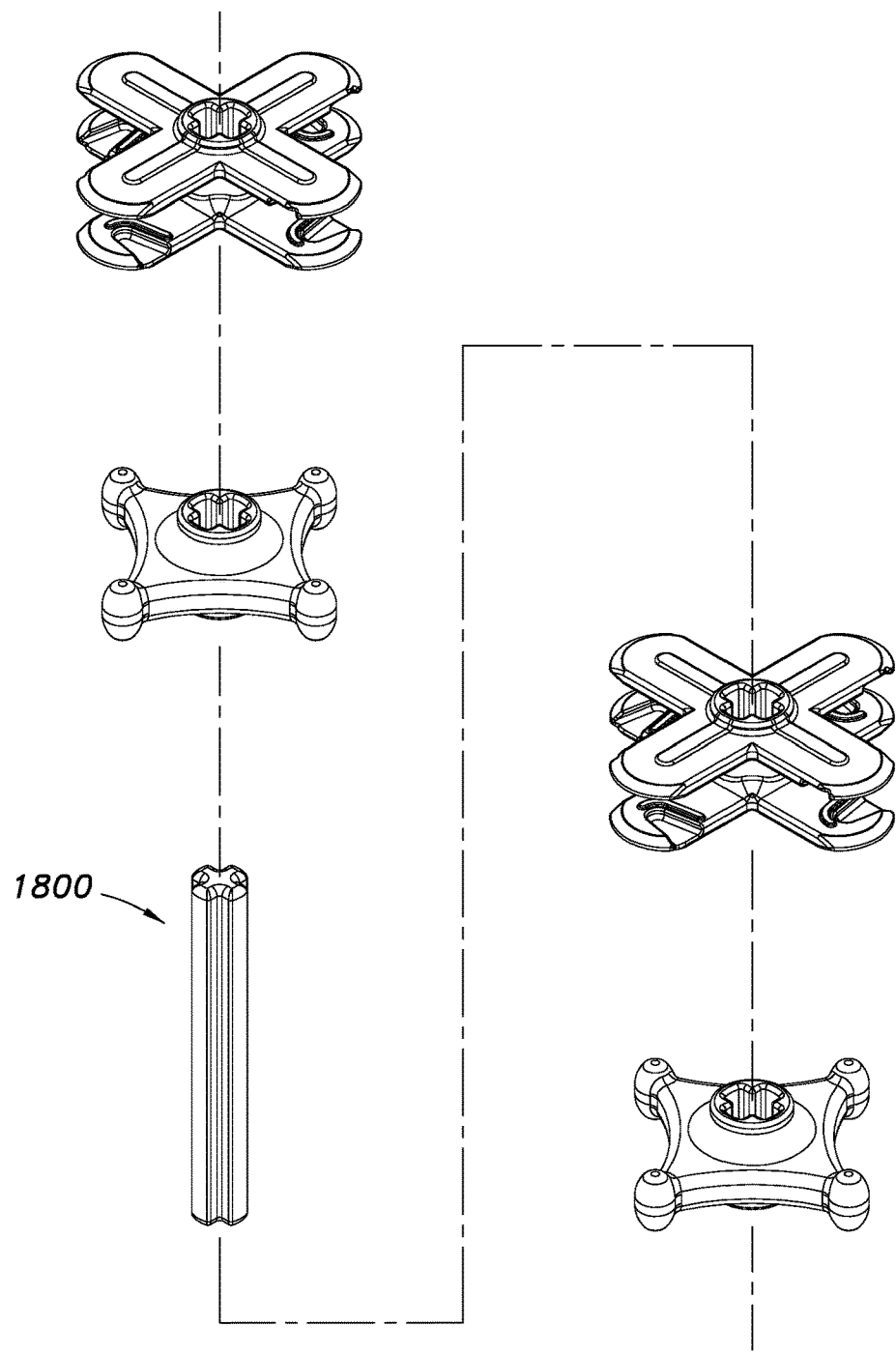

FIG. 181 shows an exploded view of the assembly of male and female hinge elements as shown in FIG. 180, and illustrates how assemblies or arrays of male and female connecting elements can be constructed in accordance with the present invention.

FIG. 182 is a front perspective view of a single connecting element with a dimensional plate connecting element for friction insertion into orifices located on planar elements, also referred to hereinbelow as a hermaphroditic connector.

FIG. 183 is a back perspective view of the same element as shown in FIG. 182.

FIG. 184 is a top view of the same element as shown in FIG. 182.

FIG. 185 is a bottom view of the same element as shown in FIG. 182.

FIG. 186 is a back view of the same element as shown in FIG. 182.

FIG. 187 is a front view of the same element as shown in FIG. 182.

FIG. 188 is a right side view of the same element as shown in FIG. 182.

FIG. 189 is a left side view of the same element as shown in FIG. 182.

Figure 190:
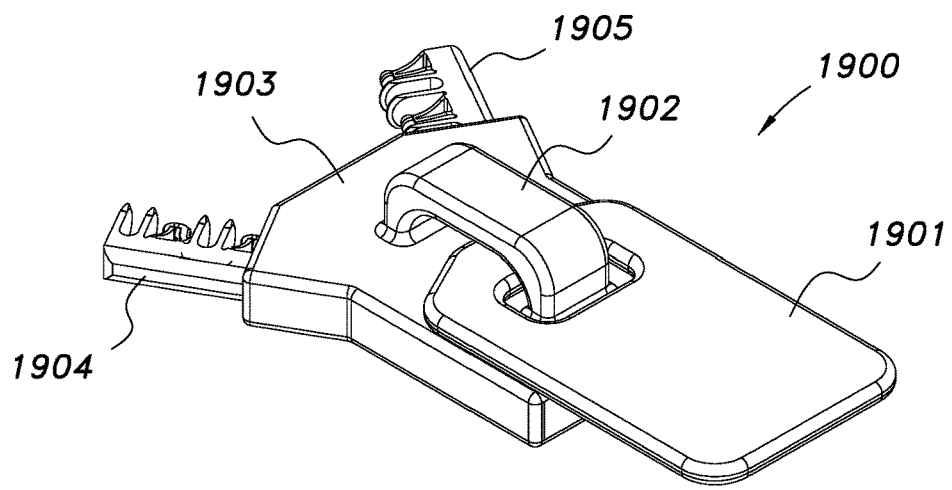

FIG. 190 shows a back perspective view of a zipper element comprising a "slider body" (pull-tab, crown, sliding body) and "molded teeth" (standard zipper nomenclature) incorporating the inventions hermaphroditic connecting elements as previously shown.

Figure 191:
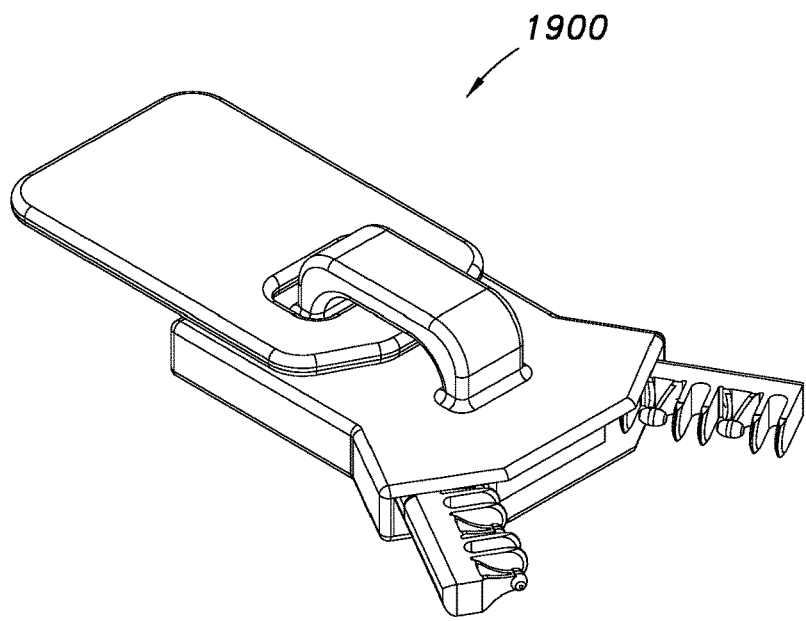

FIG. 191 shows a front perspective view of the same element as shown in FIG. 190.

Figure 192:
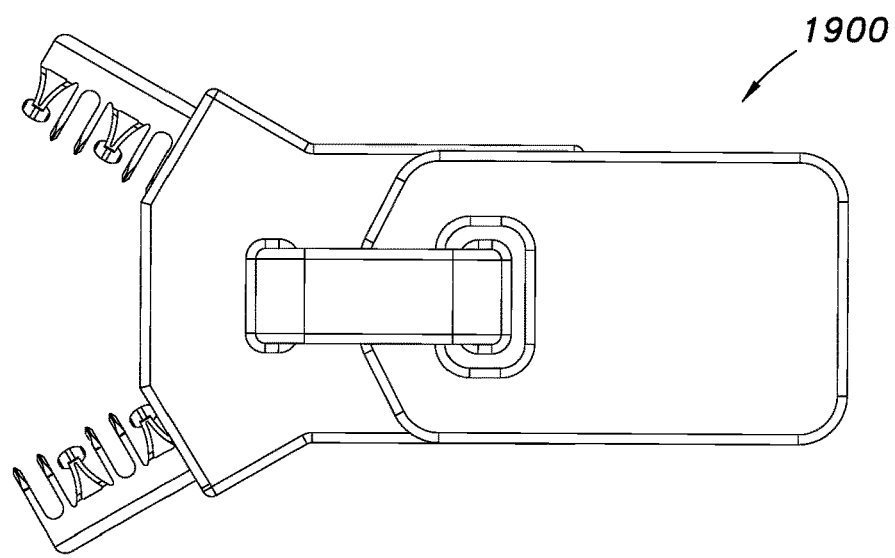

FIG. 192 shows a top view of the same element as shown in FIG. 190.

Figure 193:
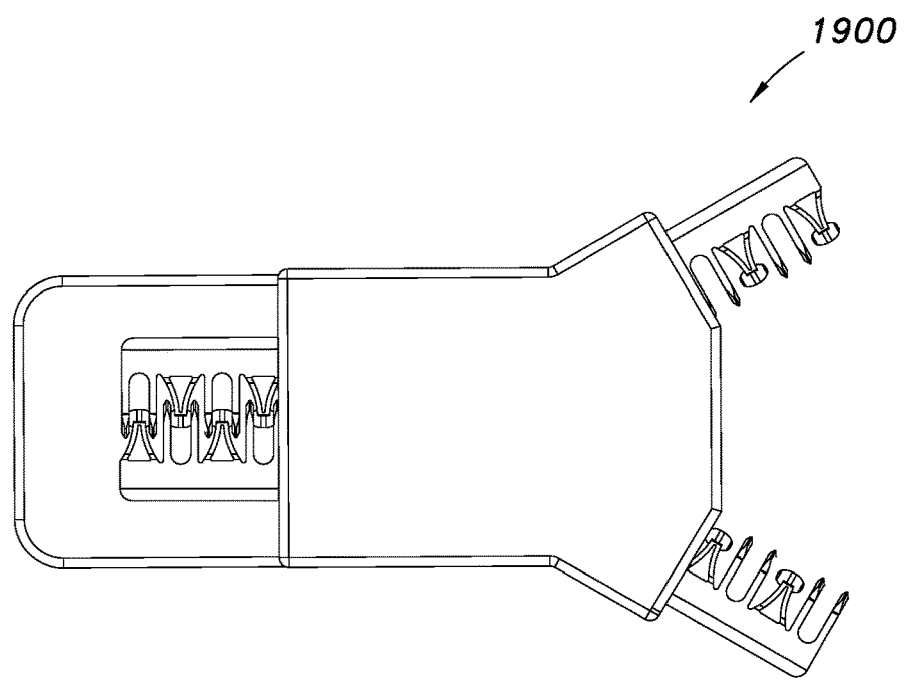

FIG. 193 shows a bottom view of the same element as shown in FIG. 190.

Figure 194:
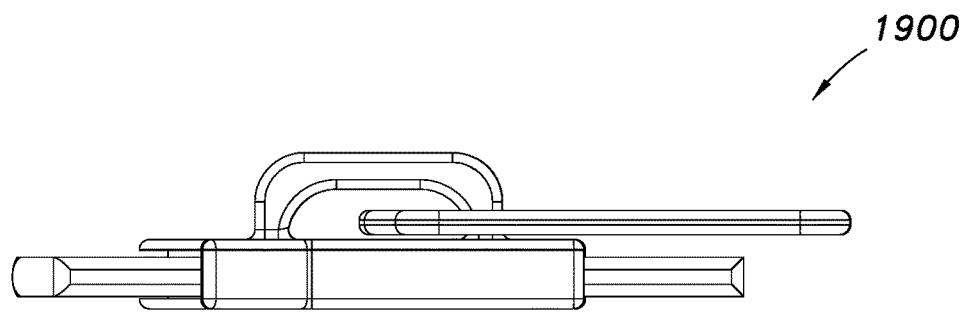

FIG. 194 shows side view of the same element as shown in FIG. 190.

Figure 195:
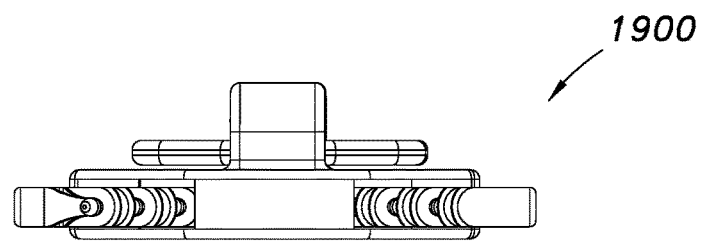

FIG. 195 shows a front view of the same element as shown in FIG. 190.

Figure 196:
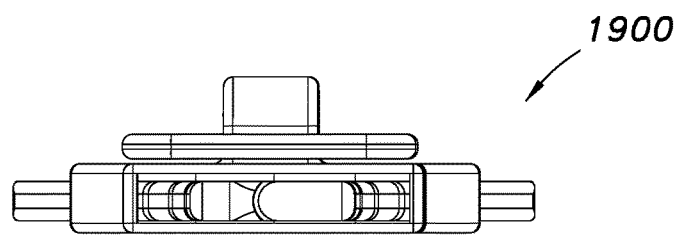

FIG. 196 shows a rear view of the element as shown in FIG. 190.

Figure 197:
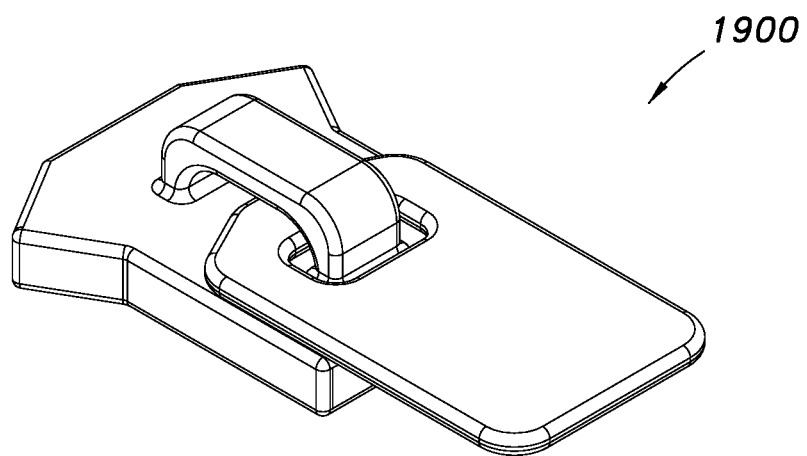

FIG. 197 shows a back perspective view of slider body element as shown in FIG. 190.

Figure 198:
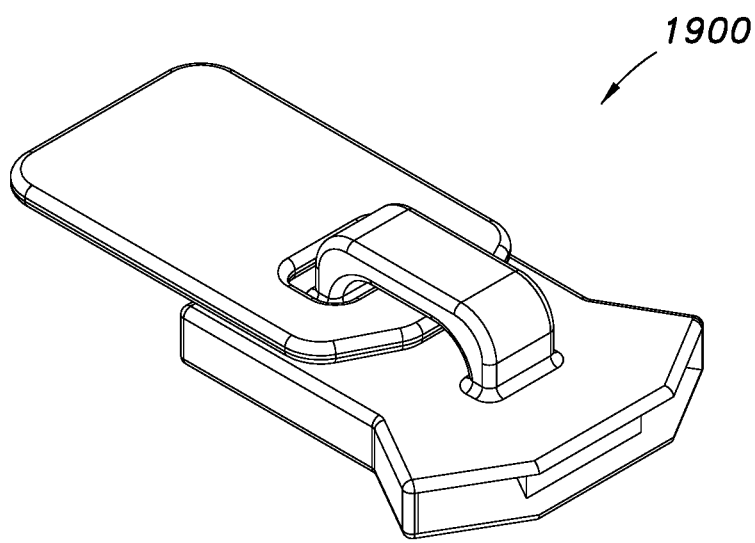

FIG. 198 shows a front perspective view of slider body element as shown in FIG. 190.

Figure 199:
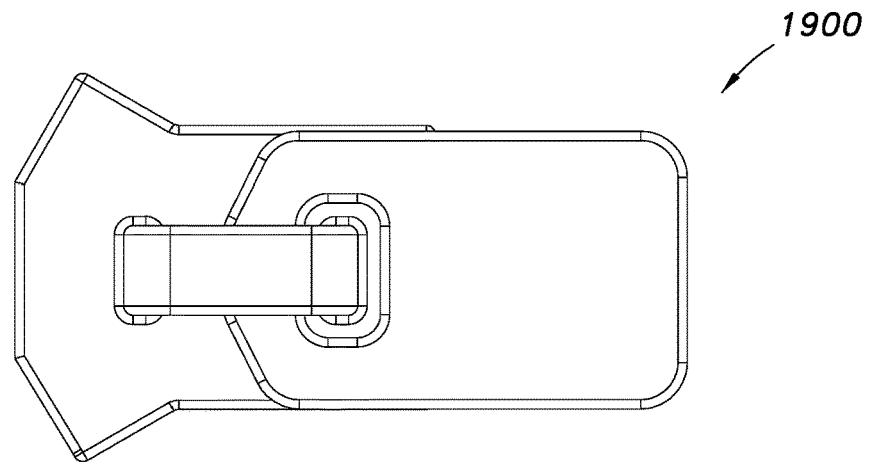

FIG. 199 shows a top view of slider body element as shown in FIG. 190.

Figure 200:
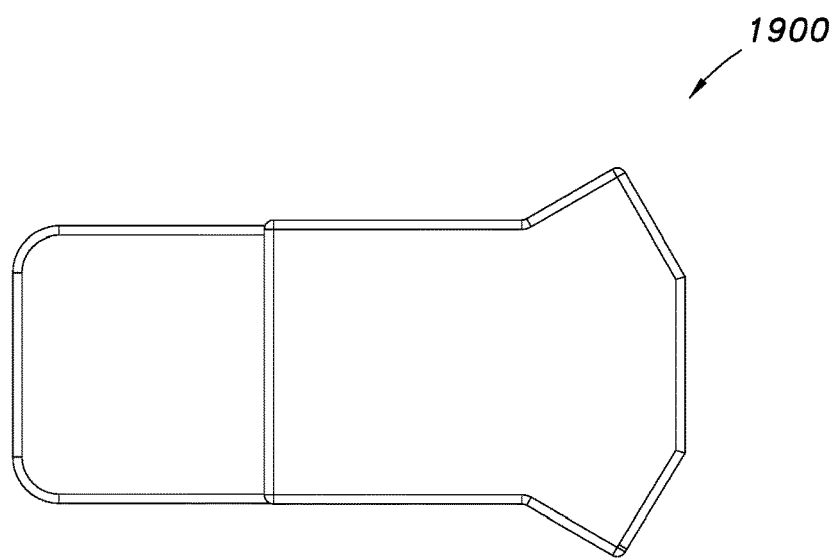

FIG. 200 shows a bottom view of slider body element as shown in FIG. 190.

Figure 201:
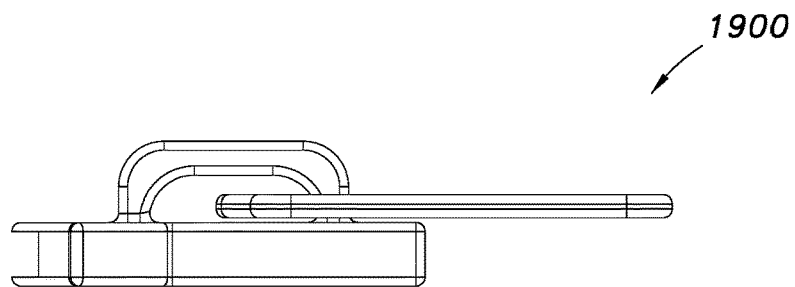

FIG. 201 shows a side view of slider body element as shown in FIG. 190.

Figure 202:
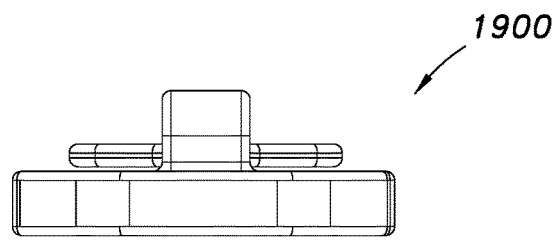

FIG. 202 shows a front view of slider body element as shown in FIG. 190.

Figure 203:
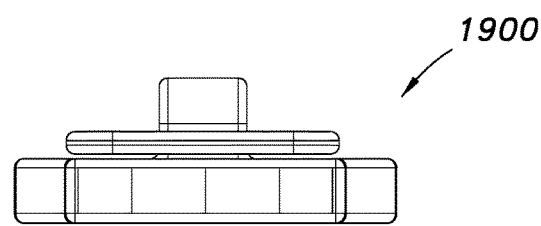

FIG. 203 shows a back view of slider body element as shown in FIG. 190.

Figure 204:
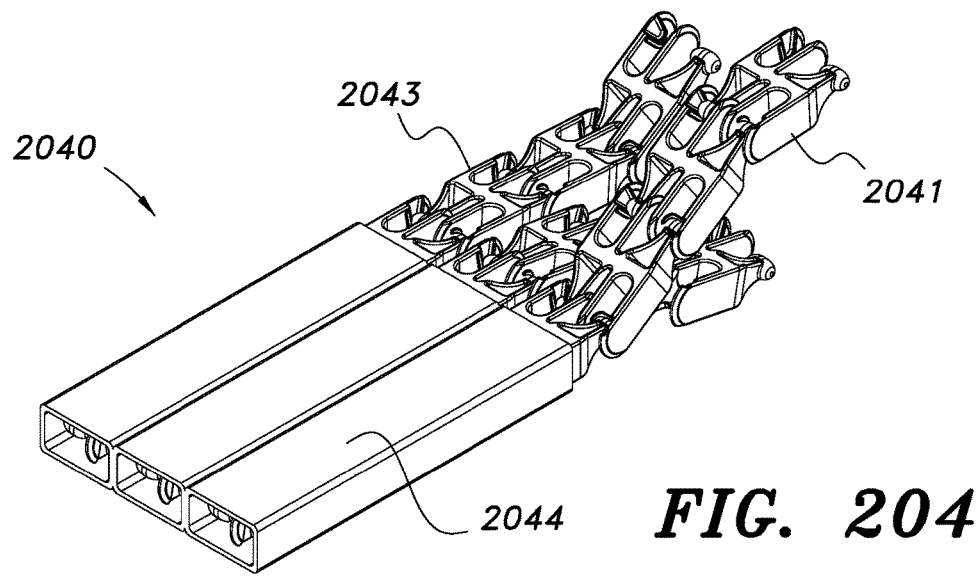

FIG. 204 shows a back perspective view of cable harness with insulation/external covered section and exposed un-insulated section.

Figure 205:
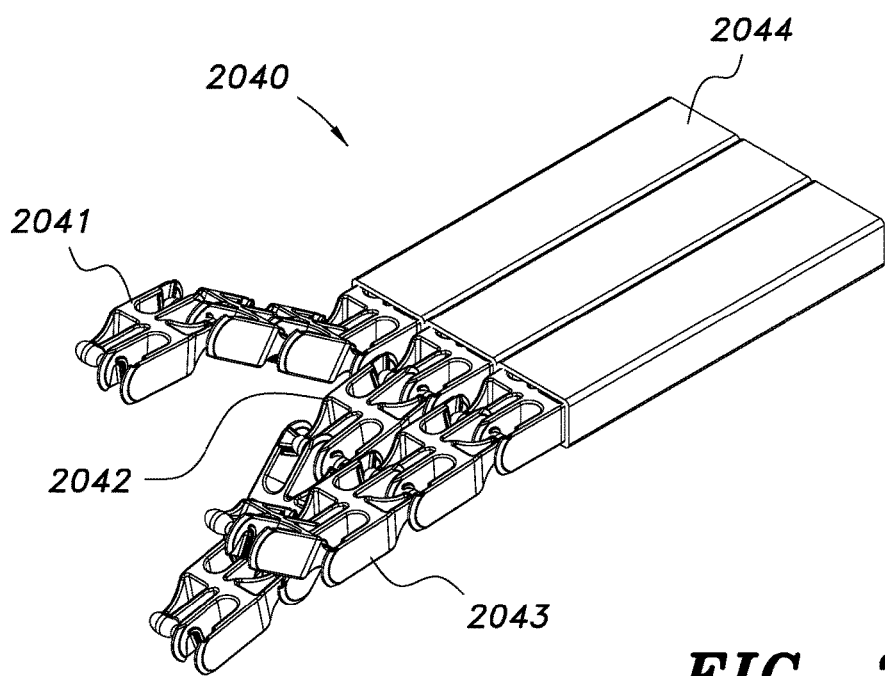

FIG. 205 shows a front perspective view of the same element shown in FIG. 204.

Figures 206, 207, 208:
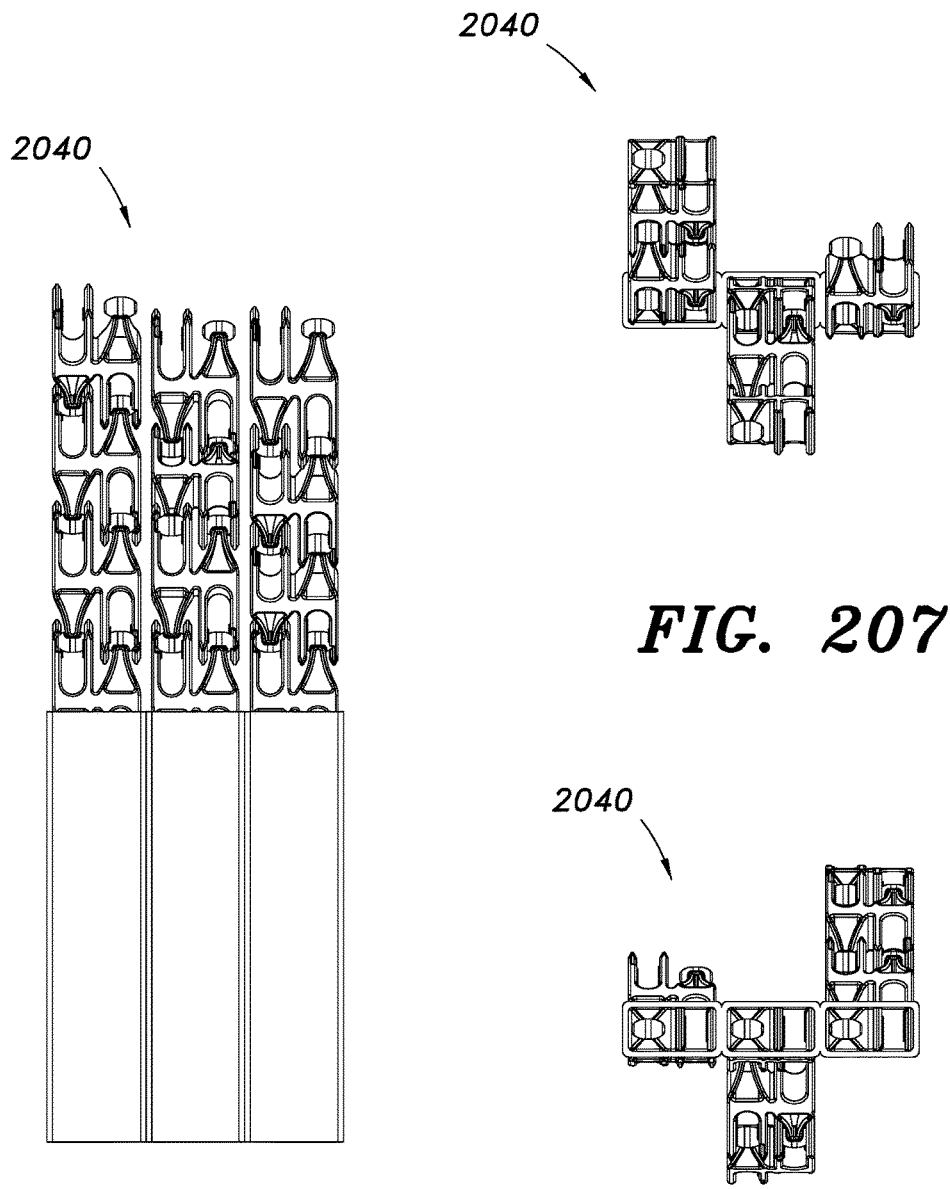

FIG. 206 shows a top view of cable harness with insulation/external covered section and exposed un-insulated section.

FIG. 207 shows a front view of cable harness with insulation/external covered section and exposed un-insulated section.

FIG. 208 shows a back view of cable harness with insulation/external covered section and exposed un-insulated section.

Figure 209:
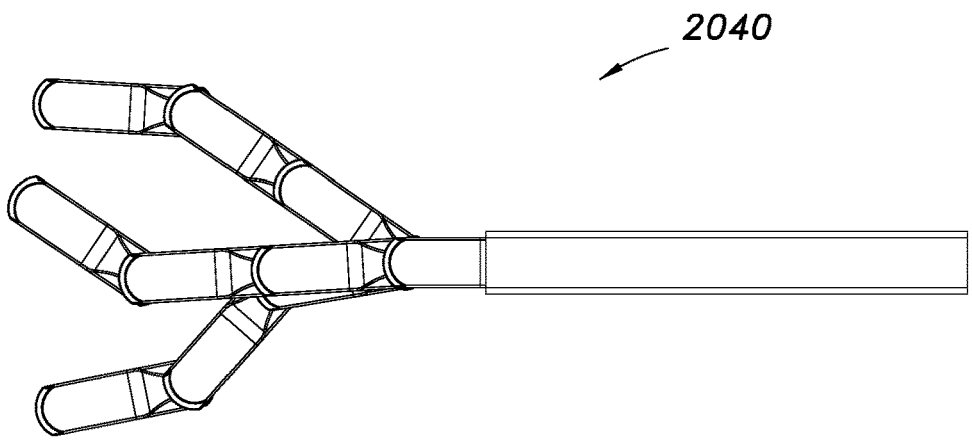

FIG. 209 shoes a left side view of cable harness with insulation/external covered section and exposed un-insulated section.

Figure 210:
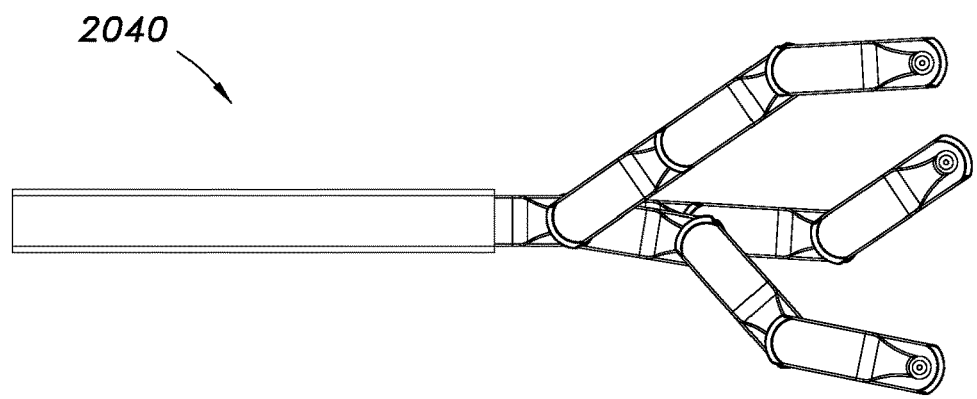

FIG. 210 shows a right side view of cable harness with insulation/external covered section and exposed un-insulated section.

Figure 211:
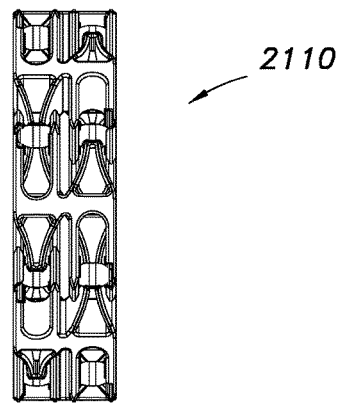

FIG. 211 shows a front overall view of a chain assembly configured into a flexible ring.

Figures 212, 213:
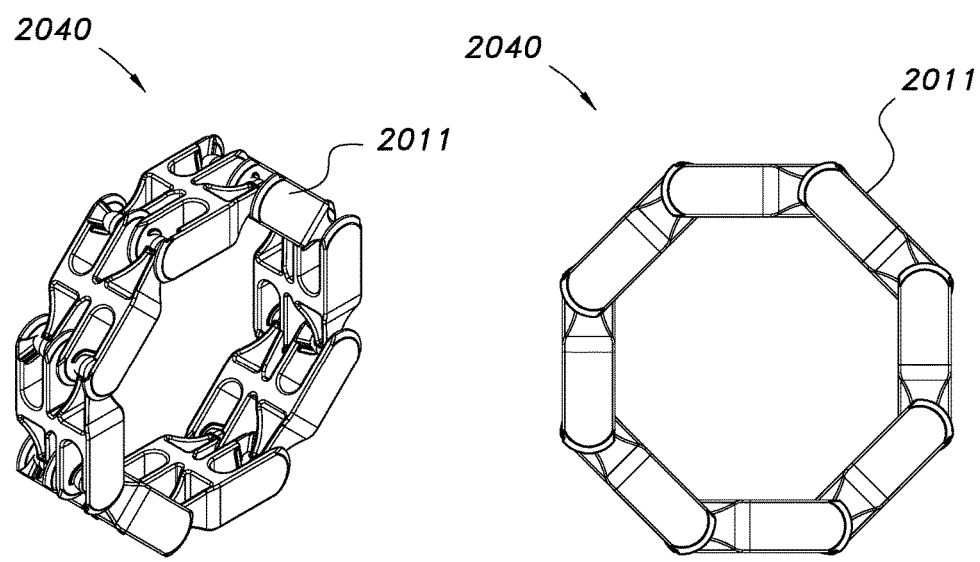

FIG. 212 shows a perspective view of the same element as shown in FIG. 211.

FIG. 213 shows a side view of the same element as shown in FIG. 211.

Figure 214:
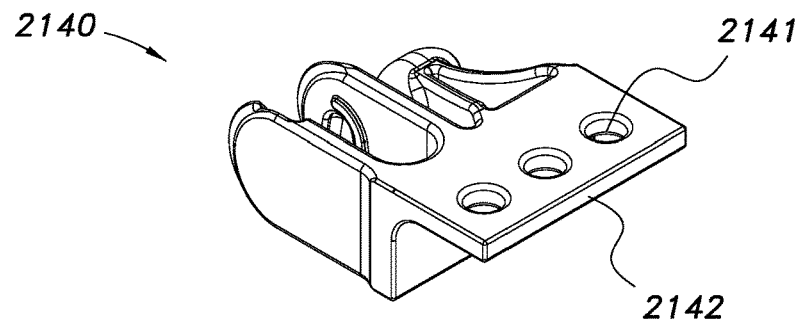

FIG. 214 shows a front perspective view of hinge element with a flange with orifices allowing for bolted, screwed, nailed, welded, or other attachments to surface elements.

Figure 215:
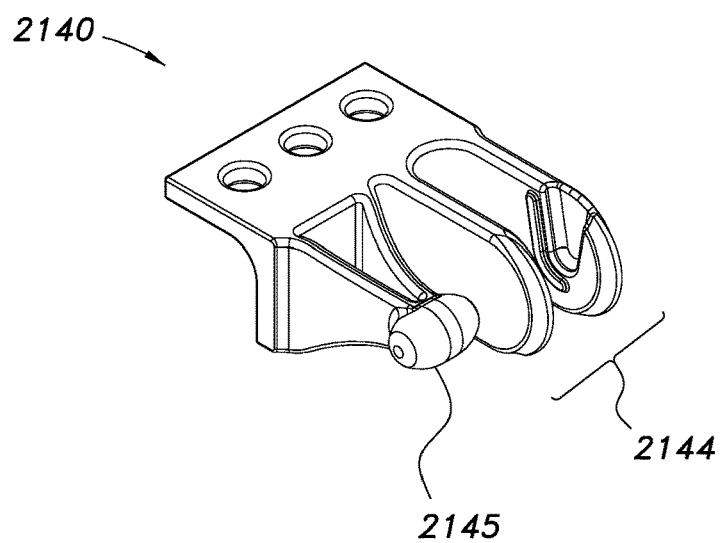

FIG. 215 shows a back perspective view of the same element as shown in FIG. 214.

Figure 216:
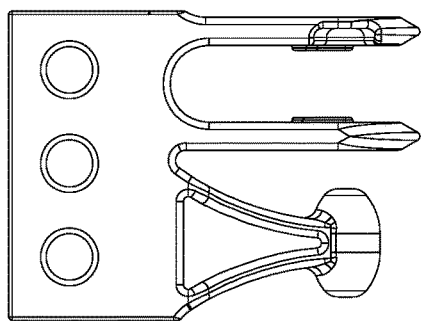

FIG. 216 shows a top view of the same element as shown in FIG. 214.

Figure 217:
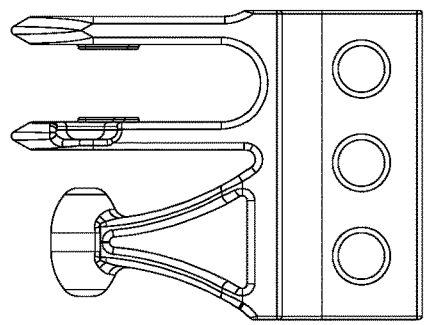

FIG. 217 shows a bottom view of the same element as shown in FIG. 214.

FIG. 218 shows a front view of the same element as shown in FIG. 214.

FIG. 219 shows a back view of the same element as shown in FIG. 214.

FIG. 220 shows the left view of the same element as shown in FIG. 214.

FIG. 221 shows the right view of the same element as shown in FIG. 214.

Figure 222:
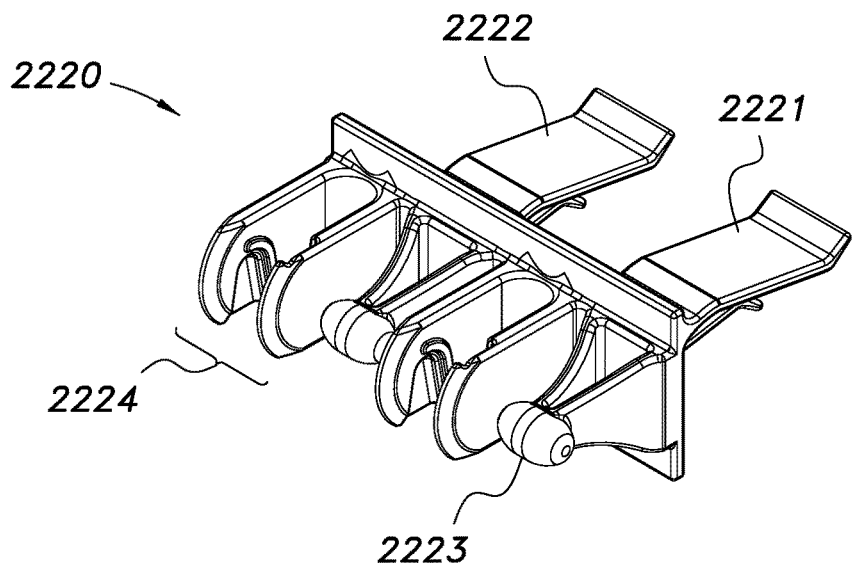

FIG. 222 shows a front perspective view of a hinge element incorporating a "clip" element for application along panels, boards, windows, plates, or any element commensurate with the embodiment of the invention.

Figure 223:
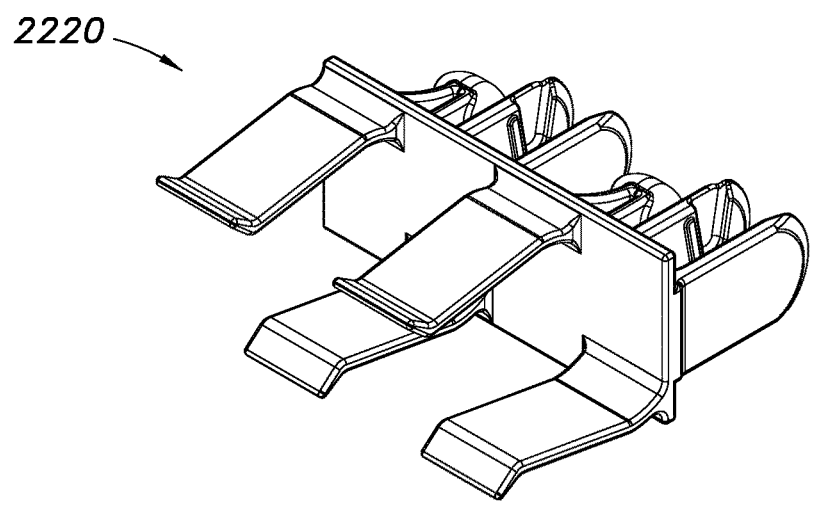

FIG. 223 shows a back perspective view of the same element as shown in FIG. 222.

Figure 224:
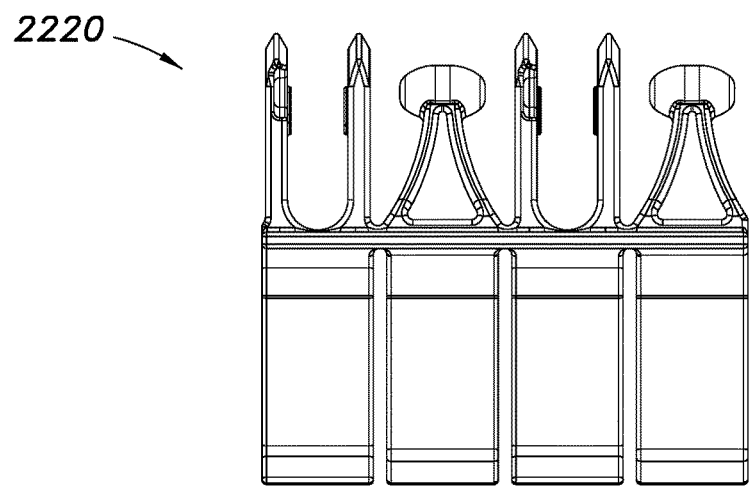

FIG. 224 shows a top view of the same element as shown in FIG. 222.

Figure 225:
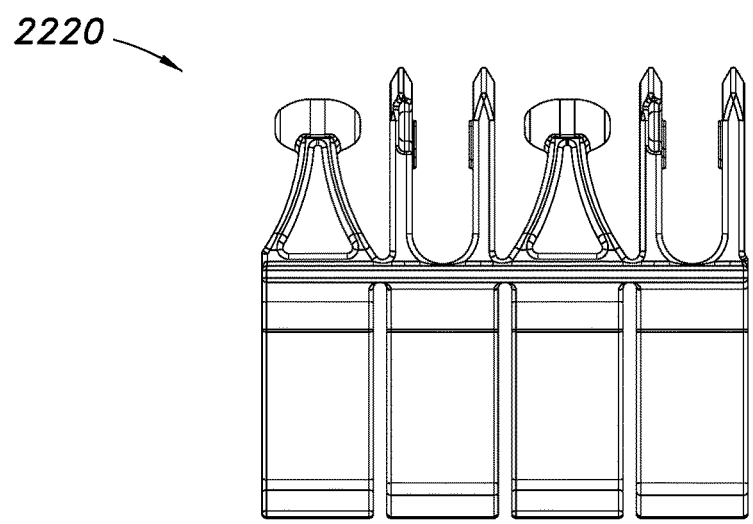

FIG. 225 shows a bottom view of the same element as shown in FIG. 222.

FIG. 226 shows a front view of the same element as shown in FIG. 222.

FIG. 227 shows a back view of the same element as shown in FIG. 222.

FIG. 228 shows a left side view of the same element as shown in FIG. 222.

FIG. 229 shows a right view of the same element as shown in FIG. 222.

Figure 230:
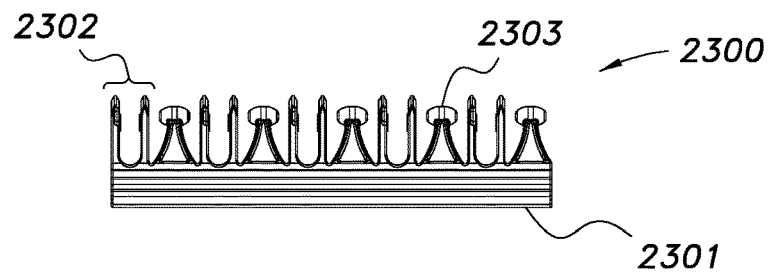

FIG. 230 shows a top view of a hinge element with a sliding element compatible with "T-slot structure" framing elements.

Figure 231:
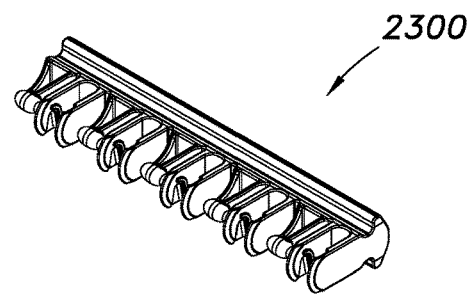

FIG. 231 shows a front perspective view of the same element as shown in FIG. 230.

Figure 232:
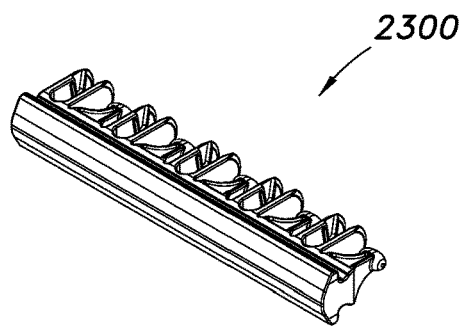

FIG. 232 shows a back perspective view of the same element as shown in FIG. 230.

Figure 233:
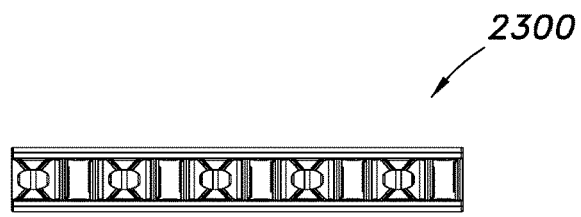

FIG. 233 shows a front view of the same element as shown in FIG. 230.

Figure 234:
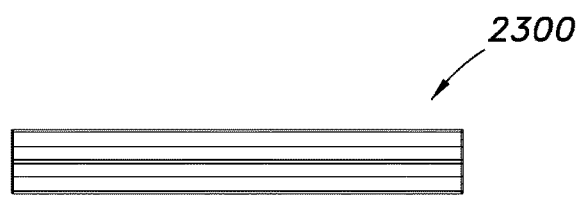

FIG. 234 shows a back view of the same element as shown in FIG. 230.

Figures 235, 236:

FIG. 235 shows a left view of the same element as shown in FIG. 230.

FIG. 236 shows a right view of the same element as shown in FIG. 230.

FIG. 237 shows side view of a t-slot structure compatible with the element shown in FIG. 230.

FIG. 238 shows a top view of a t-slot structure compatible with the element shown in 237.

FIG. 239 shows a perspective view of a t-slot structure compatible with the element shown in FIG. 237.

Figures 240, 241:
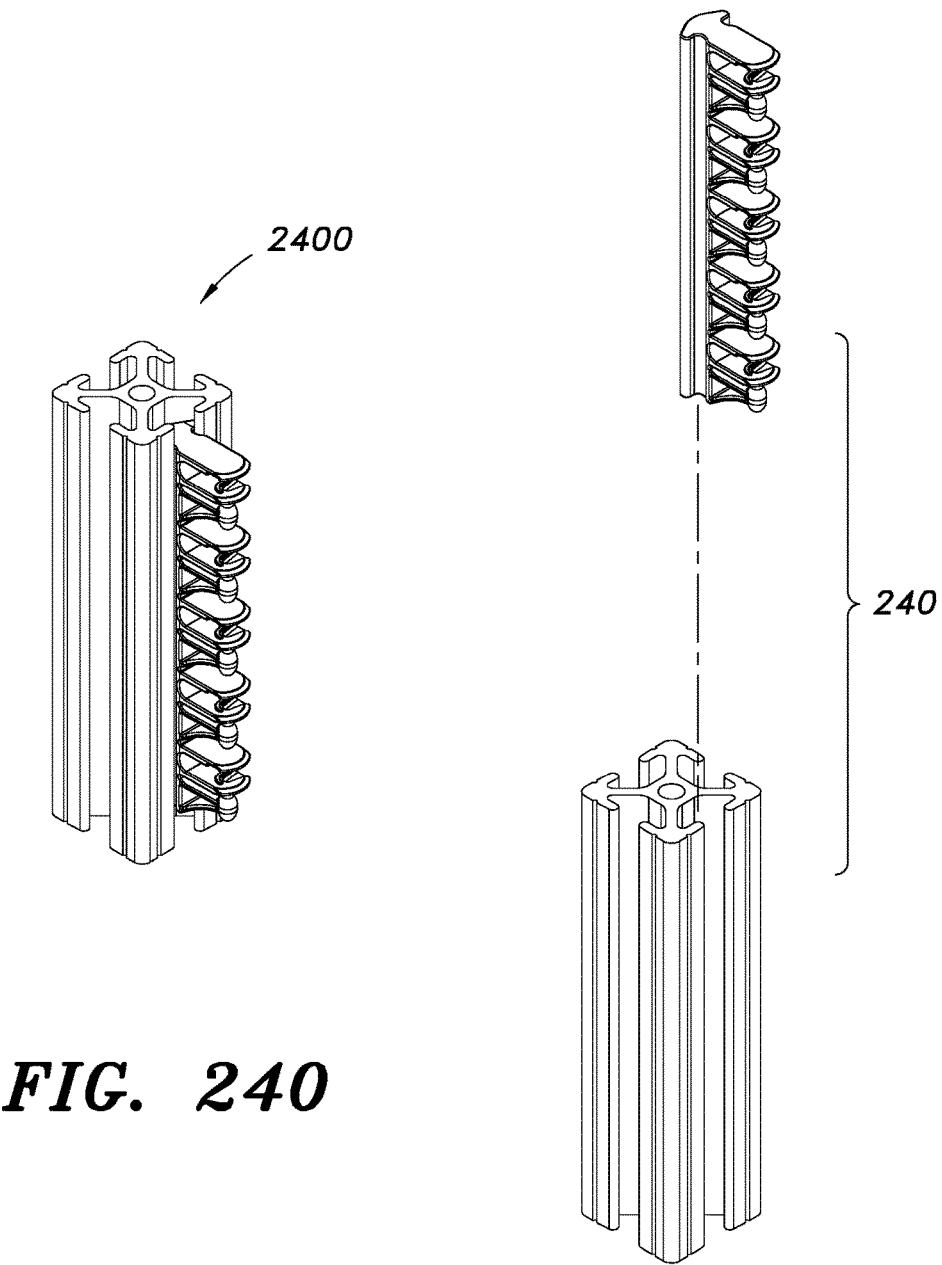

FIG. 240 shows a perspective view of an assemblage of both a t-slot structure and hinge element shown in FIG. 237.

FIG. 241 shows an exploded view of the same elements as shown in FIG. 237.

Figure 242:
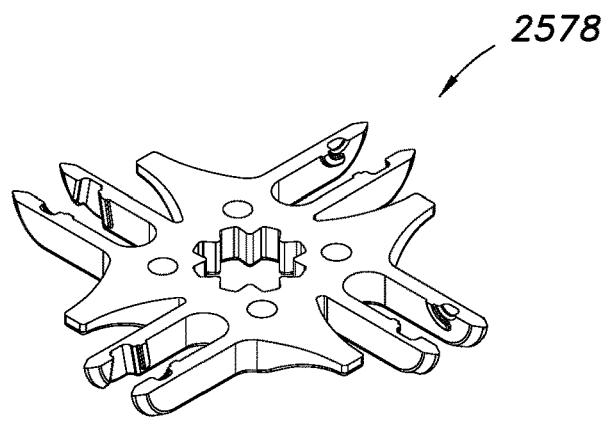
Figure 256:
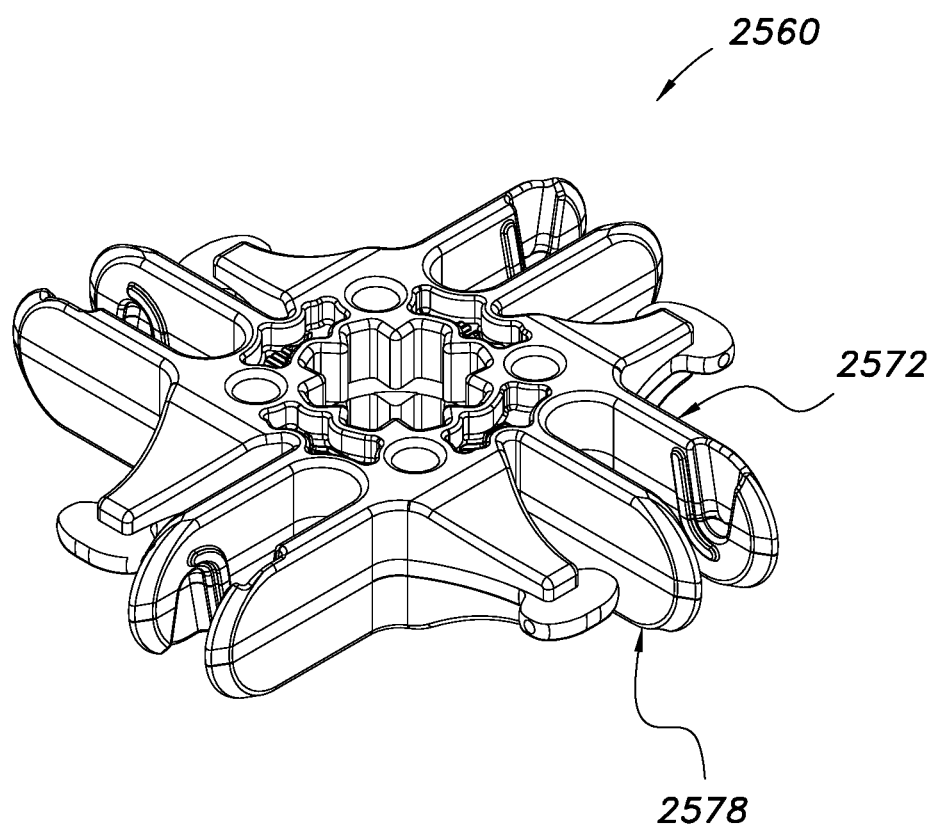

FIG. 242 shows a perspective view of the bottom portion of the electrically conductive square planar element as shown in FIG. 256.

Figure 243:
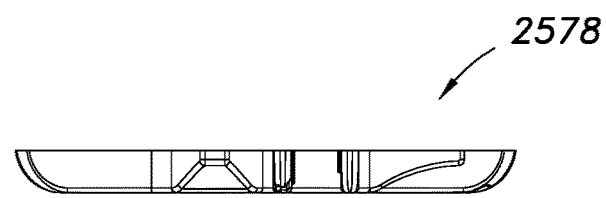

FIG. 243 shows side view of same element as shown in FIG. 242.

Figure 244:
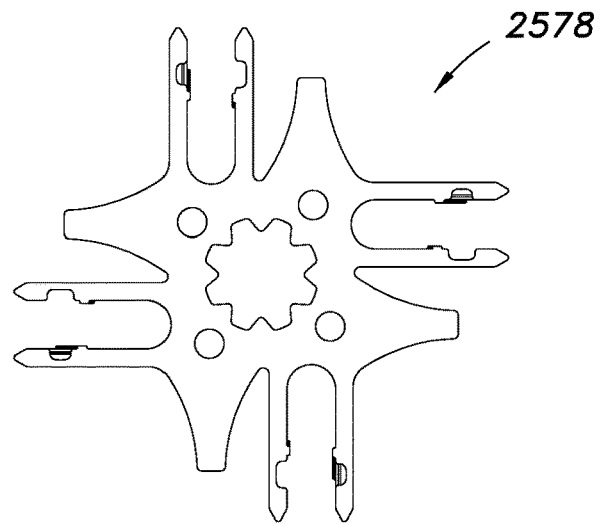

FIG. 244 shows top view of same element as shown in FIG. 242.

Figure 245:
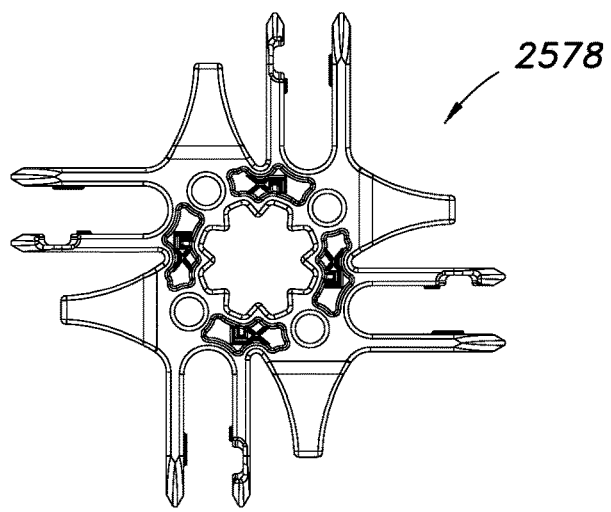

FIG. 245 shows bottom view of same element as shown in FIG. 242.

Figure 246:
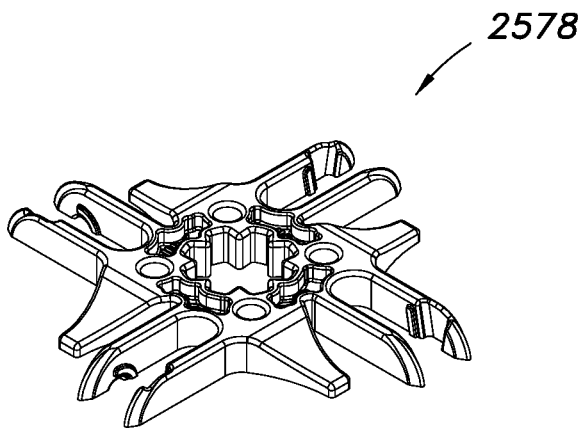

FIG. 246 shows a top perspective view of the same element as shown in FIG. 242 showing the exterior portion on top.

Figure 247:
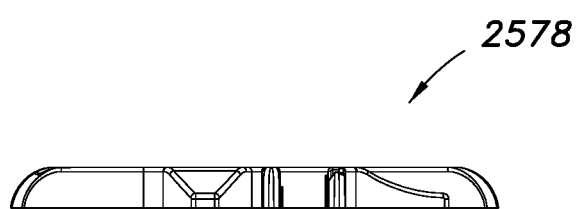

FIG. 247 shows a side view of same element as shown in FIG. 242.

Figure 248:
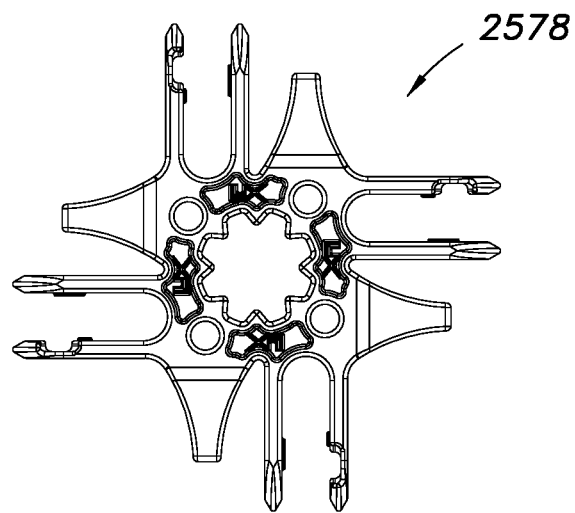

FIG. 248 shows a top view of same element as shown in FIG. 242.

Figure 249:
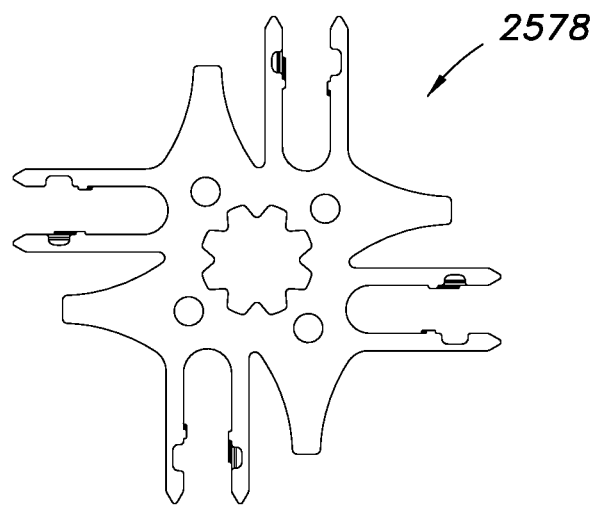

FIG. 249 shows a bottom view of same element as shown in FIG. 242.

Figure 250:
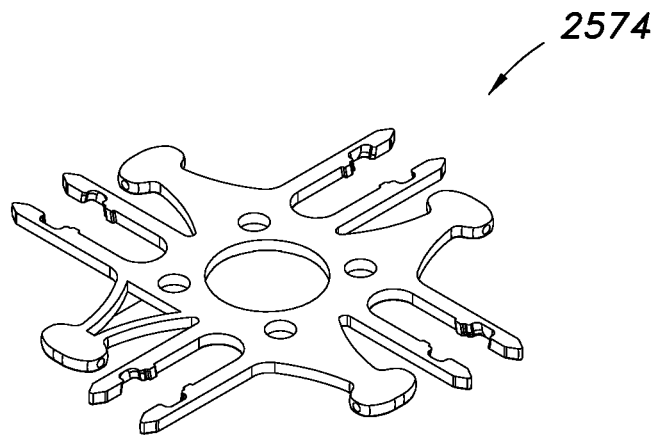

FIG. 250 shows a perspective view of the center section of the element shown in FIG. 256.

Figure 251:

FIG. 251 shows a side view of the same element as that shown in FIG. 250.

Figure 252:
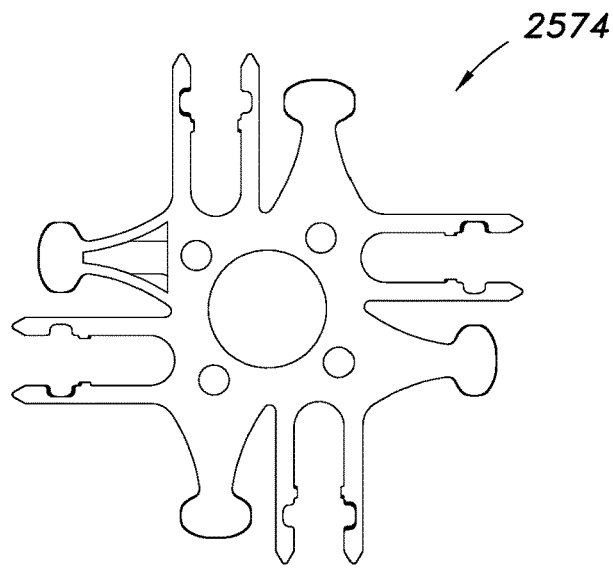

FIG. 252 shows a top view of the same element as that shown in FIG. 250.

Figure 253:
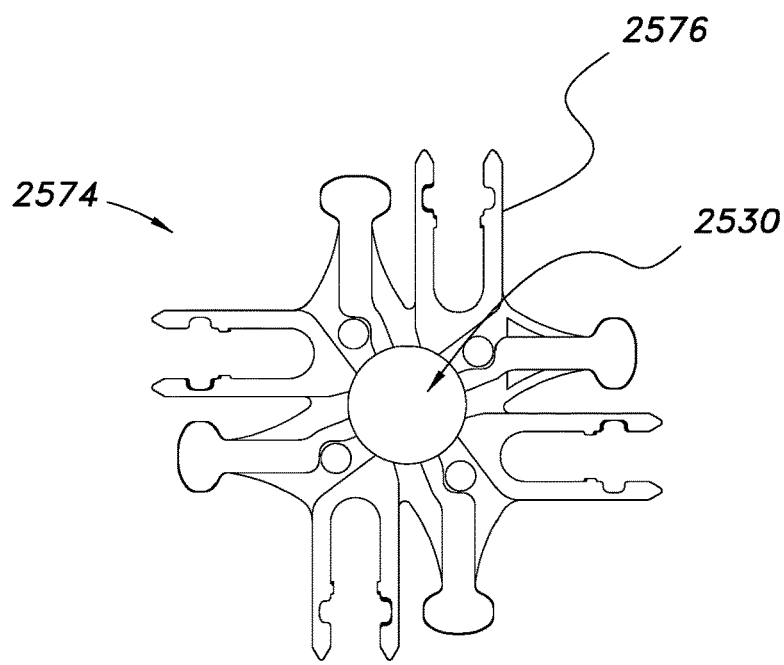

FIG. 253 shows a bottom view of the same element as that shown in FIG. 250.

Figure 254:
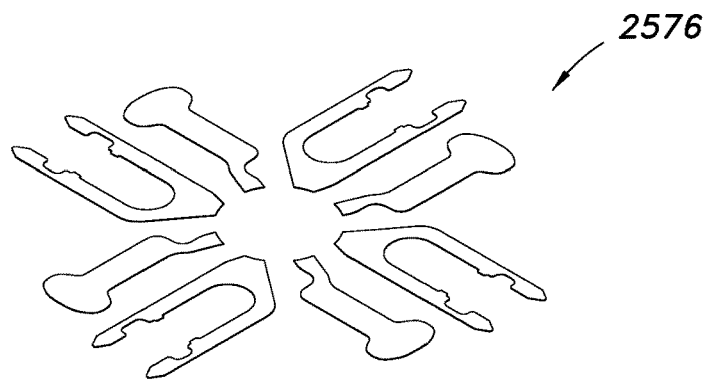

FIG. 254 shows a perspective view of the conducting elements of the circuit board shown in FIG. 253.

Figure 255:
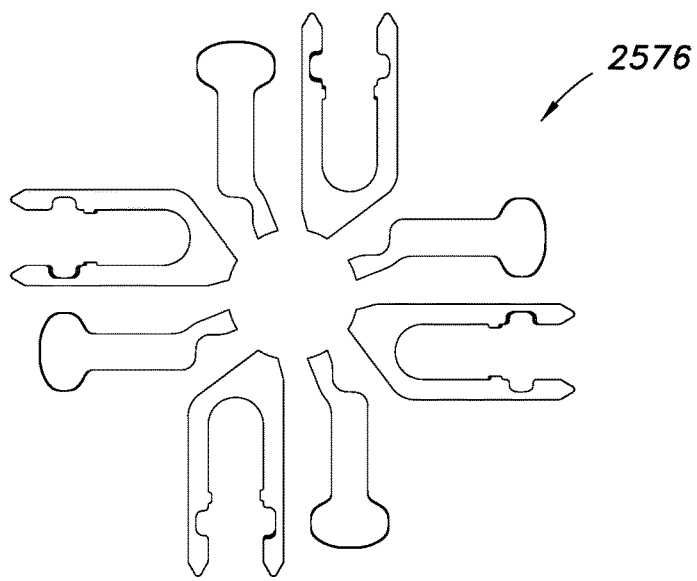

FIG. 255 shows a top view of the same elements shown in FIG. 254.

FIG. 256 shows a perspective view of the electrical junction/component housing square planar hinged element.

Figure 257:
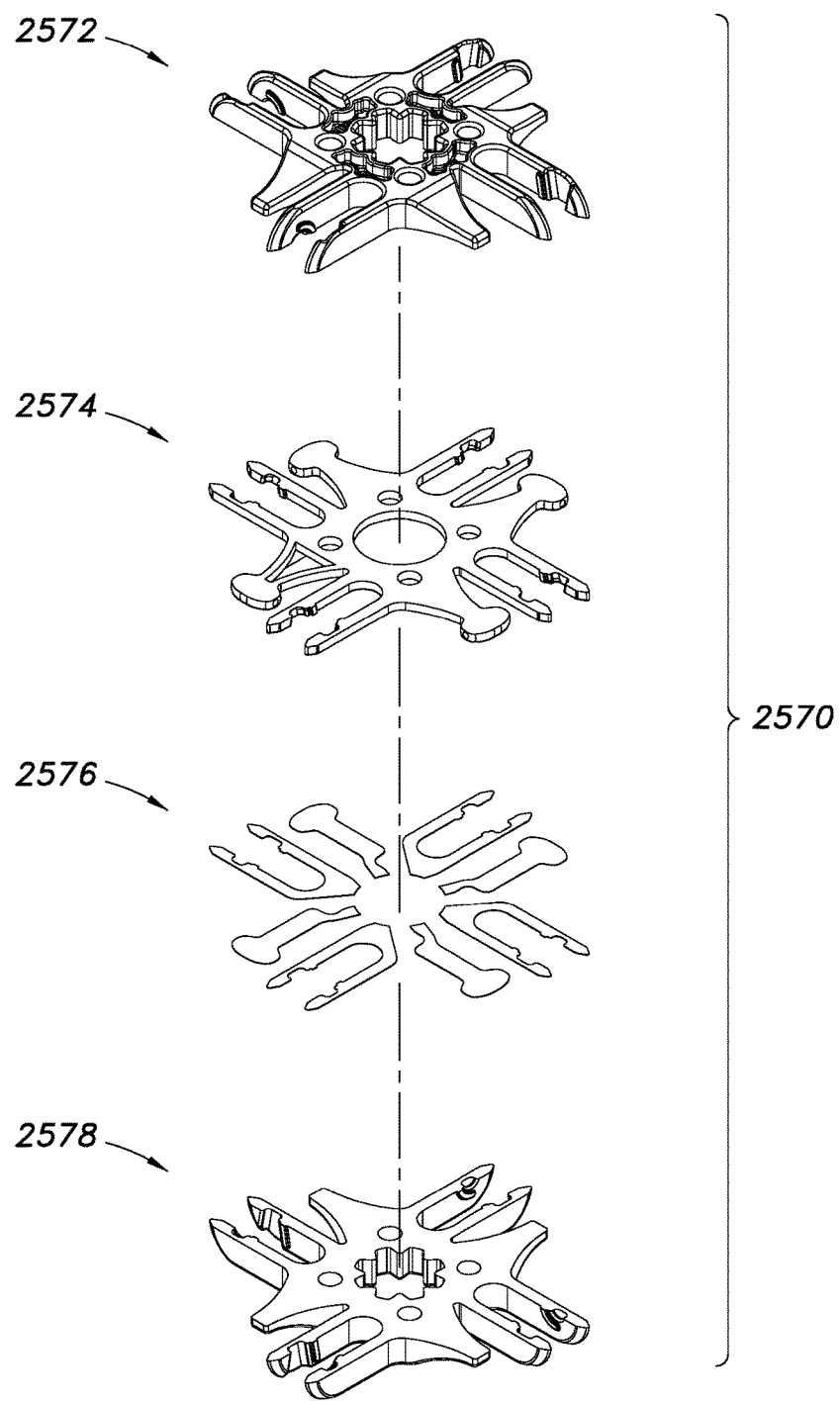

FIG. 257 shows a perspective exploded view of the element in FIG. 256.

FIG. 258 shows a top view of the junction hub inserted into the center section/orifice of the electric junction/component housing planar element as shown in FIG. 256.

FIG. 259 is a side view of the same element shown in FIG. 258.

FIG. 260 is a perspective view of the same element shown in FIG. 258.

Figure 261:
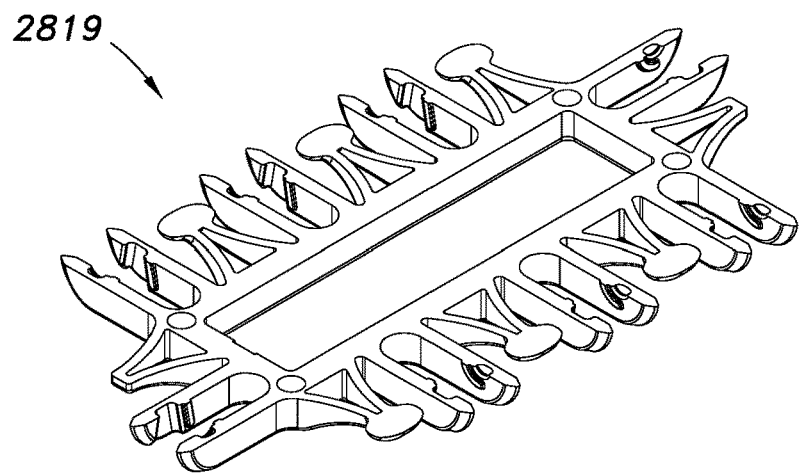
Figure 280:
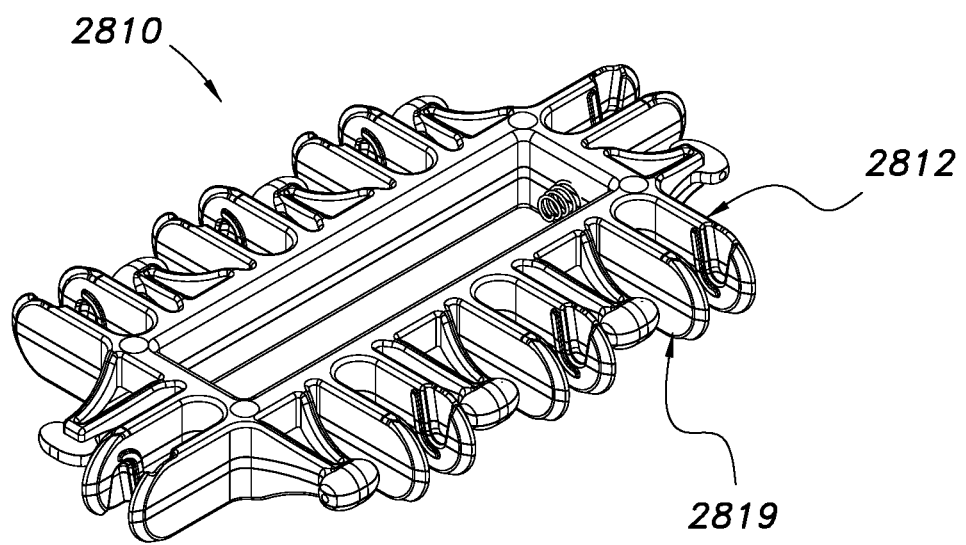

FIG. 261 is a perspective view of the bottom section of the battery/electrical component housing rectangular planar element shown in FIG. 280.

Figure 262:
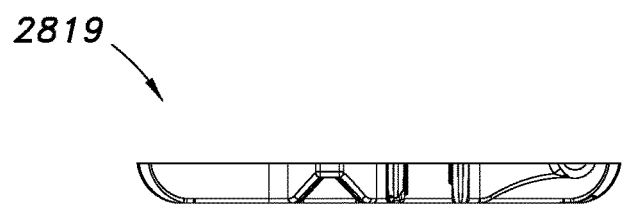

FIG. 262 is a side view of the same element shown in FIG. 280.

Figure 263:
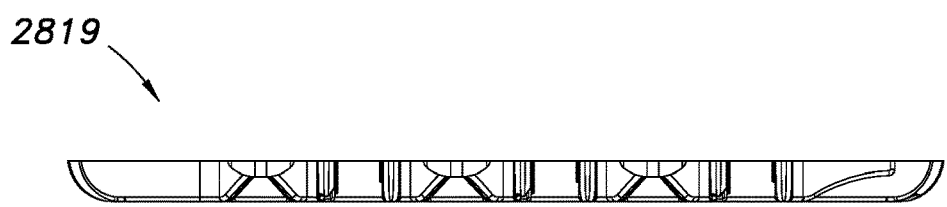

FIG. 263 is a front back view of the same element shown in FIG. 100 and in FIG. 280.

Figure 264:
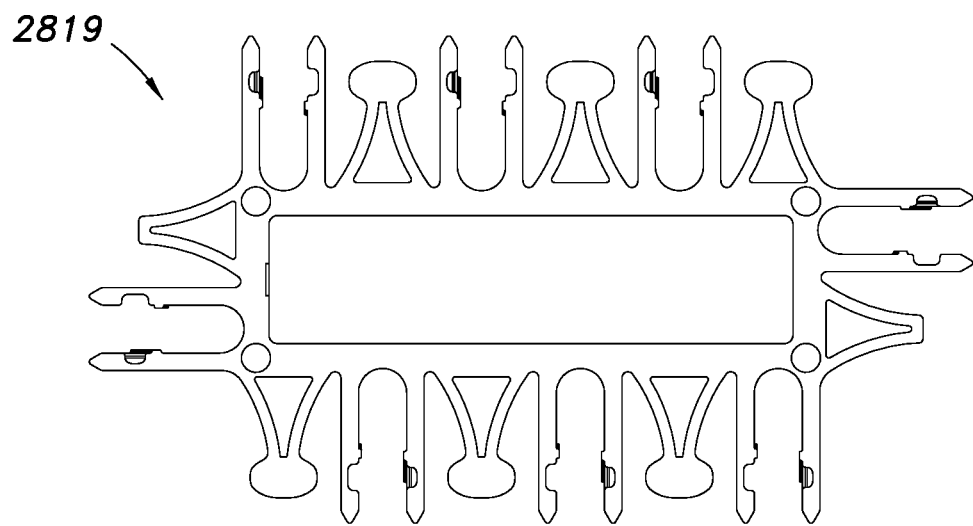

FIG. 264 is a top view of the same element shown in FIG. 280.

Figure 265:
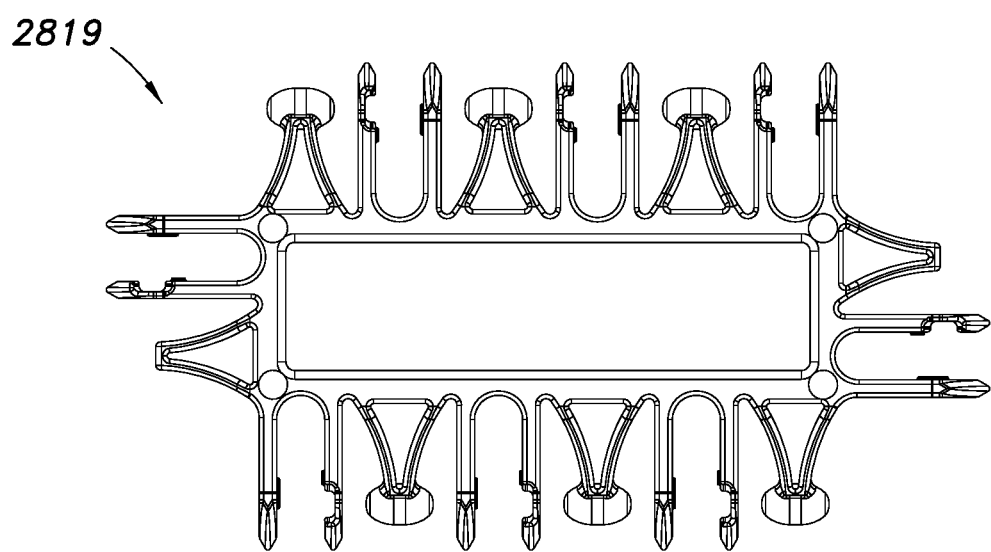

FIG. 265 is a bottom view of the same element shown in FIG. 280.

Figure 266:
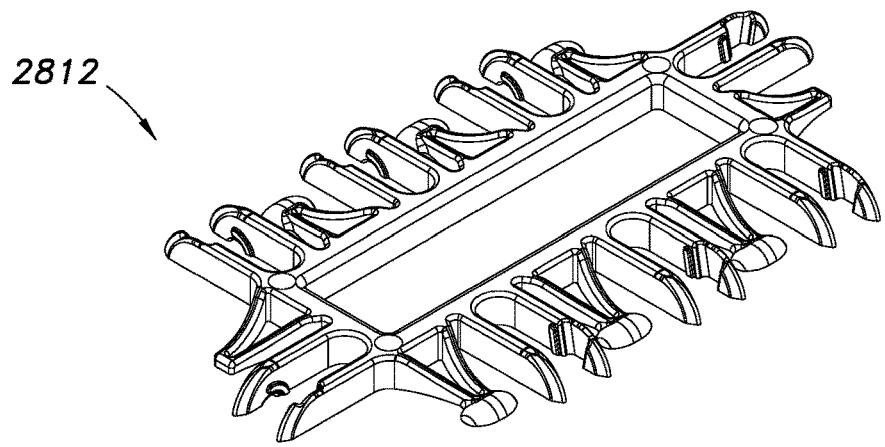

FIG. 266 is a perspective view of the top section of a battery housing rectangular planar element shown in FIG. 280.

Figure 267:
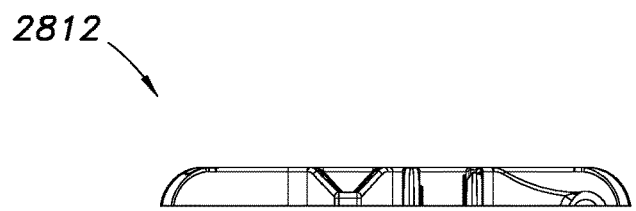

FIG. 267 is a side view of the same element as shown in FIG. 280.

Figure 268:
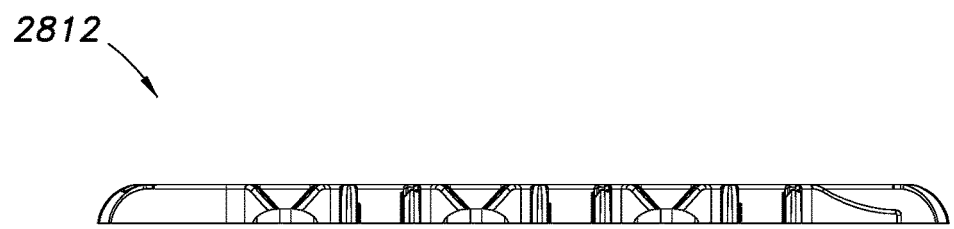

FIG. 268 is a front and back of the same element as shown in FIG. 280.

Figure 269:
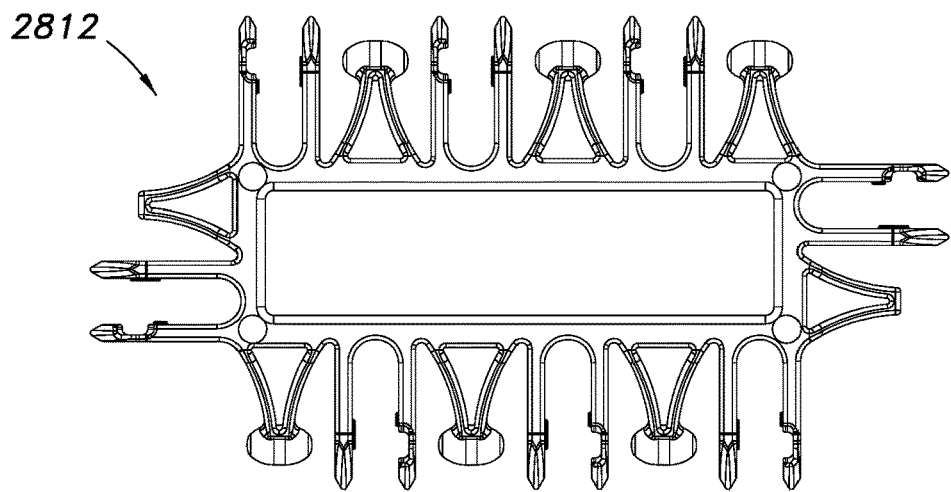

FIG. 269 is a top of the same element as shown in FIG. 280.

Figure 270:
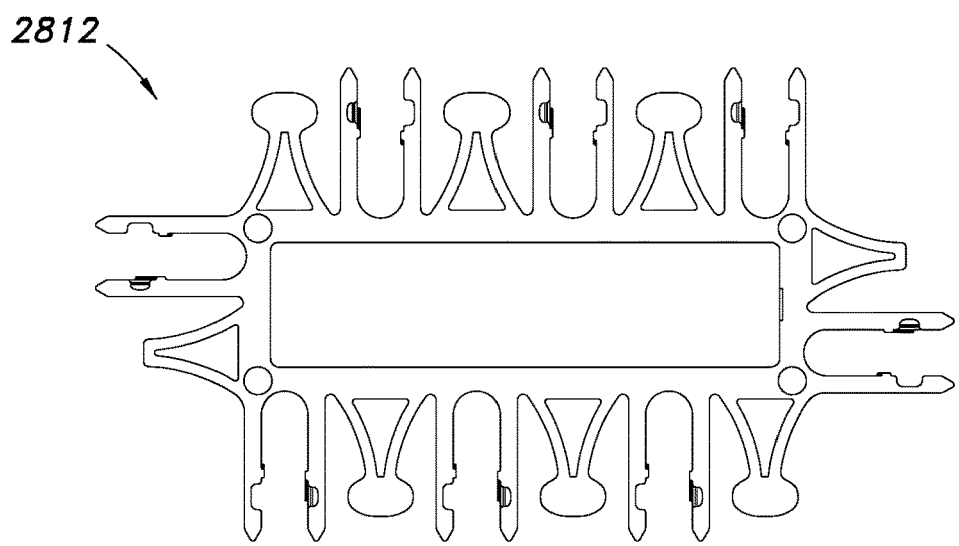

FIG. 270 is a bottom of the same element as shown in FIG. 280.

Figure 271:
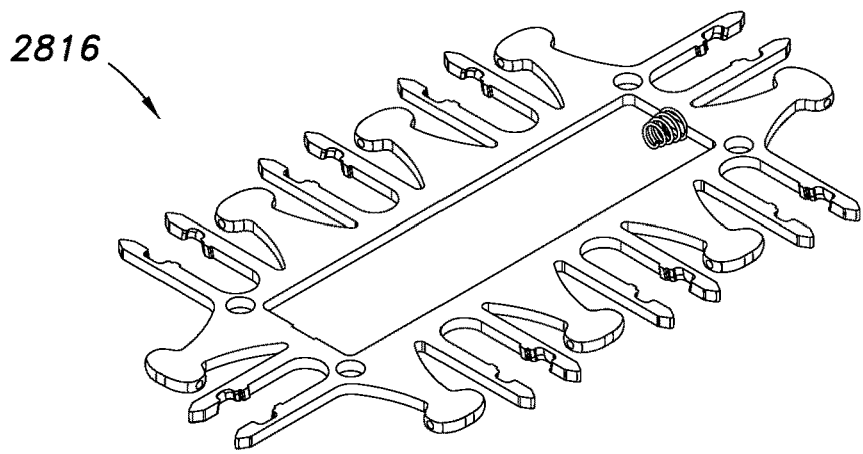

FIG. 271 is a top perspective view of the center section conducting element circuit board of element shown in FIG. 280.

Figure 272:
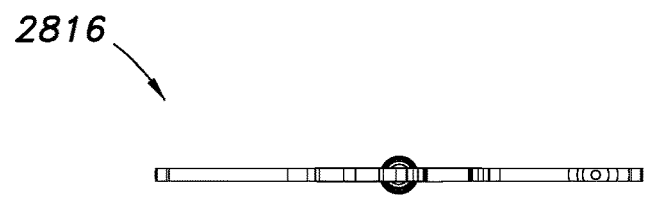

FIG. 272 is a side view of the same element as shown in FIG. 271.

Figure 273:

FIG. 273 is a front and back view of the same element in FIG. 271.

Figure 274:
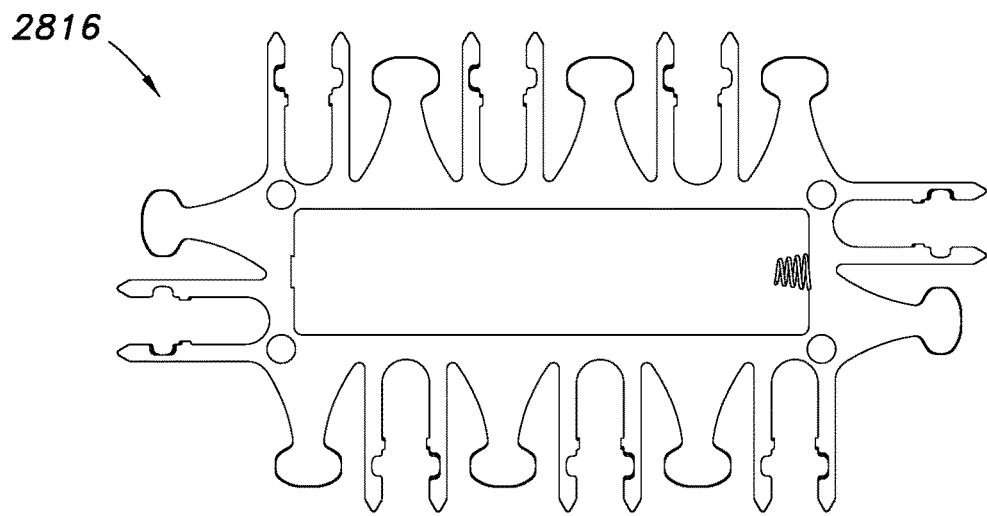

FIG. 274 is a top view of the same element as in FIG. 271.

Figure 275:
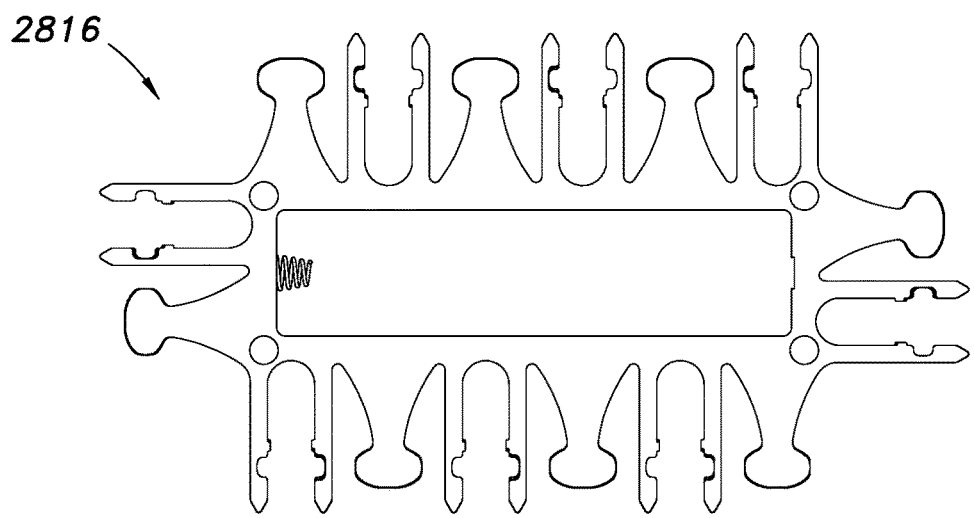

FIG. 275 is a bottom view of the same element shown in FIG. 280.

Figure 276:
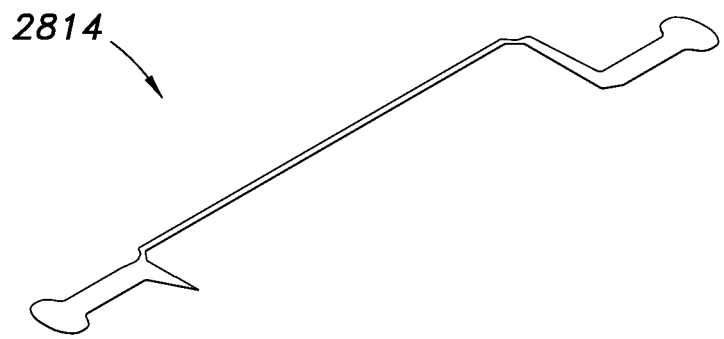

FIG. 276 is a perspective view of a "male" conducting element illustrated in FIG. 280.

Figure 277:

FIG. 277 is a top view of the same element as shown in FIG. 276.

Figure 278:
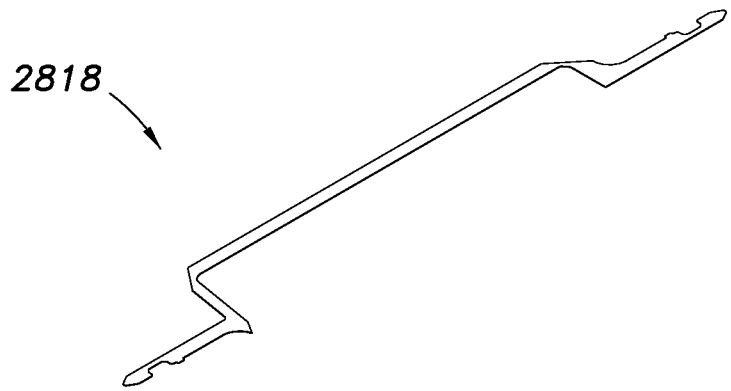

FIG. 278 is a perspective view of a "female" conducting element illustrated in FIG. 280.

Figure 279:

FIG. 279 is a top view of the same element shown in FIG. 278.

FIG. 280 is a perspective view of the rectangular battery/electrical component housing.

Figure 281:
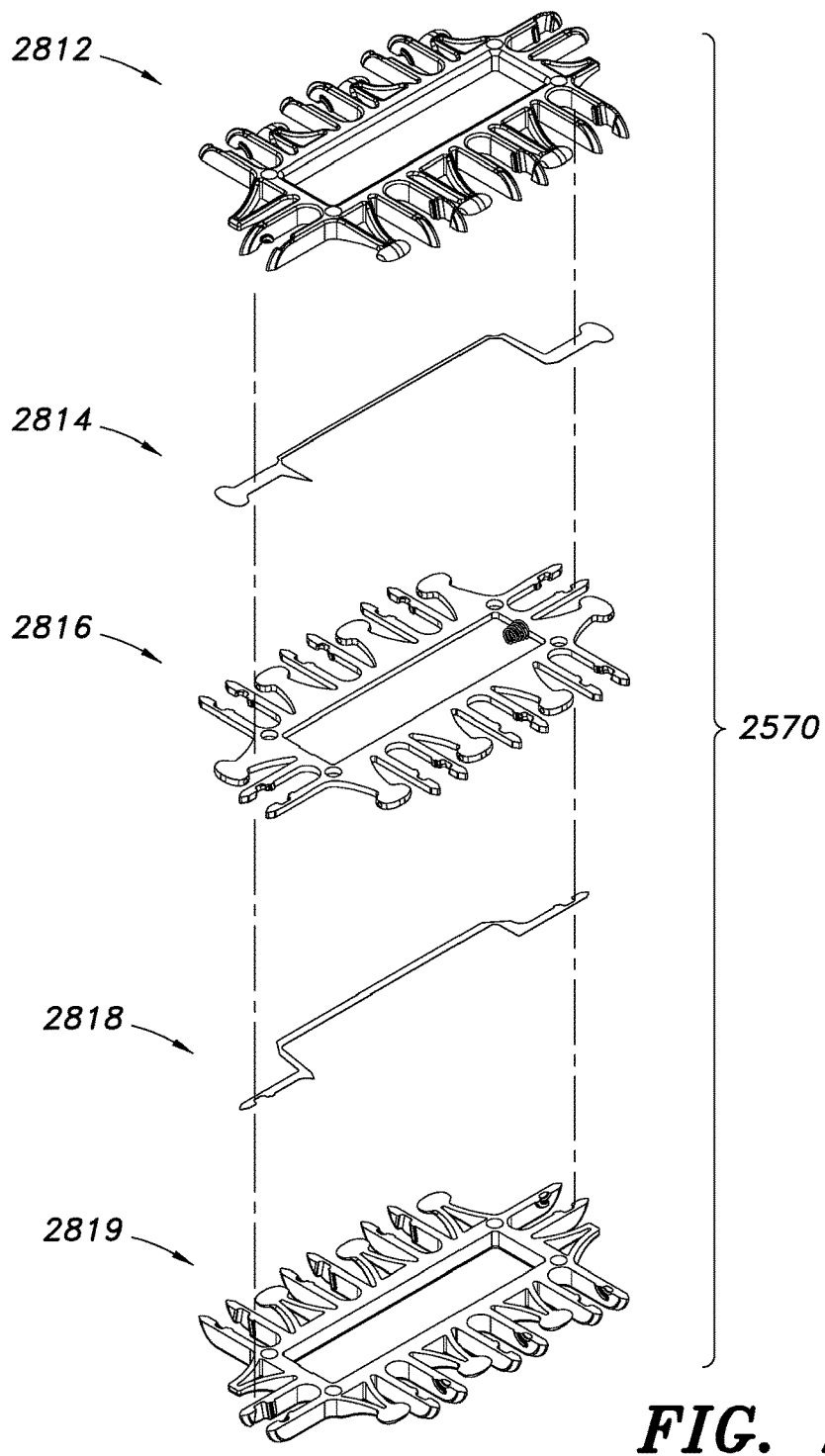

FIG. 281 is an exploded perspective view of the rectangular battery/electric component housing.

Figure 282:
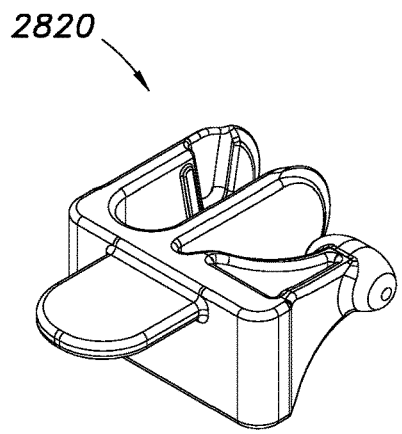

FIG. 282 shows an isometric view of a connecting element which can be inserted into the orifice located on the face sections of planar elements.

Figure 283:
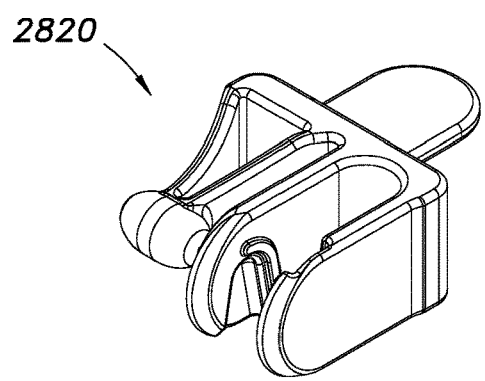

FIG. 283 shows an isometric back side of the same element as shown in FIG. 282.

Figure 284:
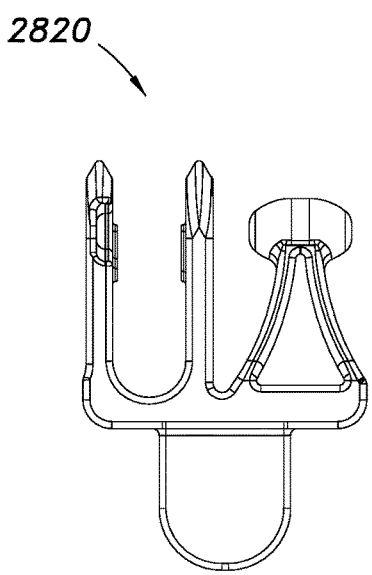

FIG. 284 shows a top view of the same element as shown in FIG. 282.

Figure 285:
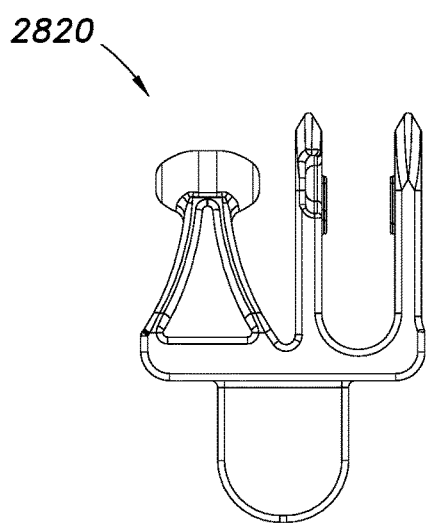

FIG. 285 shows a bottom view of the same element as shown in FIG. 282.

FIG. 286 shows a back view of the same element as shown in FIG. 282.

FIG. 287 shows a front view of the same element as shown in FIG. 282.

FIG. 288 shows a right side view of the same element as shown in FIG. 282.

FIG. 289 shows a left side view of the same element as shown in FIG. 282.

DETAILED DESCRIPTION OF THE INVENTION

Figure 1:
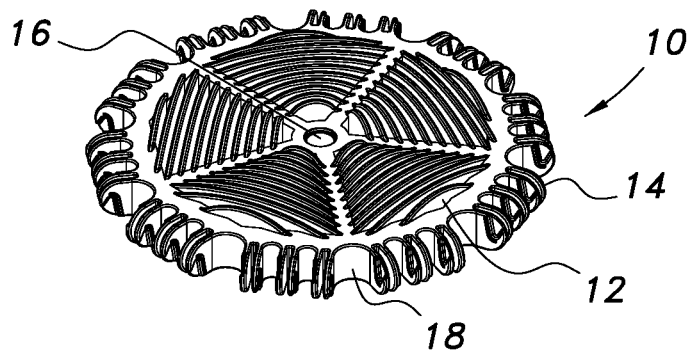
FIG. 1 is a perspective view of a decagonal planar element, according to the present invention.

The device of the present invention provides a construction system shown in FIGS. 1-135 that uses a comb connector element in combination with flat or generally planar polygonal shapes such as, but not limited to, triangles, squares, rectangles, pentagons, hexagons, heptagons, octagons, and so on. The invention can be used on a small scale as a toy or on a larger scale to build structures such as, but not limited to, houses, outhouses, stables, and office buildings, among others.

The present invention is directed to at least one comb connector element in combination with generally planar polygonal shapes such as, but not limited to, triangles, squares, rectangles, pentagons, hexagons, heptagons, and octagons.

A plurality of comb connector elements and polygonal shapes can be used to build three dimensional shapes such as polyhedrons, e.g., a dodecahedron and an octagonal prism. The planar polygonal shapes can be regular or irregular polygonal flat or substantially flat shapes. The comb connector elements connect to the edges of the planar polygonal shapes.

The construction system uses at least one comb connector element in combination with flat or generally planar polygonal members having polygonal shapes of various types. Preferably, each of the polygonal members have a plurality of such comb connector elements.

The comb connector elements connect to the edges of the planar polygonal shapes. Each comb connector has at least one pair of connector members. Each connector member has a proximal end connected to the polygonal member, and a distal end. Each connector member having a face portion that includes a recess extending from a central region of the face portion. The recess extends to the distal end of the face member.

In additional to the aforementioned planar polygonal members, there are other construction elements that are not substantially planar or polygonal. Further, the polygonal members are not necessarily planar, and can have three dimensional extent. Additionally, the polygonal members can include empty interior regions which can include pairs of the comb connector members.

FIG. 1 is a perspective view of a decagonal planar element 10. The element 10 has a plurality of connector pairs 14 (each composed of connector elements 14A and 14B shown in greater detail in FIGS. 110-117), which together form a comb connector. The element 10 has a body 12 having grill-like features, a central aperture 16, and a gap 18 to accommodate male element connections and to provide docking room.

Hereafter, all features in the following figures having the connector pairs similar to pairs 14 are understood to be comb connectors. Also, the gaps in the following figures similar to gap 18 will be understood to accommodate male element connections.

Figure 2:
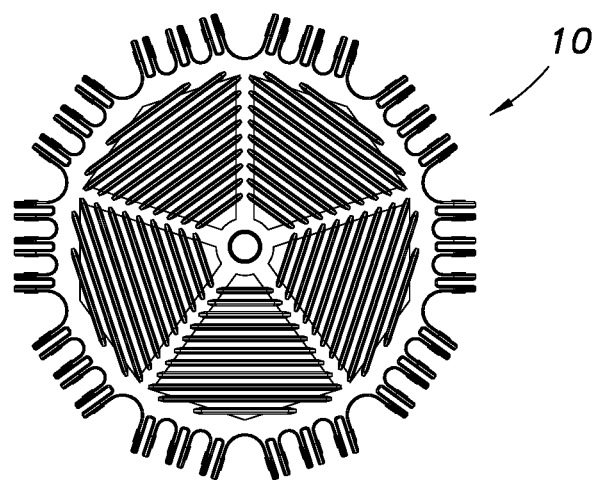
FIG. 2 is a top elevational view of the element of FIG. 1

FIG. 2 is a top elevational view of the element 10 of FIG. 1

Figure 3:
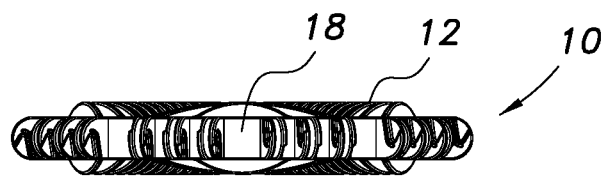
FIG. 3 is a side elevational view of the element of FIG. 1.

FIG. 3 is a side elevational view of the element 10 of FIG. 1.

FIG. 4 is a top view of a hexagonal planar element 20. The element 20 has a plurality of connector pairs 22 (each composed of connector elements 14A and 14B shown in greater detail in FIGS. 110-117), which together form a comb connector. The element 20 has a body 24 having grill-like features, and a gap 26 to accommodate male element connections and to provide docking room.

The grill-like features of the body 24 are able to accommodate connection to other elements, such as the stick-like element 340 of FIGS. 125-128, and other grill-like features of other such elements.

FIG. 5 is a perspective view of the element 20 of FIG. 4.

FIG. 6 is a side elevational view of the element 20 of FIG. 4.

FIG. 7 is a front/back view of the element 20 of FIG. 4.

Figure 8:
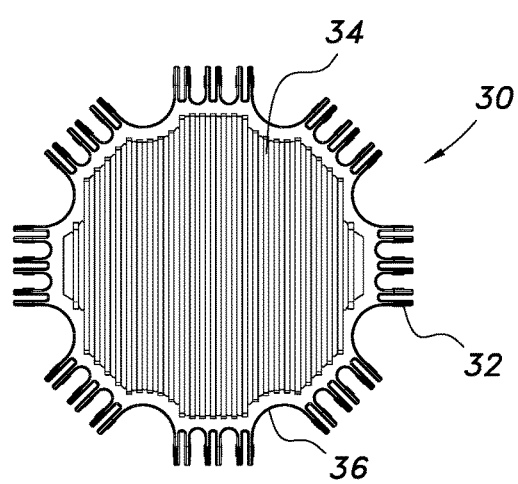
FIG. 8 is a top view of an octagonal planar element, according to the present invention.

FIG. 8 is a top view of an octagonal planar element 30. The element 30 has a plurality of connector pairs 32 (each composed of connector elements 14A and 14B shown in greater detail in FIGS. 110-117), which together form a comb connector. The element 30 has a body 34 having grill-like features, and a gap 36 to accommodate male element connections and to provide docking room.

Figure 9:
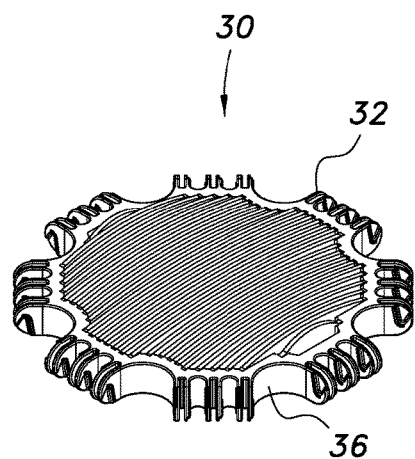
FIG. 9 is a perspective view of the element of FIG. 8.

FIG. 9 is a perspective view of the element 30 of FIG. 8.

Figure 10:
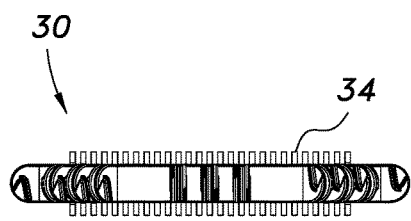
FIG. 10 is a front/back elevational view of the element of FIG. 8.

FIG. 10 is a front/back elevational view of the element 30 of FIG. 8.

Figure 11:
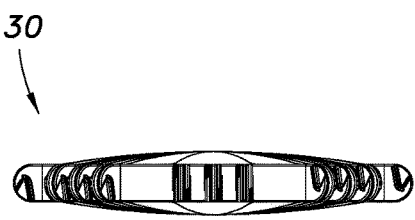
FIG. 11 is a side view of the element of FIG. 8.

FIG. 11 is a side view of the element 30 of FIG. 8.

Figure 12:
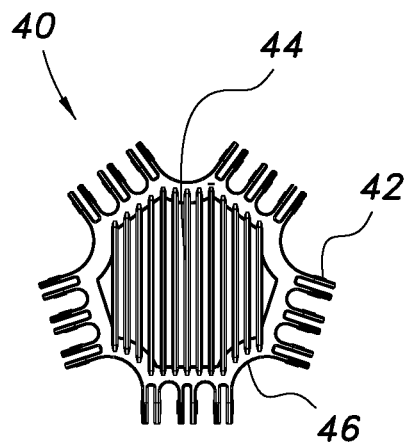
FIG. 12 is a top view of a pentagonal planar element, according to the present invention.

FIG. 12 is a top view of a pentagonal planar element 40. The element 40 has a plurality of connector pairs 42 (each composed of connector elements 14A and 14B shown in greater detail in FIGS. 110-117), which together form a comb connector. The element 40 has a body 44 having grill-like features, and a gap 46 to accommodate male element connections and to provide docking room.

Figure 13:
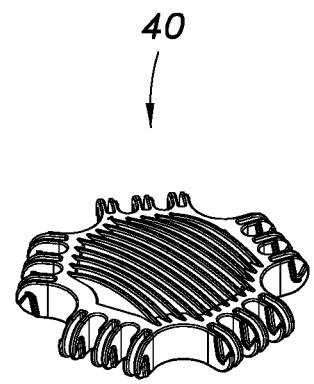
FIG. 13 is a perspective view of the element of FIG. 12.

FIG. 13 is a perspective view of the element 40 of FIG. 12.

Figure 14:
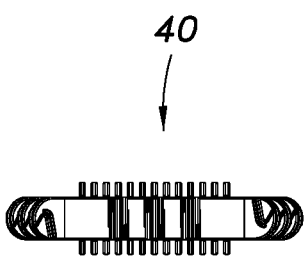
FIG. 14 is a front/back elevational view of the element of FIG. 12.

FIG. 14 is a front/back elevational view of the element 40 of FIG. 12.

Figure 15:
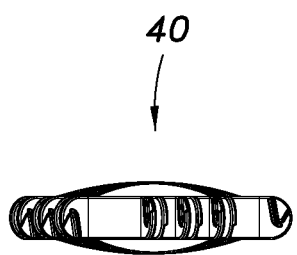
FIG. 15 is a side view of the element of FIG. 12.

FIG. 15 is a side view of the element 40 of FIG. 12.

Figure 16:
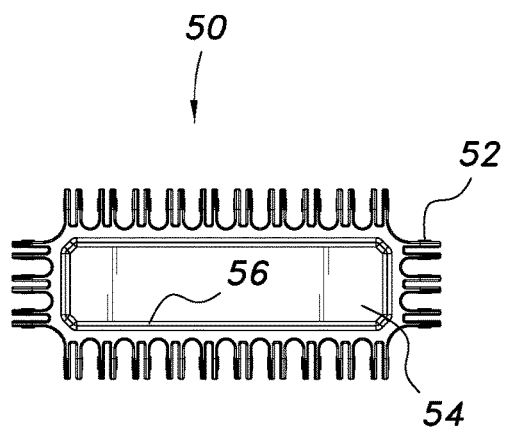
FIG. 16 is a top/bottom view of a rectangular element, according to the present invention.

FIG. 16 is a top/bottom view of a rectangular element 50. The element 50 has a plurality of connector pairs 52 (each composed of connector elements 14A and 14B shown in greater detail in FIGS. 110-117), which together form a comb connector. The element 50 has a body 54, and a ledge 56. It also includes a gap (unnumbered) similar to the preceding figures, to accommodate male element connections and to provide docking room.

Figure 17:
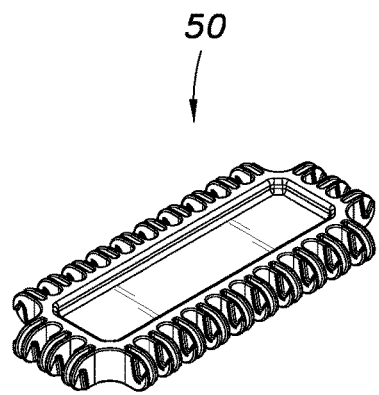
FIG. 17 is a perspective view of the element of FIG. 16.

FIG. 17 is a perspective view of the element 50 of FIG. 16.

Figure 18:
FIG. 18 is a front/back elevational view of the element of FIG. 16.

FIG. 18 is a front/back elevational view of the element 50 of FIG. 16.

Figure 19:
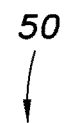
FIG. 19 is a side view of the element of FIG. 16.

FIG. 19 is a side view of the element 50 of FIG. 16.

FIG. 20 is a top/bottom view of a rhombus planar element 60. The element 60 has a plurality of connector pairs 62 (each composed of connector elements 14A and 14B shown in greater detail in FIGS. 110-117), which together form a comb connector. The element 60 has a body 64 having grill-like features, and a gap 66 to accommodate male element connections and to provide docking room.

FIG. 21 is a perspective view of the element 60 of FIG. 20.

FIG. 22 is a front/back view of the element 60 of FIG. 20.

FIG. 23 is a side view of the element 60 of FIG. 20.

FIG. 24 is a top view of a square planar element 70. The element 70 has a plurality of connector pairs 72 (each composed of connector elements 14A and 14B shown in greater detail in FIGS. 110-117), which together form a comb connector. The element 70 has a body 74 having grill-like features, and a gap 76 to accommodate male element connections and to provide docking room.

FIG. 25 is a perspective view of the element 70 of FIG. 24.

FIG. 26 is a front/back elevational view of the element 70 of FIG. 24.

FIG. 27 is a side view of the element 70 of FIG. 24.

Figure 28:
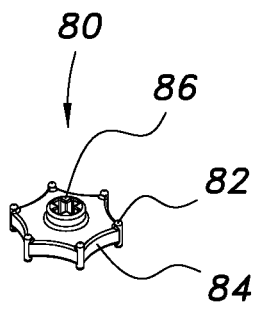
FIG. 28 is a perspective view of a hexagonal male connector element, according to the present invention.

FIG. 28 is a perspective view of a hexagonal male connector element 80. The element 80 has a body 84, a ridge 86 surrounding a central aperture 88 (shown in FIG. 29) and a plurality of male connectors 82. Each of the male connectors 82 is adapted to be received between the pairs of connector members which have been described hereinabove. The element 80 also includes the cross-shaped aperture 88 there through to receive other connecting members described further herein below.

Figure 29:
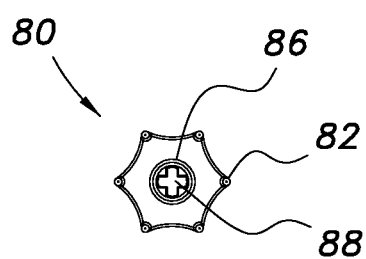
FIG. 29 is a top/bottom view of the element of FIG. 28.

FIG. 29 is a top/bottom view of the element 80 of FIG. 28.

Figure 30:
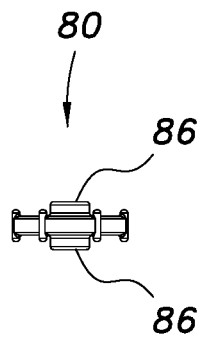
FIG. 30 is a side elevational view of the element of FIG. 28.

FIG. 30 is a side elevational view of the element 80 of FIG. 28.

Figure 31:
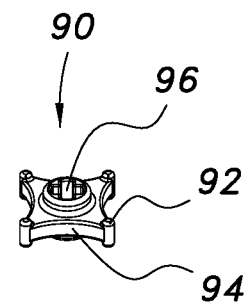
FIG. 31 is a perspective view of a four male connector element according to the present invention.

FIG. 31 is a perspective view of a four male connector element 90. The element 90 has a body 94, a ridge 96 surrounding a central aperture 98 (shown in FIG. 32) and a plurality of male connectors 92. Each of the male connectors 92 is adapted to be received between the pairs of connector members which have been described hereinabove. The element 90 also includes the cross-shaped aperture 98 there through to receive other connecting members described further herein below.

Figure 32:
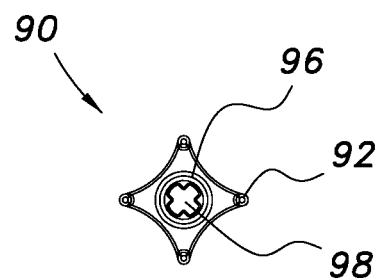
FIG. 32 is a top/bottom view of the element of FIG. 31.

FIG. 32 is a top/bottom view of the element 90 of FIG. 31.

Figure 33:
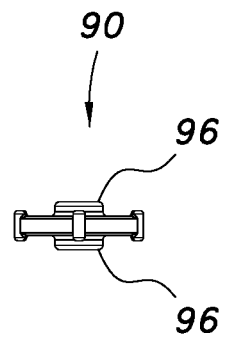
FIG. 33 is a side elevational view of the element of FIG. 31.

FIG. 33 is a side elevational view of the element 90 of FIG. 31.

Figure 34:
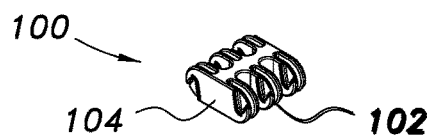
FIG. 34 is a perspective view of a short element according to the present invention.

FIG. 34 is a perspective view of a short element 100, which is a two-sided comb connector.

The element 100 has a body 104 and connector elements 102 (each composed of connector elements 14A and 14B shown in greater detail in FIGS. 110-117).

Figure 35:
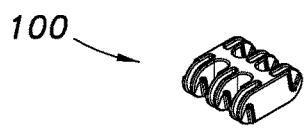
FIG. 35 is another perspective view of the element of FIG. 34.

FIG. 35 is another perspective view of the element 100 of FIG. 34.

Figure 36:
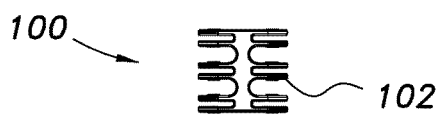
FIG. 36 is a top/bottom view of the element of FIG. 34.

FIG. 36 is a top/bottom view of the element 100 of FIG. 34.

Figure 37:
FIG. 37 is a front/back view of the element of FIG. 34.

FIG. 37 is a front/back view of the element 100 of FIG. 34.

Figure 38:
FIG. 38 is a side view of the element of FIG. 34.

FIG. 38 is a side view of the element 100 of FIG. 34.

Figure 39:
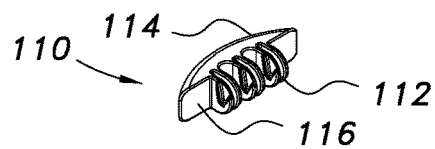
FIG. 39 is a perspective view of a wheel element according to the present invention.

FIG. 39 is a perspective view of a wheel element 110. The element 110 has a curved side 114, connector elements 112, and a body 116.

Figure 40:
FIG. 40 is another perspective view of the element of FIG. 39.

FIG. 40 is another perspective view of the element 110 of FIG. 39.

Figure 41:
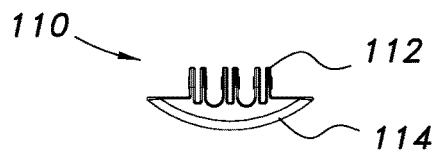
FIG. 41 is a top/bottom view of the element of FIG. 39.

FIG. 41 is a top/bottom view of the element 110 of FIG. 39.

Figure 42:
FIG. 42 is a front/back view of the element of FIG. 39.

FIG. 42 is a front/back view of the element 110 of FIG. 39.

Figure 43:
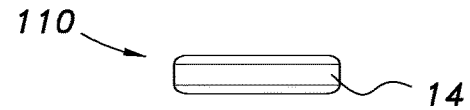
FIG. 43 is a side view of the element of FIG. 39.

FIG. 43 is a side view of the element 110 of FIG. 39.

FIG. 44 is a perspective view of a triangular element 120. As shown in FIG. 46, element 120 has connector pairs 126, a central aperture 124, and a body 122.

FIG. 45 is another perspective view of the element 120 of FIG. 44.

FIG. 46 is a top/bottom view of the element 120 of FIG. 44.

FIG. 47 is a front view of the element 120 of FIG. 44.

FIG. 48 is a back view of the element 120 of FIG. 44.

FIG. 49 is a perspective view of a two-sided female connector element 130. The element 130 (as shown in FIG. 51) includes connector pairs 132, a body 136, and ends 134.

FIG. 50 is another perspective view of the element 130 of FIG. 49.

FIG. 51 is a top/bottom view of the element 130 of FIG. 49.

FIG. 52 is a side view of the element 130 of FIG. 49.

FIG. 53 is a front/back view of the element 130 of FIG. 49.

Figures 54, 55:
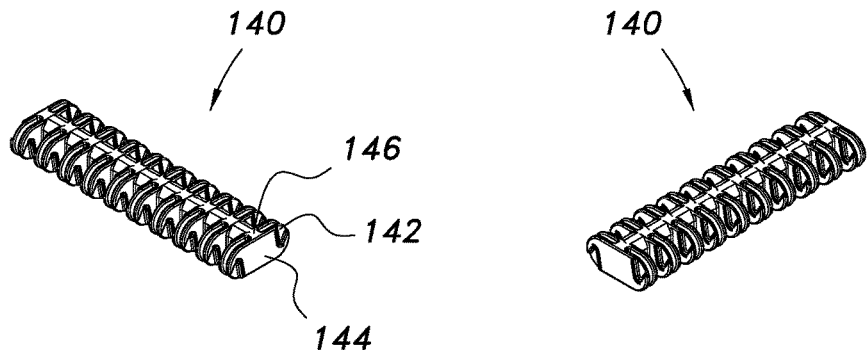
FIG. 54 is a perspective view of a long two sided female connector element according to the present invention.
FIG. 55 is another perspective view of the element of FIG. 54.

FIG. 54 is a perspective view of a long two sided female connector element 140. The element 140 includes connector pairs 142, a body 146, and ends 144.

FIG. 55 is another perspective view of the element 140 of FIG. 54.

Figure 56:
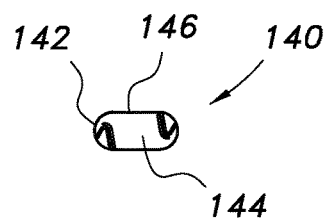
FIG. 56 is a side view of the element of FIG. 54.

FIG. 56 is a side view of the element 140 of FIG. 54.

Figures 57, 58:
FIG. 57 is a top/bottom view of the element of FIG. 54.
FIG. 58 is a front/back view of the element of FIG. 54.

FIG. 57 is a top/bottom view of the element 140 of FIG. 54.

FIG. 58 is a front/back view of the element 140 of FIG. 54.

FIG. 59 is a perspective view of a triangular planar element 150. The element 150 has an exterior comb connector having connector pairs 152 and an interior comb connector having connector pairs (unnumbered) projecting from interior wall 154 which surrounds an aperture 156.

FIG. 60 is another perspective view of the element 150 of FIG. 59.

FIG. 61 is a top/bottom view of the element 150 of FIG. 59.

FIG. 62 is a back view of the element 150 of FIG. 59.

FIG. 63 is a front view of the element 150 of FIG. 59.

Figure 64:
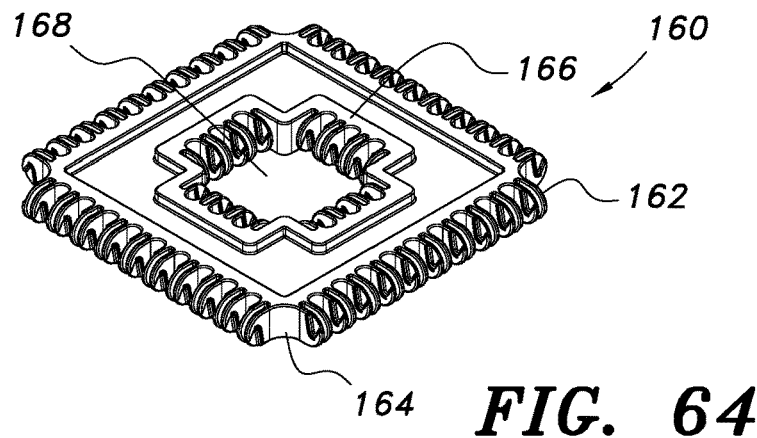
FIG. 64 is a perspective view of a square planar element according to the present invention.

FIG. 64 is a perspective view of a square planar element 160. The element 160 has an exterior comb connector having connector pairs 162 and an interior comb connector having connector pairs (unnumbered) projecting from interior wall 166 which surrounds an aperture 168. The element 160 has a gap 164 to accommodate male element connections and to provide docking room.

Figure 65:
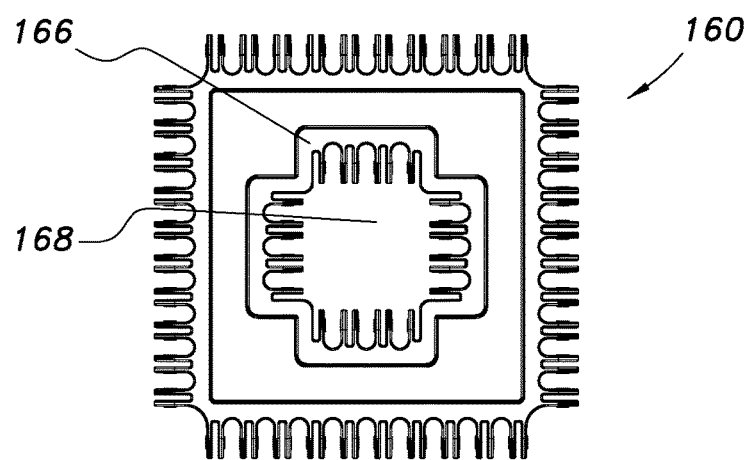
FIG. 65 is a top/bottom view of the element of FIG. 64.

FIG. 65 is a top/bottom view of the element 160 of FIG. 64.

Figure 66:
FIG. 66 is a side view of the element of FIG. 64.

FIG. 66 is a side view of the element 160 of FIG. 64.

FIG. 67 is a perspective view of an angle locking hinge stop element 170. The element 170 has a plurality of connector pairs 172 (each composed of connector elements 14A and 14B shown in greater detail in FIGS. 110-117), which together form a comb connector. The element 170 has a body 174, and a stiffener member 176 disposed on the body 174.

The element 170 serves as a brake and limits angular movement between two comb connectors. Element 170 therefore limits bending.

FIG. 68 is another perspective view of the element 170 of FIG. 67.

FIG. 69 is a top/bottom view of the element 170 of FIG. 67.

FIG. 70 is a front/back view of the element 170 of FIG. 67.

FIG. 71 is a side view of the element 170 of FIG. 67.

FIG. 72 is a perspective view of a hermaphroditic hinge connector element 180. The element 180 provides a pinless hinge wherein each comb connector element has both male and female elements in the body of the comb connector. The element 180 has a body 184 and pairs of connector members 182.

FIG. 73 is another perspective view of the element 180 of FIG. 72.

FIG. 74 is a top/bottom view of the element 180 of FIG. 72.

FIG. 75 is a front view of the element 180 of FIG. 72.

FIG. 76 is a back view of the element of FIG. 72.

FIG. 77 is a perspective view of a unity block element 190. The element 190 has comb connectors 192, a first body portion 194, a second body portion 196, and pin female orifices 198.

FIG. 78 is another perspective view of the element 190 of FIG. 77.

FIG. 79 is a top/bottom view of the element 190 of FIG. 77.

FIG. 80 is a front/back view of the element 190 of FIG. 77.

FIG. 81 is a front/back view of the element 190 of FIG. 77.

Figure 82:
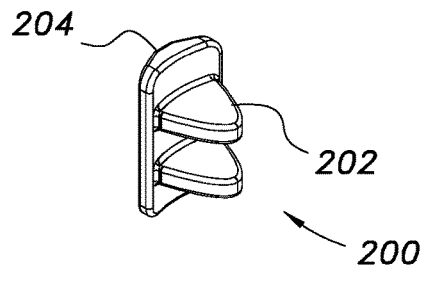
FIG. 82 is a perspective view of a lock element according to the present invention.

FIG. 82 is a perspective view of a lock element 200. The lock element 200 is used by inserting it into the hinge connection between two female-to-female connections. It limits the angular motion (i.e. the bending moment) of these female-to-female connections. The element 200 has a curved side 204 and two projecting male members 202.

Figure 83:
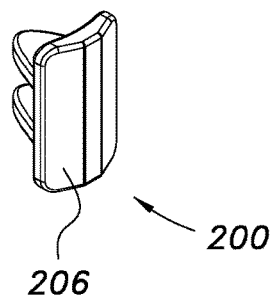
FIG. 83 is another perspective view of the lock element of FIG. 82, according to the present invention.

FIG. 83 is another perspective view of the lock element 200 of FIG. 82, according to the present invention.

Figure 84:
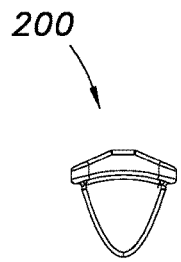
FIG. 84 is another perspective view of the element of FIG. 83.

FIG. 84 is another perspective view of the element 200 of FIG. 83.

Figure 85:
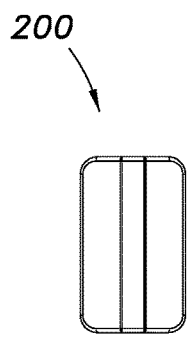
FIG. 85 is a front view of the element of FIG. 82.

FIG. 85 is a front view of the element 200 of FIG. 82.

Figure 86:
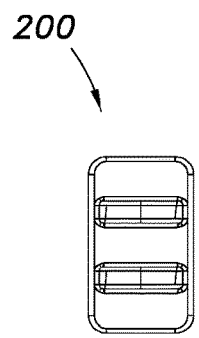
FIG. 86 is a back view of the element of FIG. 82.

FIG. 86 is a back view of the element 200 of FIG. 82.

FIG. 87 is a perspective view of a utility block element 210. The element 210 has comb connectors 212, a central aperture 219, a first body portion 214, a second body portion 216, cross-shaped apertures 218, and pin female orifices 217. The apertures 218 are intended to receive the elements 300 (described hereunder).

FIG. 88 is another perspective view of the element 210 of FIG. 87.

FIG. 89 is a top/bottom view of the element 210 of FIG. 87.

FIG. 90 is a front/back view of the element 210 of FIG. 87.

FIG. 91 is a side view of the element 210 of FIG. 87.

Figure 92:
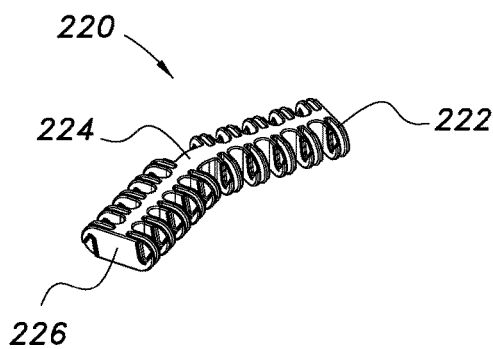
FIG. 92 is a perspective view of an angular element having a 120 degree angle, according to the present invention.

FIG. 92 is a perspective view of an angular element 220 having a 120 degree angle. The element 220 has comb connectors 222, an angled bend 224, and a body 226.

Figure 93:
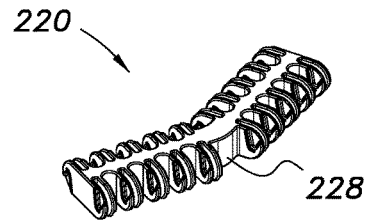
FIG. 93 is another perspective view of the element of FIG. 92.

FIG. 93 is another perspective view of the element 220 of FIG. 92.

FIG. 93 is a top/bottom view of the element 220 of FIG. 92.

Figure 94:
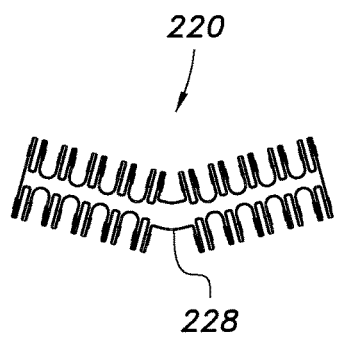
FIG. 94 is a front view of the element of FIG. 92.

FIG. 94 is a front view of the element 220 of FIG. 92.

Figure 95:
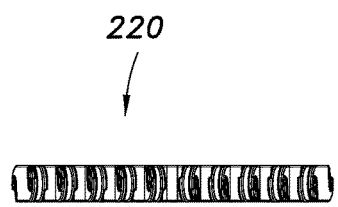
FIG. 95 is a front view of the element of FIG. 92.

FIG. 95 is a front view of the element 220 of FIG. 92.

Figure 96:
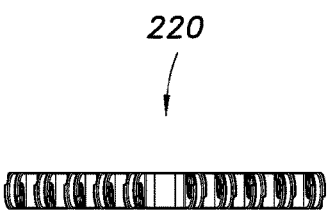
FIG. 96 is a back of the element of FIG. 92.

FIG. 96 is a back of the element 220 of FIG. 92.

FIG. 97 is a perspective view of an angular element 230 having a 135 degree angle. The element 230 has comb connectors 232, and an angled bend 236.

FIG. 98 is another perspective view of the element 230 of FIG. 97.

FIG. 99 is a top/bottom view of the element 230 of FIG. 97.

FIG. 100 is a front view of the element 230 of FIG. 97.

FIG. 101 is a back view of the element 230 of FIG. 97.

Figure 102:
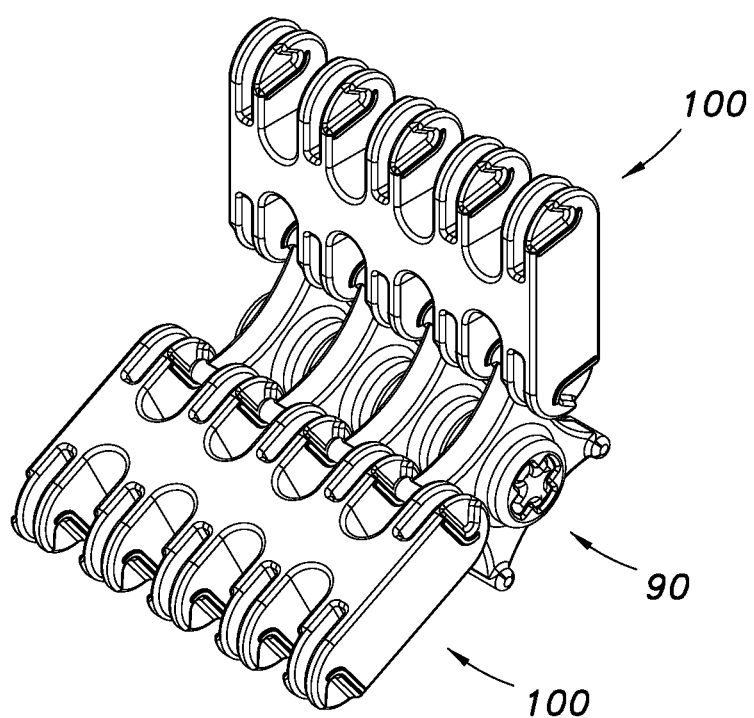
FIG. 102 illustrates a perspective view of a chain-style connection.

FIG. 102 illustrates a perspective view of a chain-style connection wherein element 90 connects two elements 100 which are two-sided comb connectors.

Figure 103:
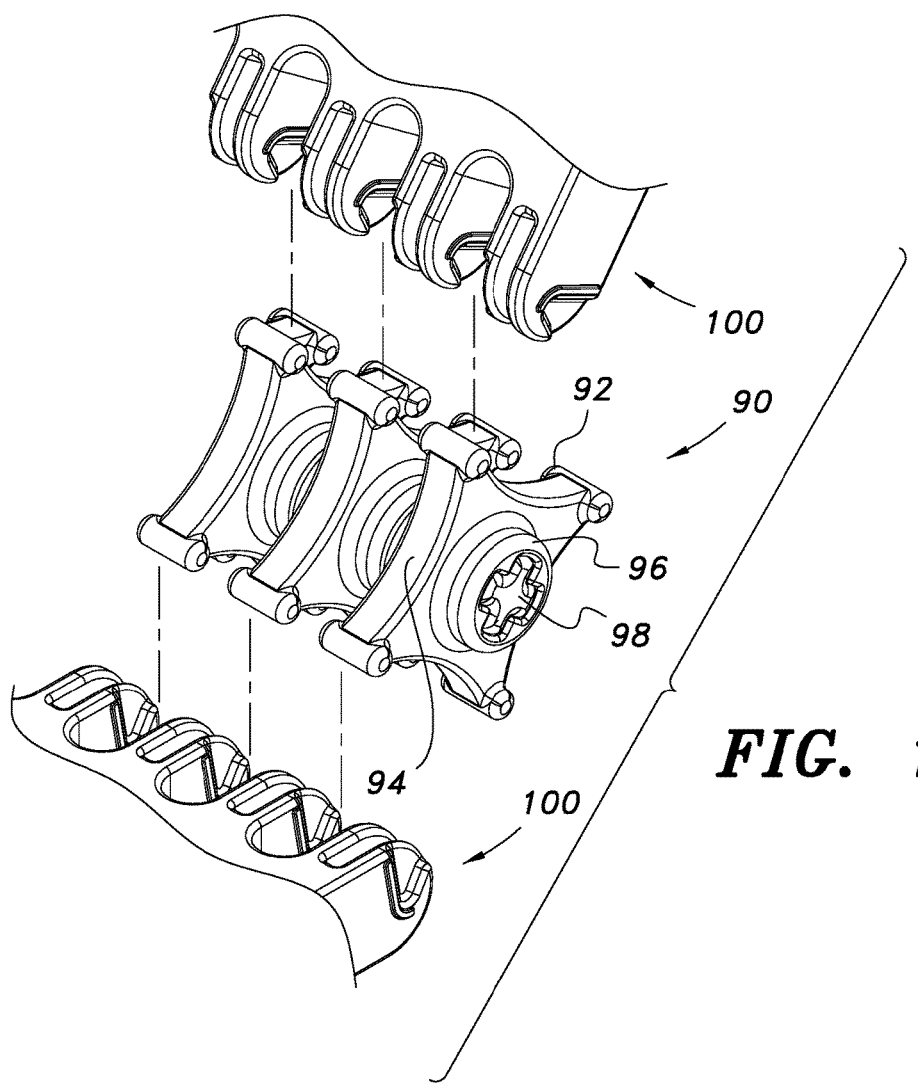
FIG. 103 is an assembly view of the connection of FIG. 103.

FIG. 103 is an assembly view of the connection of FIG. 103.

Figure 104:
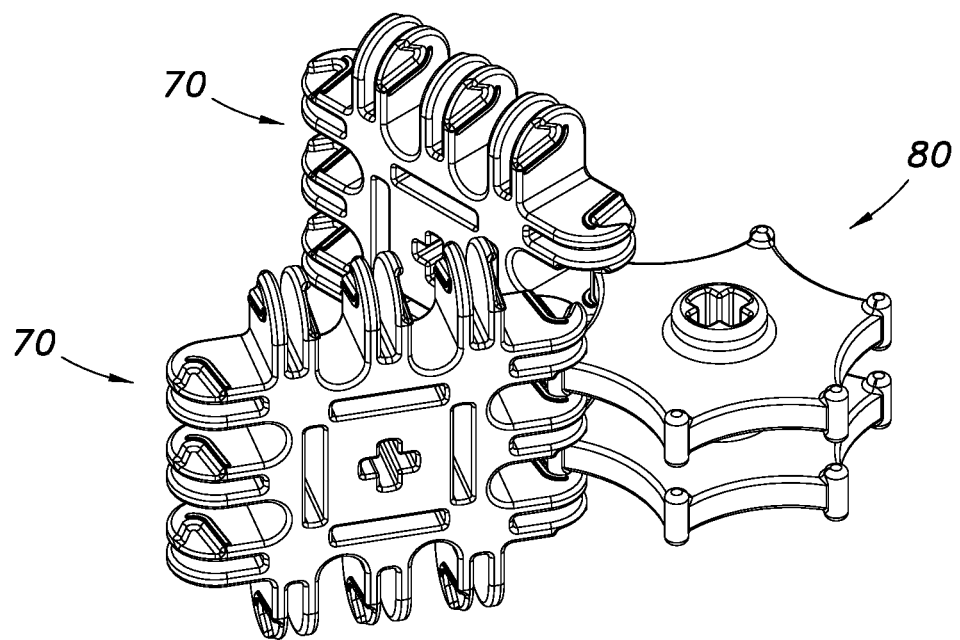
FIG. 104 is a perspective view of a four connection, according to the invention.

FIG. 104 is a perspective view of a four connection wherein element 80 connects two elements 70 which are comb connectors.

FIG. 105 is a perspective view of a square style connection, wherein element 90 connects two elements 70.

FIG. 106 is a perspective view of the male connector 90 with a pin element 300. The pin element 300 has a cross-shaped body.

FIG. 107 is an assembly view of the male connector 90 with the pin element 300 of FIG. 106.

Figure 108:
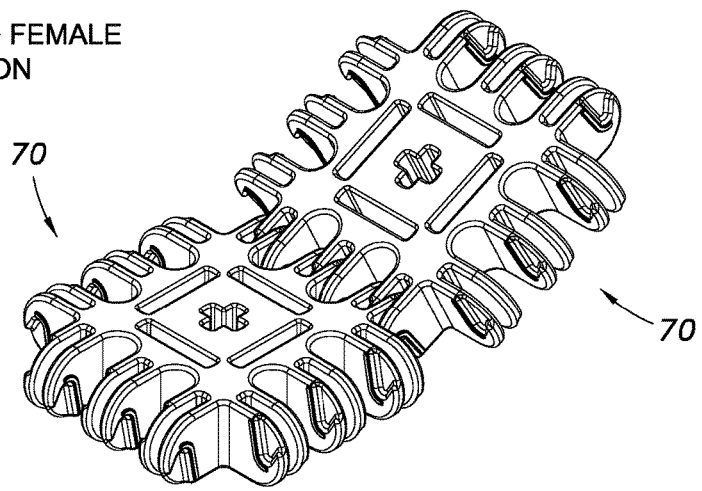
FIG. 108 is a perspective view of a female-to-female connection, according to the invention.

FIG. 108 is a perspective view of a female-to-female connection between two of the elements 70. There is a space at the connection where the lock member can be inserted.

Figure 109:
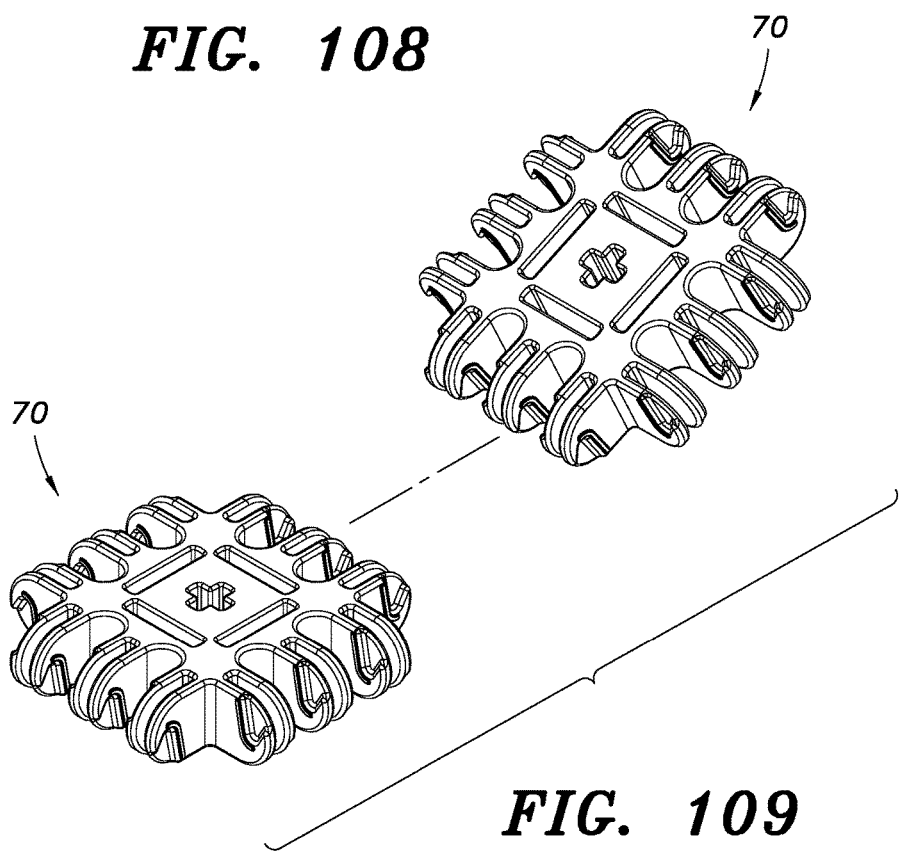
FIG. 109 is a perspective view of a female-to-female connection of FIG. 105.

FIG. 109 is a perspective view of the female-to-female connection of FIG. 105.

Figure 110:
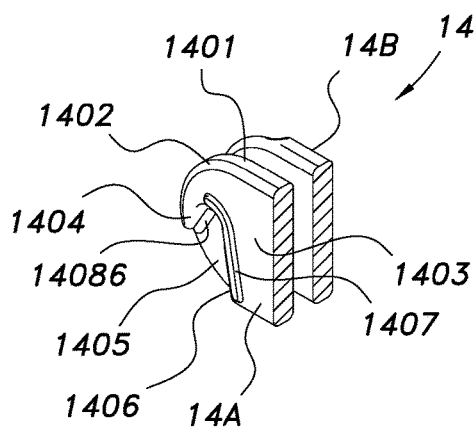
FIG. 110 is a perspective view of a pair of connector members, according to the invention.

FIG. 110 is a perspective view of a connector pair 14 having connector members 14A and 14B.

The connector member 14B shows an outer periphery 1401, and a beveled side 1402 leading up to the periphery 1401. The beveling allows for easy slide entry of the male elements.

The connector member 14B also shows an exterior side wall 1403, a curved tip 1404 of the side wall 1403. The curving accommodates the hinge action of the locked elements and also the range of motion of the female-to-female connection. A recessed portion 1405 is also shown, along with a ridge 1406 having a side wall 1407. The side wall 1407 is a brake designed to prevent the accidental overshooting of the nesting of the low stress pinless hinge. The ridge 1406 also serves as a secondary higher tension inner hinge when the male element is forced to cross over it. The member 14A has a similar ridge but in an opposed direction; the two opposed directions of the ridge walls function in a positive manner, and do not allow the male element to easily escape once locked into position.

Figure 111:
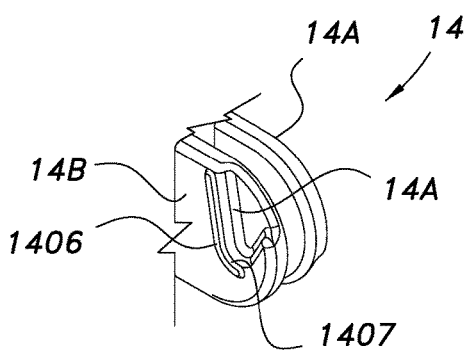
FIG. 111 is another perspective view of the pair of connector members of FIG. 110.

FIG. 111 is another perspective view of the pair of connector members 14A and 14B of FIG. 110.

Figure 112:
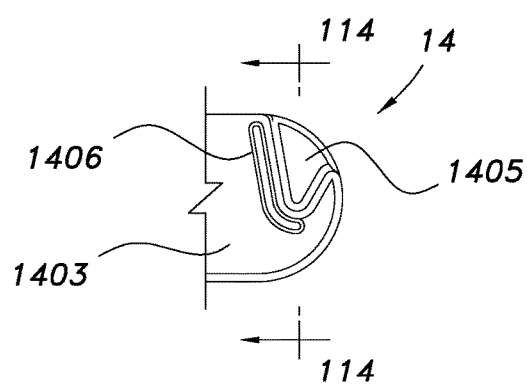
FIG. 112 is an elevational view of one face of one of pair of connector members of FIG. 110.

FIG. 112 is an elevational view of one face of one of pair of connector members 14A and 14B of FIG. 110.

Figure 113:
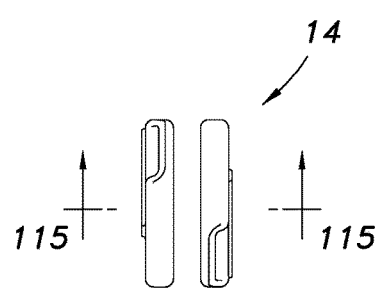
FIG. 113 is a front view of the pair of connector members of FIG. 110.

FIG. 113 is a front view of the pair of connector members 14A and 14B of FIG. 110. FIG. 114 is a sectional view taken along line X-X of FIG. 112.

FIG. 115 is a sectional view taken along line Y-Y of FIG. 113.

FIG. 116 is a top elevational view of the pair of connector members 14A and 14B of FIG. 110. FIG. 117 is an enlarged view corresponding to FIG. 111.

Figure 118:
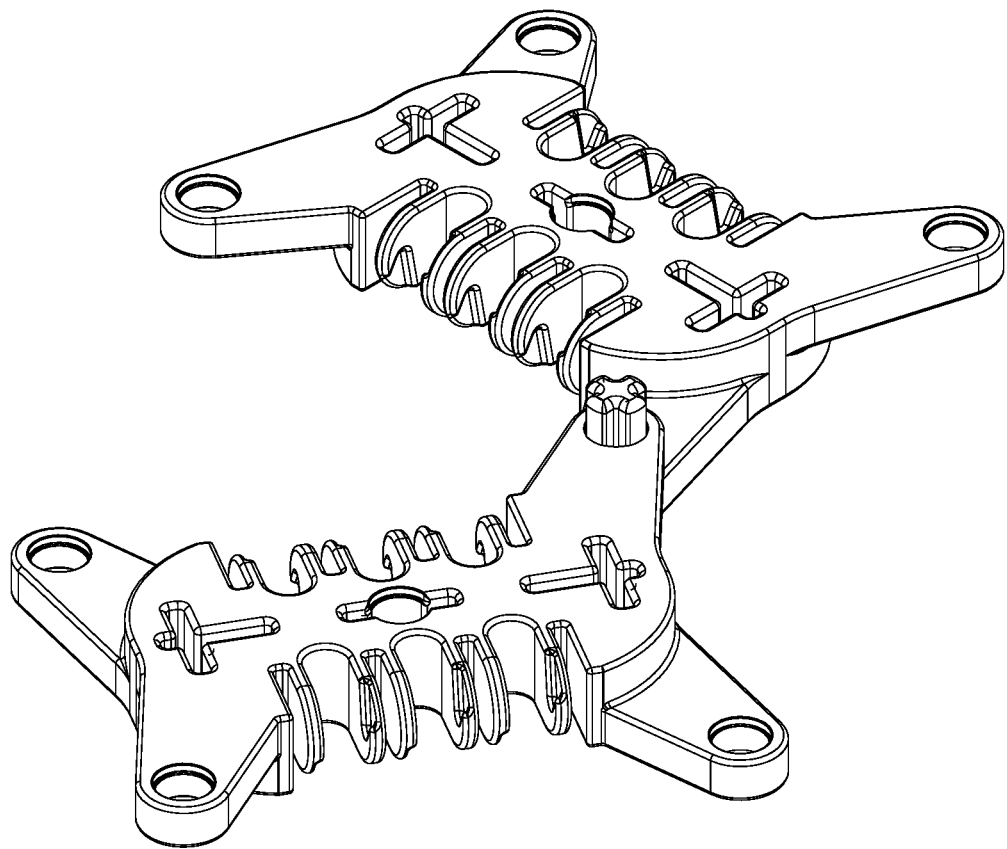
FIG. 118 is a perspective view of a pin connection between two elements.

FIG. 118 is a perspective view of a pin connection between two elements, which form a utility block structure for either closed or indefinite structures. The pinned connection can be a fixed or hinged joint.

Figure 119:
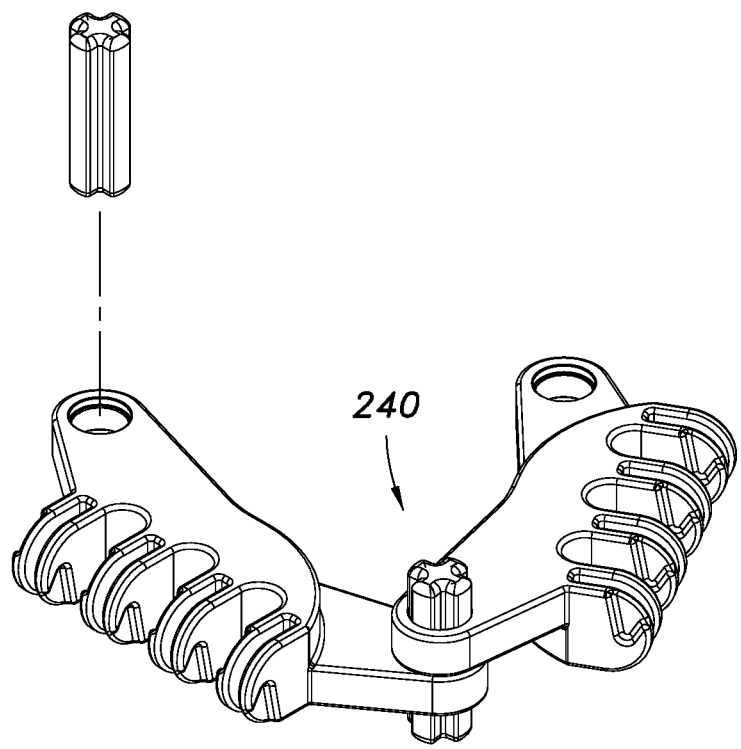

FIG. 119 is an assembly view 240 showing insertion of a pin (unnumbered) into a hole in one of the unity block elements. This assembly can configure the comb connectors of other planar elements, and also offers hinging elements at an angle of 90 degrees to the comb connector hinge.

Figure 120:
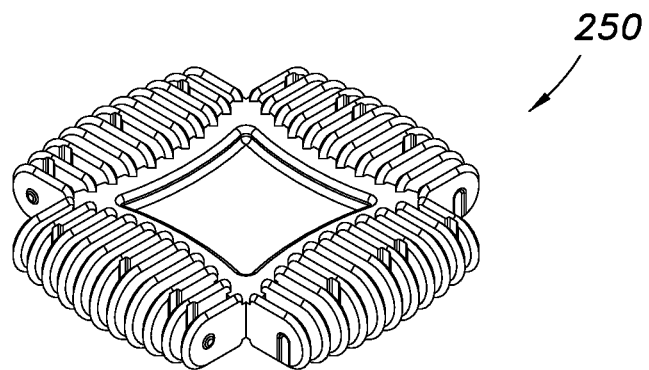

FIG. 120 is a perspective view of a hermaphroditic connector element 250. It has both male and female elements on its blades.

Figure 121:
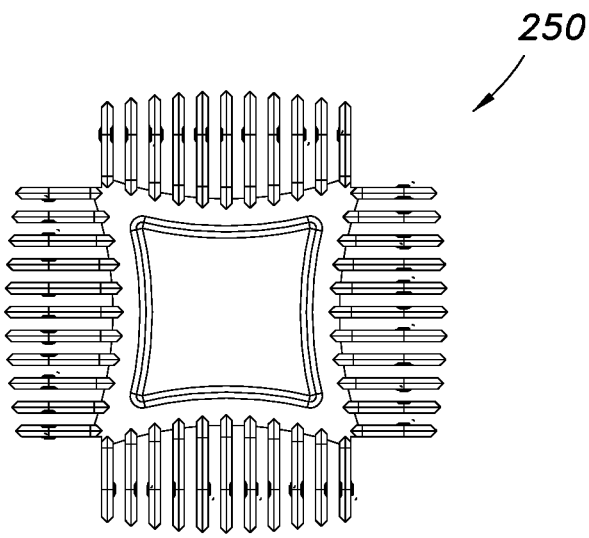

FIG. 121 is a top elevational view of the hermaphroditic connector element 250 of FIG. 120.

Figure 122:
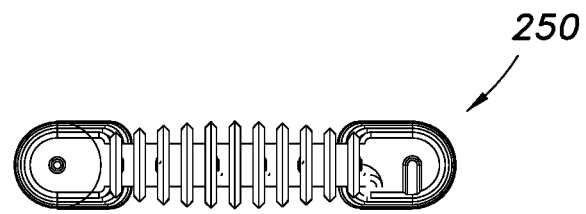

FIG. 122 is a side elevational view of the hermaphroditic connector element 250 of FIG. 120.

FIG. 122 shows a female groove (unnumbered) at the right-most end, and a male boss (unnumbered) at the left-most end.

Figure 123:
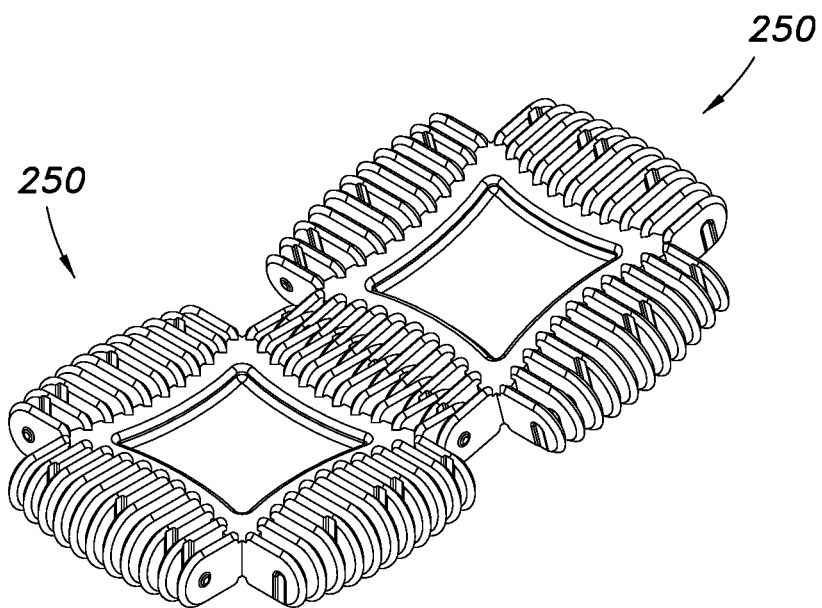

FIG. 123 is a perspective view of the connection of two hermaphroditic connector elements 250 of FIG. 120.

Figure 124:
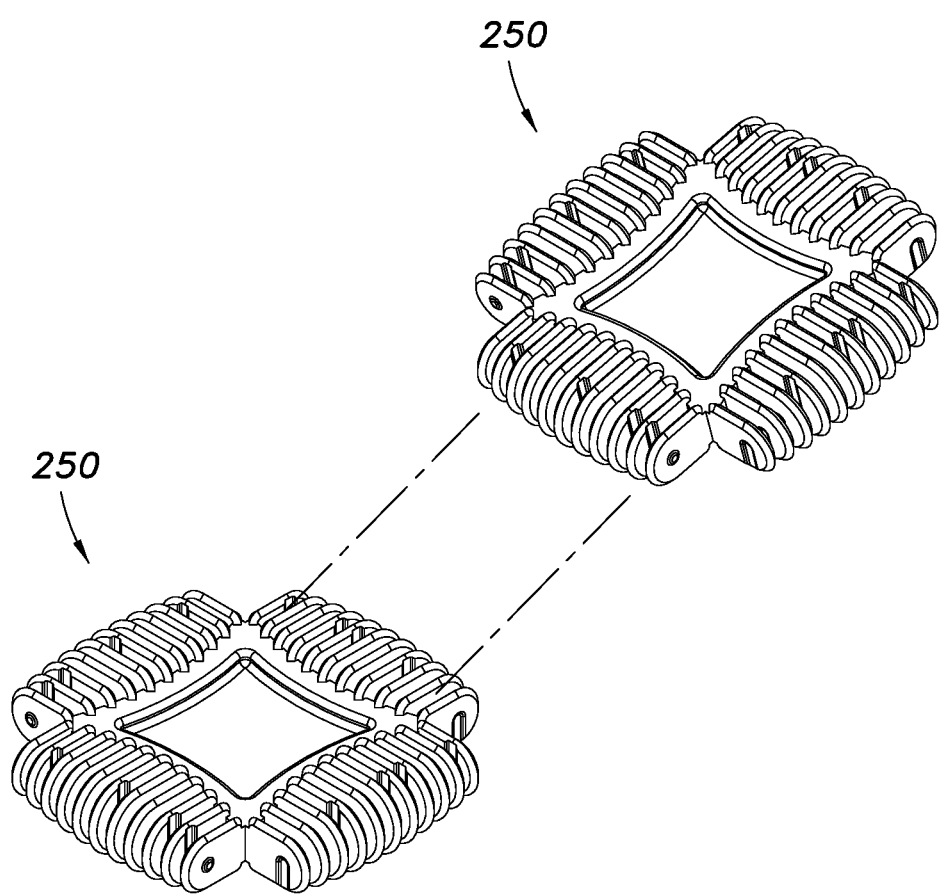

FIG. 124 is an assembly view of the connection of the two hermaphroditic connector elements 250 of FIG. 123.

FIG. 125 is a perspective view of a rectilinear structure element 340, which is a stick-like element.

FIG. 126 is a front elevational view of the stick-like element 340 of FIG. 125.

FIG. 127 is a side elevational view of the stick-like element 340 of FIG. 125.

FIG. 128 is an end elevational view of the stick-like element 340 of FIG. 125.

Figure 129:
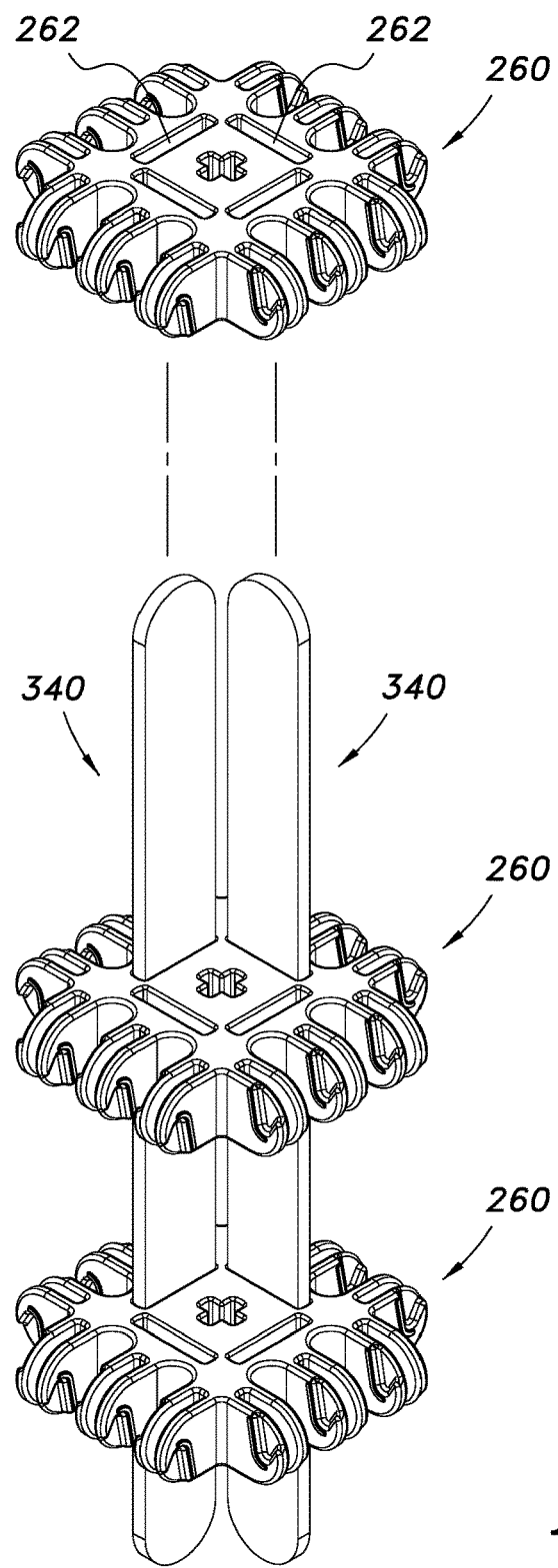

FIG. 129 is an assembly view showing use of the stick connector 340 of FIGS. 125-128 to connect several elements 260.

FIG. 130 is a schematic view of the pin 92 and ridge 1407 connection of two corresponding ones of a pair of connector members 14A and 14B.

FIG. 131 is a schematic view of the insertion of male elements 92 into respective ones of a plurality of pairs of connector members 14.

FIG. 132 is a schematic view showing a zipper-like unlocking of the connections of the male elements 92 of FIG. 131 from respective ones of a plurality of pairs of connector members 14 of FIG. 131.

FIG. 133 is an enlarged view, similar to FIG. 130, showing a different type of locking engagement of the male elements 92 behind the ridge members 1407.

FIG. 134 is a schematic view of the insertion of male elements 92 into respective ones of a plurality of pairs of connector members 14, for the locking arrangement shown in FIG. 133. This is a stressed connection in that the male elements have overshot the ridges 1407 and are locked into place behind them.

FIG. 135 is a schematic view showing the ridge members 1407 in overlapping side view, forming a nearly circular form 600, to illustrate the oppositely directed connecting scheme according to the present invention.

FIG. 136 is a schematic view similar to FIG. 135, showing a plurality of pairs of the ridge members 1407 and male elements 92 in side view, to illustrate the oppositely directed connecting scheme of the present invention.

The principle of the pinless hinge schematically shown in FIG. 136, and as embodied in various ones of the preceding figures, is that approximately half of all male bosses (elements) are free to escape in one direction and the other half are free to escape in the opposite direction. But since they are all connected at the base, they are all thus frozen creating the pinless hinging action or lock. It is a kind of mechanical trap and it is accomplished with semicircular traps aligned at odds from each other. These counteracting semi-circles create an overall effect of complete circles.

The interior ridges behind the female recesses serve two primary functions (but the design of the hinge can work without this ridge). The ridge serves as a brake to keep the male boss from over shooting the recess, but if it does overshoot the recess and jump over this ridge, the bosses are re-trapped in a higher pressure nesting cycle and remain hinges, now fulcrummed or pinned between two counteracting positive ridges. This is shown clearly in FIG. 133, for example.

Regarding the operating principles of the connections, the aforementioned hinge elements can be connected together in a comb like fashion because the gap provided for the bending moment of the individual connector members is a wide enough channel to receive a comb element from another female connector. The female to female connections work by a pressure hold and are not true hinges—except in the case of the hermaphroditic connector, which has male bosses and female recesses that allow for a snapping pinless hinge without the male secondary element.

The aforementioned hinge, being connected from opposed directions, therefore has a 50-50 built in redundancy that is stronger and relatively more reliable than other types of hinge.

The special advantages to this construction are that it allows for female to female non-hinge assembly (hinged if considering a hermaphrodite comb connector), ease of fabrication in economical two part molds, two snapping and locking sequences (using the female channel to trap the male boss and the ridge to trap the boss).

The hinge of the present invention as shown and described hereinabove has an important advantageous feature in that it can be fabricated economically in a simple two part mold without the aid of more costly molding devices having specialized features like slides and pulls which substantially increase the cost of tooling the mold. This is because the hinge, as conceived, has no undercuts that would hamper the clean symmetrical opening of a two part mold.

FIG. 137 is an isometric view of a plurality of square planar elements 1371 (shown in FIG. 138) which is also similar to ones of the foregoing embodiments, and which is shown in detail in the following FIGS. 138-142 below, arranged into a cube assembly 1370.

FIG. 138 is an exploded view of three square planar elements 1371 according to the present invention, and which are also used in the assembly 1370 of FIG. 137.

FIG. 139 is a top isometric view of the square planar element 1371 of FIG. 138.

FIG. 140 is a bottom isometric view of the square planar element 1371 of FIG. 138.

FIG. 141 is a top view of the square planar element 1371 of FIG. 138.

FIG. 142 is a side view of the square planar element 1371 of FIG. 138.

FIG. 143 is a perspective top view of a hexagonal planar element 1430, having a male connector element 1431 and a female connector portion 1432 which is composed of a pair of cooperating female elements. This structure is similar to that of FIGS. 130-135 described hereinabove which have male elements 92 and a female connector portion 14. The connection details of the elements 1431 and 1432 are similar to that shown in greater detail in the above-mentioned FIGS. 110-117.

FIG. 144 is a perspective bottom view of the same element as FIG. 143.

FIG. 145 is a top elevation view, which is also the same in bottom view, of the same element 1430 as in FIG. 143. FIG. 145 also shows five openings 1433 through the element 1430.

FIG. 146 is a side view of the same element 1430 as FIG. 143.

FIG. 147 is a side view of the front and back of the element 1430 of FIG. 143.

FIG. 148 is a top isometric view of a pentagonal planar element 1480, according to the present invention, having a female element 1482 and a male element 1481, similar to that described in the preceding embodiments.

FIG. 149 is bottom isometric views of the same element 1480 as shown in FIG. 148.

FIG. 150 is a top and bottom view of the same element 1480 as shown in FIG. 148, and also shows a central opening 1483.

FIG. 151 is a side view of the pentagonal planar element 1480 in FIG. 148, according to the present invention.

FIG. 152 is a front/back view of the same element 1480 as shown in FIG. 148.

FIG. 153 is a top isometric view of a rectangular element 1530, according to the present invention. The element 1530 includes a female element 1532 and a male element 1531, similar to that described in the preceding embodiments.

FIG. 154 is a bottom isometric view of the same element 1530 shown in FIG. 153.

FIG. 155 is a top/bottom view of the same element 1530 shown in FIG. 153, and also shows a plurality of openings 1533 therein.

FIG. 156 is a side view of the element 1530 shown in FIG. 153.

FIG. 157 is a front/back view of the same element 1530 shown in FIG. 153.

FIG. 158 is a perspective top view of a triangular element 1580 according to the present invention, having a male element 1581. The male element 1581, like the foregoing male elements, has a generally cylindrical shape with rounded ends, and is connected to the body of the element 1580 along one cylindrical side portion of the male element 1581. As seen in FIGS. 158 and 159, the attachment of the male element 1581 to the body of the element 1580 extends along a periphery of approximately half, or alternatively somewhat less than half, of the perimeter of the male element 1581. In a longitudinal direction along the male element 1581, the attachment occurs in a central region of the male element 1581 and extends approximately half, or alternatively somewhat less than half, of the total longitudinal length of the male element 1581.

FIG. 159 is a perspective bottom view of the same element 1580 shown in FIG. 158, and illustrates the female element 1582. The female element 1582 is similar to that described in the foregoing embodiments in greater detail, and is formed by opposing walls having recesses to receive the rounded ends of the male element 1581. In this view, a flat bottom wall 1583 is shown.

FIG. 160 is a bottom view of the same view of the same element 1580 shown in FIG. 158, and shows a pyramidal (triangular) recess 1584.

FIG. 161 is a top view of the same element 1580 shown in FIG. 158.

FIG. 162 is a left side view of the same element 1580 as shown in FIG. 158.

FIG. 163 is a right side view of the same element 1580 as shown in FIG. 158.

FIG. 164 is a front view of the same element 1580 as shown in FIG. 158.

FIG. 165 is a back view of the same element 1580 as shown in FIG. 158.

FIG. 166 is an isometric view of a square female connector element 1660, according to the present invention, having four identical female elements 1663 (shown in FIG. 167) formed by a first arm 1661 and a second arm 1662. The female elements 1661, 1662 have facing portions formed similarly to the foregoing embodiments, for receiving male members (not shown in FIG. 166).

FIG. 167 is a side view of the same element 1660 as shown in FIG. 166.

FIG. 168 is a top view of the same element 1660 as shown in FIG. 166, and also showing a central passage 1664 formed in the shape of an X or a plus symbol.

FIG. 169 is an isometric view of a square male connector element 1690, according to the present invention, having a plurality of male members 1691 of the type already described hereinabove.

FIG. 170 is a side view if the same element 1690 as shown in FIG. 169, having a central raised portion 1692.

FIG. 171 is a top view of the same element 1690 as shown in FIG. 169, having a central opening 1693 which is generally X-shaped.

FIG. 172 is an isometric view of a Y shaped element 1720, according to the present invention, having a female element 1722 and a male element 1721, similar to that described in the preceding embodiments.

FIG. 173 is a bottom isometric view of the same element 1720 as shown in FIG. 172, showing a plurality of openings 1723 therethrough.

FIG. 174 is a top view of the same element 1720 as shown in FIG. 172.

FIG. 175 is a bottom view of the same element 1720 as shown in FIG. 172.

FIG. 176 is a front of the same element 1720 as shown in FIG. 172.

FIG. 177 is a back of the same element 1720 as shown in FIG. 172.

FIG. 178 is a left side of the same element 1720 as shown in FIG. 172.

FIG. 179 is a right side of the same element 1720 as shown in FIG. 172.

FIG. 180 shows an assembly 1800 of male elements and female elements the types shown in the above-described FIGS. 166 through 171 (which depict female elements 1660 and male elements 1690).

FIG. 181 shows an exploded view of the assembly 1800 of aligned male and female hinge elements forming four vertically aligned edges, that is, the assembly 1800 can serve as a hinge between various members/assemblies connected to respective ones of the vertically-aligned male and female elements, as shown in FIG. 180. The FIGS. 180 and 181 illustrate how assemblies or arrays of male and female connecting elements can be constructed in accordance with the present invention. This view also shows a n elongated member 1801 having an X-shaped (or plus-symbol shaped) cross-section, that fits through correspondingly shaped openings (described hereinabove) in the male and female elements, to keep them in alignment.

FIG. 182 is a front perspective view of a single connecting element 1820 with a dimensional plate connecting element, i.e. the flat portion connecting a female portion 1822 with a male portion 1821, for frictional insertion into orifices located on planar elements. The connecting element 1820 is also referred to hereinbelow as a hermaphroditic connector because it has both a male portion and a female portion side-by-side facing in the same direction along one side of the dimensional plate mentioned above.

FIG. 183 is a back perspective view of the same element 1820 as shown in FIG. 182.

FIG. 184 is a top view of the same element 1820 as shown in FIG. 182. Here, the female element 1822 is shown as having a first arm having an outer side 1822a that is generally flat, and an inner side 1822b having a female slot portion of the type described in detail in the foregoing.

FIG. 185 is a bottom view of the same element 1820 as shown in FIG. 182.

FIG. 186 is a back view of the same element 1820 as shown in FIG. 182.

FIG. 187 is a front view of the same element 1820 as shown in FIG. 182.

FIG. 188 is a right side view of the same element 1820 as shown in FIG. 182.

FIG. 189 is a left side view of the same element 1820 as shown in FIG. 182.

FIG. 190 shows a back perspective view of a zipper element 1900 comprising a "slider body" having a pull-tab 1901, a crown 1902, and a sliding body 1903. The element 1900 is capable of zipping "molded teeth" (standard zipper nomenclature) which molded teeth incorporate the above-mentioned hermaphroditic connecting elements as previously shown.

FIG. 191 shows a front perspective view of the same element 1900 as shown in FIG. 190.

FIG. 192 shows a top view of the same element 1900 as shown in FIG. 190.

FIG. 193 shows a bottom view of the same element 1900 as shown in FIG. 190.

FIG. 194 shows side view of the same element 1900 as shown in FIG. 190.

FIG. 195 shows a front view of the same element 1900 as shown in FIG. 190.

FIG. 196 shows a rear view of the element 1900 as shown in FIG. 190.

FIG. 197 shows a back perspective view of slider body element 1900 as shown in FIG. 190.

FIG. 198 shows a front perspective view of slider body element 1900 as shown in FIG. 190.

FIG. 199 shows a top view of slider body element 1900 as shown in FIG. 190.

FIG. 200 shows a bottom view of slider body element 1900 as shown in FIG. 190.

FIG. 201 shows a side view of slider body element 1900 as shown in FIG. 190.

FIG. 202 shows a front view of slider body element 1900 as shown in FIG. 190.

FIG. 203 shows a back view of slider body element 1900 as shown in FIG. 190.

FIG. 204 shows a back perspective view of a cable harness 2040 with an insulation/external covered section 2044 and an exposed non-insulated section indicated in FIGS. 204 and 205 by arms 2041, 2042, and 2043. The arms 2041, 2042, 2043 each are comprised of linked members that are pivotable similar to links in a chain.

FIG. 205 shows a front perspective view of the same element 2040 shown in FIG. 204.

FIG. 206 shows a top view of the cable harness 2040 with the insulation/external covered section and exposed un-insulated section discussed above.

FIG. 207 shows a front view of the cable harness 2040 shown in FIG. 204.

FIG. 208 shows a back view of the cable harness 2040 shown in FIG. 204.

FIG. 209 shoes a left side view of the cable harness 2040 of FIG. 204.

FIG. 210 shows a right side view of the cable harness 2040.

FIG. 211 shows a front overall view of a chain assembly 2110 configured into a flexible ring, the assembly 2110 being formed by a plurality of link members 2011.

FIG. 212 shows a perspective view of the assembly 2110 with link members 2011 of FIG. 211.

FIG. 213 shows a side view of the assembly 2110 shown in FIG. 211.

FIG. 214 shows a front perspective view of a hinge element 2140 with a flange 2142 with orifices 2141 allowing for bolted, screwed, nailed, welded, or other attachments for connection to various other surface elements (not shown).

FIG. 215 shows a back perspective view of the same element 2140 as shown in FIG. 214.

FIG. 216 shows a top view of the same element 2140 as shown in FIG. 214. FIG. 217 shows a bottom view of the same element 2140 as shown in FIG. 214.

FIG. 218 shows a front view of the same element 2140 as shown in FIG. 214.

FIG. 219 shows a back view of the same element 2140 as shown in FIG. 214.

FIG. 220 shows the left view of the same element 2140 as shown in FIG. 214.

FIG. 221 shows the right view of the same element 2140 as shown in FIG. 214.

FIG. 222 shows a front perspective view of a hinge element 2220 incorporating a "clip" element formed by portions 2221, 2222 for application along panels, boards, windows, plates, or any element commensurate with this embodiment of the invention.

FIG. 223 shows a back perspective view of the same element 2220 as shown in FIG. 222.

FIG. 224 shows a top view of the same element 2220 as shown in FIG. 222.

FIG. 225 shows a bottom view of the same element 2220 as shown in FIG. 222.

FIG. 226 shows a front view of the same element 2220 as shown in FIG. 222.

FIG. 227 shows a back view of the same element 2220 as shown in FIG. 222.

FIG. 228 shows a left side view of the same element 2220 as shown in FIG. 222.

FIG. 229 shows a right view of the same element 2220 as shown in FIG. 222.

FIG. 230 shows a top view of a hinge element 2300 with a sliding element 2301 compatible with "T-slot structure" framing elements. Male elements 2303 are shown, along with female elements 2302, in alternating arrangement.

FIG. 231 shows a front perspective view of the same element 2300 as shown in FIG. 230.

FIG. 232 shows a back perspective view of the same element 2300 as shown in FIG. 230.

FIG. 233 shows a front view of the same element 2300 as shown in FIG. 230.

FIG. 234 shows a back view of the same element 2300 as shown in FIG. 230.

FIG. 235 shows a left view of the same element 2300 as shown in FIG. 230.

FIG. 236 shows a right view of the same element 2300 as shown in FIG. 230.

FIG. 237 shows a side view of a T-slot structure 2370 compatible with the element shown in FIG. 230.

FIG. 238 shows a top view of the T-slot structure 2370 of FIG. 237, showing four arms 2371, 2372, 2373, 2374 (shown in FIG. 239) having arrow-head shaped tips.

FIG. 239 shows a perspective view of the T-slot structure 2370, described above.

FIG. 240 shows a perspective view of an assemblage 2400 of both a T-slot structure and a hinge element of the type shown in FIG. 237.

FIG. 241 shows an exploded view of the same elements collectively indicated as 240.

FIG. 242 shows a perspective view of a bottom portion 2578 of an electrically conductive square planar element 2560 as shown in FIG. 256.

FIG. 243 shows side view of same element 2578 as shown in FIG. 242.

FIG. 244 shows top view of same element 2578 as shown in FIG. 242.

FIG. 245 shows bottom view of same element 2578 as shown in FIG. 242.

FIG. 246 shows a top perspective view of the same element 2578 as shown in FIG. 242 showing the exterior portion on top.

FIG. 247 shows a side view of same element 2578 as shown in FIG. 242.

FIG. 248 shows a top view of same element 2578 as shown in FIG. 242.

FIG. 249 shows a bottom view of same element 2578 as shown in FIG. 242.

FIG. 250 shows a perspective view of a center section element 2574 of the assembly shown in

FIG. 256.

FIG. 251 shows a side view of the same element 2574 as that shown in FIG. 250.

FIG. 252 shows a top view of the same element 2574 as that shown in FIG. 250.

FIG. 253 shows an assembly 2530 showing a bottom view of the same element 2574 as that shown in FIG. 250, and conductive arms of FIG. 254.

FIG. 254 shows a perspective view of a layer 2576 formed by a plurality of conducting elements of a circuit element/board shown in FIG. 253.

FIG. 255 shows a top view of the same layer 2576 shown in FIG. 254.

FIG. 256 shows a perspective view of an electrical junction/component housing square planar hinged element 2560, formed by the top portion 2572 and bottom portion 2578.

FIG. 257 shows a perspective exploded view 2570 of the element 2560 of FIG. 256, showing its layers 2572, 2574, 2576, and 2578 as discussed hereinabove.

FIG. 258 shows a top view of a junction hub 2580 inserted into the center section/orifice of the electric junction/component housing planar element as shown in FIG. 256.

FIG. 259 is a side view of the same element 2580 shown in FIG. 258.

FIG. 260 is a perspective view of the same element 2580 shown in FIG. 258.

FIG. 261 is a perspective view of a bottom section 2819 of a battery/electrical component housing rectangular planar element 2810 shown in FIG. 280.

FIG. 262 is a side view of the same element 2819 shown in FIG. 261 and FIG. 280.

FIG. 263 is a front back view of the same element 2819 shown in FIG. 261 and in FIG. 280.

FIG. 264 is a top view of the same element 2819 shown in FIG. 261.

FIG. 265 is a bottom view of the same element 2819 shown in FIG. 261.

FIG. 266 is a perspective view of the top section 2812 of a battery housing rectangular planar element shown in FIG. 280.

FIG. 267 is a side view of the same element 2812 as shown in FIG. 266.

FIG. 268 is a front and back of the same element 2812 as shown in FIG. 266.

FIG. 269 is a top of the same element 2812 as shown in FIG. 266.

FIG. 270 is a bottom of the same element 2812 as shown in FIG. 266.

FIG. 271 is a top perspective view of a center section 2816 of the conducting element circuit board of element shown in FIG. 280.

FIG. 272 is a side view of the same element 2816 as shown in FIG. 271.

FIG. 273 is a front and back view of the same element 2816 of FIG. 271

FIG. 274 is a top view of the same element 2816 of FIG. 271.

FIG. 275 is a bottom view of the same element 2816 shown in FIG. 280.

FIG. 276 is a perspective view of a "male" conducting element 2814 of the assembly shown in FIG. 280.

FIG. 277 is a top view of the same element 2814 as shown in FIG. 276, here numbered as element 2816.

FIG. 278 is a perspective view of a "female" conducting element 2818 illustrated in FIG. 280.

FIG. 279 is a top view of the same element 2818 shown in FIG. 278.

FIG. 280 is a perspective view of the rectangular battery/electrical component housing 2810, having a top portion 2812 and a bottom portion 2819.

FIG. 281 is an exploded perspective view of the rectangular battery/electric component housing of FIG. 280, showing portions 2812, 2814, 2816, 2818, and 2819.

FIG. 282 shows an isometric view of a connecting element 2820 which can be inserted into the orifices located on the face sections of planar elements. The element 2820 has male and female elements similar to that described hereinabove with respect to the hermaphroditic elements.

FIG. 283 shows an isometric back side of the same element 2820 as shown in FIG. 282.

FIG. 284 shows a top view of the same element 2820 as shown in FIG. 282.

FIG. 285 shows a bottom view of the same element 2820 as shown in FIG. 282.

FIG. 286 shows a back view of the same element 2820 as shown in FIG. 282.

FIG. 287 shows a front view of the same element 2820 as shown in FIG. 282.

FIG. 288 shows a right side view of the same element 2820 as shown in FIG. 282.

FIG. 289 shows a left side view of the same element 2820 as shown in FIG. 282.

The invention being thus described, it will be evident that the same may be varied in many ways by a routineer in the applicable arts. Such variations are not to be regarded as a departure from the spirit and scope of the invention and all such modifications are intended to be included within the scope of the claims.

What is claimed is:

1. A first construction block for selective manual attachment and manual detachment to a second construction block having a male element, the first construction block comprising:
    a body having at least one connector pair,
    said connector pair including a first connector member and a second connector member;
    said first connector member of said connector pair having an outer periphery and a surface adapted to receive said male element of said second construction block, said surface of said first connector member having a V-shaped recessed region extending to said outer periphery such that said V-shaped recessed region forms an enlarged opening which is adapted to receive said male element of said second construction block along said V-shaped region, and said surface of said first connector member having a ridge having a bounding wall extending in a first direction;
    said second connector member of said connector pair having an outer periphery and a surface adapted to receive said male element of said second construction block, said surface of said second connector member having a V-shaped recessed region extending to said outer periphery such that said V-shaped recessed region forms an enlarged opening which is adapted to receive said male element of said second construction block along said V-shaped region, and a ridge of said second connector member of said connector pair having a bounding wall extending in a second direction which is different from said first direction;
    said first direction being oppositely directed relative to said second direction, whereby said male element of said second construction block which is received in said recessed region of said first connector member and in said recessed region of said second connector member is pivotably retained between said first connector member and said second connector member of said connector pair.

2. A first construction block as claimed in claim 1, wherein said first connector member and said second connector member are resiliently deformable.

3. A first construction block as claimed in claim 1, wherein said first connector member has a beveled side adjacent its periphery, to faciliate sliding entry of male elements.

4. A first construction block as claimed in claim 1, wherein said first connector member includes a curved tip.

5. A first construction block as claimed in claim 1, wherein said body is a generally rectangular body having four sides, each of said four sides having a plurality of said connector pairs disposed parallel to each other along each respective one of said four sides.

6. A first construction block as claimed in claim 1, wherein said bounding wall of said first connector member extends from a central region of said surface of said first connector member to said outer periphery of said first connector member, and said bounding wall of said second connector member extends from a central region of said surface of said second connector member to said outer periphery of said second connector member.

7. A first construction block as claimed in claim 1, wherein said recessed region of said first connector member is wider at said outer periphery than at said central region of said first connector member; said recessed region of said first connector member being open in a first angular direction, and said recessed region of said second connector member being wider at said outer periphery than at said central region of said second connector member, said recessed region of said second connector member being open in a second angular direction.

8. A first construction block as claimed in claim 1, wherein said first connector member has a beveled side adjacent its periphery, to faciliate sliding entry of male elements, and wherein said first connector member includes a curved tip.

9. A first construction block for selective manual attachment and manual detachment to a second construction block having a male element, the first construction block comprising:
a body having at least one connector pair,
said connector pair including a first connector member and a second connector member;
said first connector member of said connector pair having an outer periphery and a surface adapted to receive said male element of said second construction block, said surface of said first connector member having a V-shaped recessed region extending to said outer periphery such that said V-shaped recessed region forms an enlarged opening which is adapted to receive said male element of said second construction block along said V-shaped region, and said surface of said first connector member having a ridge having a bounding wall extending in a first direction;
wherein said surface of said first connector member, which is adapted to receive said male element of said second construction block, has no undercut portion;
said second connector member of said connector pair having an outer periphery and a surface adapted to receive said male element of said second construction block, said surface of said second connector member having a V-shaped recessed region extending to said outer periphery such that said V-shaped recessed region forms an enlarged opening which is adapted to receive said male element of said second construction block along said V-shaped region, and a ridge of said second connector member of said connector pair having a bounding wall extending in a second direction which is different from said first direction;
wherein said surface of said second connector member, which is adapted to receive said male element of said second construction block, has no undercut portion;
said first direction being oppositely directed relative to said second direction, whereby said male element of said second construction block which is received in said recessed region of said first connector member and in said recessed region of said second connector member is pivotably retained between said first connector member and said second connector member of said connector pair.

10. A first construction block as claimed in claim 9, wherein said first connector member and said second connector member are resiliently deformable.

11. A first construction block as claimed in claim 9, wherein said first connector member has a beveled side adjacent its periphery, to faciliate sliding entry of male elements.

12. A first construction block as claimed in claim 9, wherein said first connector member includes a curved tip.

13. A first construction block as claimed in claim 9, wherein said body is a generally rectangular body having four sides, each of said four sides having a plurality of said connector pairs disposed parallel to each other along each respective one of said four sides.

14. A first construction block as claimed in claim 9, wherein said bounding wall of said first connector member extends from a central region of said surface of said first connector member to said outer periphery of said first connector member, and said bounding wall of said second connector member extends from a central region of said surface of said second connector member to said outer periphery of said second connector member.

15. A first construction block as claimed in claim 9, wherein said recessed region of said first connector member is wider at said outer periphery than at said central region of said first connector member; said recessed region of said first connector member being open in a first angular direction, and said recessed region of said second connector member being wider at said outer periphery than at said central region of said second connector member, said recessed region of said second connector member being open in a second angular direction.

16. A first construction block as claimed in claim 9, wherein said first connector member has a beveled side adjacent its periphery, to faciliate sliding entry of male elements, and wherein said first connector member includes a curved tip.

* * * * *